United States Patent
Minami et al.

(10) Patent No.: US 6,930,160 B2
(45) Date of Patent: Aug. 16, 2005

(54) 1-BUTENE POLYMER AND MOLDED PRODUCT CONSISTING OF THE POLYMER

(75) Inventors: Yutaka Minami, Chiba (JP); Masami Kanamaru, Chiba (JP); Koji Kakigami, Chiba (JP); Hideo Funabashi, Chiba (JP)

(73) Assignee: Idemitsu Petrochemical Co. Ltd., Tokyo (JP)

( * ) Notice: Subject to any disclaimer, the term of this patent is extended or adjusted under 35 U.S.C. 154(b) by 265 days.

(21) Appl. No.: 10/110,194

(22) PCT Filed: Aug. 21, 2001

(86) PCT No.: PCT/JP01/07163

§ 371 (c)(1),
(2), (4) Date: Apr. 16, 2002

(87) PCT Pub. No.: WO02/16450

PCT Pub. Date: Feb. 28, 2002

(65) Prior Publication Data

US 2003/0069320 A1 Apr. 10, 2003

(30) Foreign Application Priority Data

| Aug. 22, 2000 | (JP) | 2000-251094 |
| Nov. 24, 2000 | (JP) | 2000-357246 |
| Feb. 20, 2001 | (JP) | 2001-044077 |
| May 24, 2001 | (JP) | 2001-155643 |

(51) Int. Cl.[7] ............................................. C08F 10/08
(52) U.S. Cl. .................... 526/348.6; 526/160; 526/165; 526/164
(58) Field of Search .................. 526/160, 165, 526/348.6, 164

(56) References Cited

FOREIGN PATENT DOCUMENTS

| EP | 721954 | 7/1996 |
| EP | 818458 | 1/1998 |
| JP | 62-119213 | 5/1987 |
| JP | 8-225605 | 9/1996 |
| WO | WO 92/05208 | * 4/1992 |

OTHER PUBLICATIONS

Longo et al., "13C–Enriched End Groups of Isotactic Polypropylene and Poly(1–butene) Prepared in the Presence of Ethylenediindenyldimethyltitanium and Methylalumoxane", Macromolecules 1987, 20, 1015–1018.*

* cited by examiner

*Primary Examiner*—Caixia Lu
(74) *Attorney, Agent, or Firm*—Oblon, Spivak, McClelland, Maier & Neustadt, P.C.

(57) ABSTRACT

1-butene based polymer satisfying following requirements (1") to (4") provides formed product having low stickiness, superior flexibility and transparency.

(1") Crystalline resin having melting point (Tm–P), not observed or in the range of 0 to 100° C., wherein said melting point defined as the peak top of the peak observed in the highest temperature zone of the melting heat absorption curve obtained by heating a sample of said polymer at a rate of 10° C./minute using Differential Scanning Calorimeter (DSC), after melting said sample in advance at 190° for 5 minutes under nitrogen atmosphere, followed by cooling it to –10° C. at a rate of 5° C./minutes, and keeping it at –10° C. for 5 minutes.

(2") Stereoregularity index {(mmmm)/(mmrr+rmmr)} is at most 20.

(3") Molecular weight distribution (Mw/Mn) measured by Gel Permeation Chromatography (GPC) method is at most 4.0.

(4") Weight average molecular weight (Mw) measured by GPC method is in the range of 10,000 to 1,000,000.

47 Claims, No Drawings

1-BUTENE POLYMER AND MOLDED PRODUCT CONSISTING OF THE POLYMER

TECHNICAL FIELD

The present invention relates to a 1-butene based polymer, a formed product and a resin improving agent made from the polymer, more particularly, 1-butene based polymer which provides a formed product having low stickiness, superior flexibility and transparency, the formed product formed therefrom and a resin reforming agent made from the polymer.

Moreover, the present invention relates to a novel polyolefin based resin composition which can substitute flexible polyvinyl chloride, the molded product and the film therefrom, more precisely, molded product and film having low stickiness, superior flexibility, low temperature impact strength and secondary processability.

Furthermore, the present invention relates to a 1-butene based resin composition and the formed product therefrom, more precisely, a 1-butene based resin composition having superior transparency, flexibility and improved crystal stabilization rate and the formed product therefrom.

BACKGROUND ART

Heretofore, although polyvinyl chloride resin has been widely used as a flexible resin, development of its substitute is strongly desired as it is known that the polyvinyl chloride resin generates toxic compounds under combustion process.

Polypropylene based polymers are known as a substitute of the flexible polyvinyl chloride resin. Polypropylene based polymers are produced under various catalysts. However, the polypropylene based polymers produced by using the conventional catalysts have a drawback that a sticky component increases when it is made flexible (i.e., low modulus of elasticity). There is also possibility of having various problems such as deteriorating surface properties of the product when the polypropylene based polymer is molded, or when the formed sheets or films therefrom are used for food and medical applications. Moreover, there is a big problem in polypropylene based polymers that the glass transition temperature Tg is relatively high (about 0° C.) and the impact strength at low temperature (e.g., at −30° C.) is low.

On the other hand, 1-butene based polymer (polybutene-1) has been used in various applications as a general purpose resin because of its superior mechanical strength and a high heat resistance as well as its low price.

For example, as 1-butene based polymer has features such as a superior transparency, stiffness, heat resistance and a low hygroscopicity, it is used for biaxially stretched films or cast films such as laminate film. Furthermore, crystalline 1-butene based polymer film is widely used as packaging film utilizing its excellent rigidity, transparency and moisture proof property.

However, 1-butene based polymer film requires lower supercooling temperature for initiating crystallization and has lower crystallization temperature than polyethylene based polymer, even though the melting point is similar. Those tendencies are more remarkable in less crystalline polymers such as copolymer and the polymers with lower stereoregularity. Those characteristics lead to a difficulty of forming, inferior resin property, low temperature sealing property, modulus of elasticity and impact strength.

1-butene polymer has heretofore produced using titanium catalyst deposited on magnesium carrier (Japanese Patent Application Laid-Open 7-145205), but the composition of the polymer was not homogeneous leading to inferior properties such as stickiness and low transparency. Recently, by use of metallocene catalysts, 1-butene polymer with a homogeneous composition is obtained (Japanese Patent Applications Laid-Open Nos.62-119214, 62-121708, 62-119213, 8-225605). However, the homopolymers disclosed in those prior arts had a high stereoregularity and was lack of flexibility. In order to increase flexibility, a copolymer of 1-butene with an α-olefin was proposed. However, even though using the metallocene catalyst, in case of a simple copolymer of 1-butene, the composition sometimes was not quite homogeneous so that it was difficult to effectively prevent stickiness or inferior transparency.

Moreover, it is known that, in general, 1-butene based polymers show different crystal structures called Type I crystal and Type II crystal according to X-ray diffraction analysis. The conventional 1-butene based polymers had a disadvantage of having a shrinkage of product due to a gradual transformation of the crystal structure from Type II crystal to Type I crystal.

On the other hand, recently, olefin based polymer produced by using a metallocene catalyst is proposed as a substitute for flexible polyvinyl chloride resin. Linear low density polyethylene (LLDPE) produced using metallocene catallyst is an example. Although such a LLDPE has certainly a flexibility, it has low transparency and inferior surface property, therefore, it was not sufficient. Moreover, there is a problem of difficulty in improving the properties due to its poor compatibility with other α-olefin based polymers. Therefore, as a substitute for flexible polyvinyl chloride resin, development of a polyolefin based resin having an improved balance between the tensile modulus of elasticity (heretofore, referred simply as modulus of elasticity) and amount of sticky component, as well as an excellent impact strength, has been desired.

DISCLOSURE OF THE INVENTION

The object of the present invention is to provide a 1-butene based polymer enabling to produce a formed product which has superior flexibility and transparency, a 1-butene based polymer which does not change properties on standing due to a transformation of the crystal structure, and the formed product and resin reforming agent therefrom.

Moreover, the object of the present invention is to provide a polyolefin based resin composition enabling to produce a formed product having low stickiness, superior flexibility, low temperature impact strength, and superior fabricating characteristics, as well as to provide the molded product and film therefrom.

Furthermore, the object of the present invention is to provide a 1-butene based resin composition having superior transparency, flexibility and an improved crystal stabilization rate, as well as to provide a formed product formed from the 1-butene based resin composition.

The present inventors have intensively researched to achieve the above mentioned objects, and as a result, it has been found that a 1-butene based polymer within a specific range of (1) melting point, (2) stereoregularity index {(mmmm)/(mmrr+rmmr)}, (3) molecular weight distribution (Mw/Mn), (4) weight-average molecular weight (Mw) has an excellent balance between the amount of sticky component, low modulus of elasticity and transparency, further it has been also found that a 1-butene based polymer having a specific range of (5) structural unit originated from 1-butene, (6) Type II crystal fraction (CII) has no change of properties in standing due to crystal transformation.

Moreover, the present inventors have found that a resin composition comprising 1-butene based polymer and polyolefin within a specific range of (1) melting point, (2) stereoregularity index {(mmmm)/(mmrr+rmmr)}, (3) molecular weight distribution (Mw/Mn) and (4) weight average molecular weight (Mw) provides a formed product with a superior flexibility and impact strength at low temperature, as well as with an excellent balance between low elasticity and amount of sticky component.

Furthermore, the present inventors have found that a compound made by adding a nucleation agent to a 1-butene based polymer having a specific range of (1) melting point, (2) stereoregularity index {(mmmm)/(mmrr+rmmr)}, (3) molecular weight distribution (Mw/Mn), (4) weight average molecular weight (Mw) has superior transparency, flexibility and crystal stabilization rate, and that a composition having (5) structure unit originated from 1-butene, (6) Type II crystal fraction (CII) in a specific range has no property change in standing caused by transformation of crystal structure.

In consequence, the present invention has been completed on the above mentioned findings.

Namely, the present invention provides following 1-butene based polymer, formed product and resin reforming agent made from the polymer:

1. 1-butene based polymer satisfying following (1) to (4):
(1) Crystalline resin having a melting point (Tm-D) in the range of 0 to 100° C., wherein the melting point is defined as the peak top of the peak observed in the highest temperature zone of the melting heat absorption curve obtained by heating a sample of the polymer at a rate of 10° C./minute using the Differential Scanning Calorimeter(DSC), after keeping the sample in advance at −10° C. for 5 minutes under nitrogen atmosphere.
(2) Stereoregularity index {(mmmm)/(mmrr)+(rmmr)} is at most 20.
(3) Molecular weight distribution (Mw/Mn) measured by Gel Permeation Chromatography (GPC)method is at most 4.0.
(4) Weight average molecular weight (Mw) measured by GPC method is in the range of 10,000 to 1,000,000

2. 1-butene based polymer satisfying following (1') to (4'):
(1') Crystalline resin having melting point (T m), not observed or in the range of 0 to 100° C., wherein said melting point defined as the peak top of the maximum peak of the melting heat absorption curve obtained by heating a sample of said polymer at a rate of 10° C./minute using the Differential Scanning Calorimeter (DSC), after melting said sample in advance at 220° for 3 minutes under nitrogen atmosphere, followed by cooling it to −40° C. at a rate of 10° C./minute, and keeping it at −40° C. for 3 minutes.
(2') Stereoregularity index {(mmmm)/(mmrr+rmmr)} is at most 20.
(3') Molecular weight distribution (Mw/Mn) measured by Gel Permeation Chromatography (GPC) method is at most 4.0.
(4') Weight average molecular weight (Mw) measured by GPC method is in the range of 10,000 to 1,000,000.

3. 1-butene based polymer satisfying following (1") to (4"):
(1") Crystalline resin having melting point (Tm-P), not observed or in the range of 0 to 100° C., wherein the melting point defined as the peak top of the peak observed in the highest temperature zone of the melting heat absorption curve obtained by heating a sample of the polymer at a rate of 10° C./minute using Differential Scanning Calorimeter (DSC), after melting the sample in advance at 190° for 5 minutes under nitrogen atmosphere, followed by cooling it to −10° C. at a rate of 5° C./minutes, and keeping it at −10° C. for 5 minutes.
(2") Stereoregularity index {(mmmm)/(mmrr+rmmr)} is at most 20.
(3") Molecular weight distribution (Mw/Mn) measured by Gel Permeation Chromatography (GPC) method is at most 4.0.
(4") Weight average molecular weight (Mw) measured by GPC method is in the range of 10,000 to 1,000,000.

4. 1-butene based homopolymer according to any one of the above 1 to 3, wherein mesopentad fraction (mmmm) is in the range of 20 to 90%.

5. 1-butene based homopolymer according to above 4 which satisfies the following formula(1):

$$(mmmm) \leq 90 - 2 \times (rr) \qquad (1)$$

wherein rr is racemic triad fraction.

6. 1-butene based copolymer according to any one of above 1 to 3, which comprises 1-butene and ethylene and/or α-olefin having 3 to 20 carbon atoms (except 1-butene), and has at least 90 mol % of the structural unit originated from 1-butene.

7. 1-butene based copolymer according to above 6, which is a copolymer of 1-butene and α-olefin having 3 to 20 carbon atoms (except 1-butene).

8. 1-butene based copolymer according to above 7, wherein the following random index R obtained from α-olefin chain is at most 1;

$$R = 4[\alpha\alpha][BB]/[\alpha B]^2$$

wherein, [αα] is α-olefin chain fraction, [BB] is butene chain fraction, [αB] is α-olefin-butene chain fraction.

9. 1-butene based copolymer according to above 7, which is a copolymer of 1-butene and α-olefin having a 3 to 20 carbon atoms (except 1-butene), and having at least 95 mol % of structure unit originated from 1-butene.

10. 1-butene based polymer satisfying the following (5) and (6):
(5) 1-butene homopolymer or 1-butene based copolymer obtained by copolymerizing 1-butene and ethylene and/or α-olefin having 3 to 20 carbon atoms (except 1-butene), which has at least 90 mol % of structural unit originated from 1-butene.
(6) Type II crystal fraction (CII) determined by X-ray diffraction analysis is at most 50%, wherein the analysis was made after melting a sample of the polymer in advance at 190° C. for 5 minutes and rapidly solidified by cooling it with ice water, followed by keeping it at room temperature for 1 hour.

11. 1-butene based polymer according to above 10 which is further satisfies the following (7):
(7) Weight average molecular weight (Mw) measured by GPC method is in the range of 10,000 to 1,000,000.

12. 1-butene based homopolymer according to any one of above 1 to 5, which is produced by polymerization of 1-butene under the presence of a polymerization catalyst comprising at least one kind of component selected from (A) transition metal compound represented by the general formula (I) below, (B) (B-1) a compound capable of forming an ionic complex by reacting with the transition metal compound (A) or its derivative, and (B-2) aluminoxane;

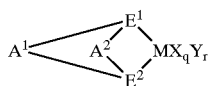
(1)

wherein, M represents a metallic element in the groups 3 to 10 or in lanthanoide series of the periodic table; each of $E^1$ and $E^2$ represents respectively a ligand selected from a substituted cyclopentadienyl group, an indenyl group, a substituted indenyl group, a heterocyclopentadienyl group, a substituted heterocyclopentadienyl group, an amide group, a phosphide group, a hydrocarbon group and a silicon containing group, forming a cross-linked structure through $A^1$ and $A^2$, $E^1$ and $E^2$ may be the same or different; X represents a σ-bonding ligand, and when X is plural, they may be the same or different with each other, and may be cross-linked with other X, $E^1$, $E^2$ or Y; Y represents a Lewis base, and when Y is plural, they may be the same or different with each other, and may be cross-linked with other Y, $E^1$, $E^2$ or X; $A^1$ and $A^2$ are bivalent cross-linking group for bonding two ligands, representing a hydrocarbon group having 1 to 20 carbon atoms, a halogenated hydrocarbon group having 1 to 20 carbon atoms, a silicon containing group, a germanium containing group, a tin containing group, —O—, —CO—, —S—, —$SO_2$—, —Se—, —$NR^1$—, —$PR^1$—, —P(O)$R^1$—, —$BR^1$— or —$AlR^1$—; $R^1$ represents hydrogen atom, a halogen atom, a hydrocarbon group having 1 to 20 carbon atoms or a halogen containing hydrocarbon group having 1 to 20 carbon atoms, $R^1$ may be the same or different with each other; q is an integer of 1 to 5 representing [(the valence of M)-2]; r is an integer of 0 to 3.

13. 1-butene based copolymer according to any one of above 1 to 3, and 6 to 11, which produced by copolymerizing 1-butene and ethylene and/or α-olefin having 3 to 20 carbon atoms (except 1-butene) in the presence of polymerization catalyst containing at least one kind of component selected from (A) a transition metal compound represented by the general formula (I) below; (B) (B-1) a compound capable of forming ionic complex by reacting with the transition metal (A) or its derivative; and (B-2) aluminoxane;

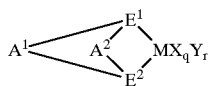
(1)

wherein, M represents a metallic element in the groups 3 to 10 or in lanthanoide series of the periodic table; each of $E^1$ and $E^2$ represents respectively a ligand selected from a substituted cyclopentadienyl group, an indenyl group, a substituted indenyl group, a heterocyclopentadienyl group, a substituted heterocyclopentadienyl group, an amide group, a phosphide group, a hydrocarbon group and a silicon containing group, forming a cross-linked structure through $A^1$ and $A^2$, $E^1$ and $E^2$ may be the same or different; X represents a σ-bonding ligand, and when X is plural, they may be the same or different with each other, and may be cross-linked with other X, $E^1$, $E^2$ or Y; Y represents a Lewis base, and when Y is plural, they may be the same or different with each other, and may be cross-linked with other Y, $E^1$, $E^2$ or X; $A^1$ and $A^2$ are bivalent cross-linking group for bonding two ligands, representing a hydrocarbon group having 1 to 20 carbon atoms, a halogenated hydrocarbon group having 1 to 20 carbon atoms, a silicon containing group, a germanium containing group, a tin containing group, —O—, —CO—, —S—, —$SO_2$—, —Se—, —$NR^1$—, —$PR^1$—, —P(O)$R^1$—, —$BR^1$— or —$AlR^1$—; $R^1$ represents hydrogen atom, a halogen atom, a hydrocarbon group having 1 to 20 carbon atoms or a halogen containing hydrocarbon group having 1 to 20 carbon atoms, $R^1$ may be the same or different with each other; q is an integer of 1 to 5 representing [(the valence of M)-2]; r is an integer of 0 to 3.

14. Formed product produced by forming 1-butene based polymer, 1-butene homopolymer or 1-butene copolymer according to above 1 to 13.
15. 1-butene based resin improving agent made of 1-butene based polymer, 1-butene homopolymer or 1-butene based copolymer according to any one of above 1 to 13.

Furthermore, the present invention provides following polyolefin based resin composition, polyolefin based resin molded product and polyolefin based resin film.

1. Polyolefin based resin composition comprising 1 to 99 weight % of 1-butene based polymer [I] and 99 to 1 weight % of polyolefin based polymer [II] wherein the 1-butene based polymer [I] satisfies following (1") to (4"):
(1") Crystalline resin having melting point (Tm-P), not observed or in the range of 0 to 100° C., wherein the melting point defined as the peak top of the peak observed in the highest temperature zone of the melting heat absorption curve obtained by heating a sample of the polymer at a rate of 10° C./minute using Differential Scanning Calorimeter (DSC), after melting the sample in advance at 190° for 5 minutes under nitrogen atmosphere, followed by cooling it to −10° C. at a rate of 5° C./minutes, and keeping it at −10° C. for 5 minutes.
(2") Stereoregularity index {(mmmm)/(mmrr+rmmr)} is at most 20.
(3") Molecular weight distribution (Mw/Mn) measured by Gel Permeation Chromatography (GPC) method is at most 4.0.
(4") Weight average molecular weight (Mw) measured by GPC method is in the range of 10,000 to 1,000,000,
2. Polyolefin based resin composition according to above 1, wherein the 1-butene based polymer [I] is a 1-butene homopolymer, having the mesopentad fraction (mmmm) is in the range of 20 to 90%.
3. Polyolefin based resin composition according to above 2, wherein the 1-butene homopolymer satisfies the formula (1);

$$(mmmm) \leq 90 - 2 \times (rr) \qquad (1)$$

wherein rr is racemic triad fraction.
4. Polyolefin based resin composition according to any one of above 1 to 3, wherein the polyolefin [II] is at least one kind of compound selected from polyethylene, polypropylene, poly α-olefin composed of α-olefin having at least 4 carbon atoms, polyvinylcycloalkane, syndiotactic polystyrene and polyalkenylsilan,
5. Polyolefin based resin composition according to any one of above 1 to 4, wherein the polyolefin is polypropylene.
6. Polyolefin based resin formed product made by forming the polyolefin based resin composition according to any one of above 1 to 5,
7. Polyolefin based resin formed product according to above 6, which has tensile modulus of elasticity of at most 800 MPa, and Izod impact strength (with notch) at −5° C. of at least 3 kJ/m²,
8. Polyolefin based resin film made from polyolefin based resin composition according to any one of above 1 to 5.
9. Polyolefin based resin film according to above 8, having the tensile modulus of elasticity TM of as least 5 MPa, wherein the relation between tensile modulus of elasticity TM (MPa) and heat seal temperature HST(° C.) satisfies the following formula (2), and the relation between tensile modulus of elasticity TM (MPa) and TmF (° C.) satisfies the formula (3);

$$TM \geq 12.5 \times HST - 1100 \quad (2)$$

$$TM \leq 17 \times TmF - 1600 \quad (3)$$

wherein, TmF is defined as the peak top of the peak observed at the highest temperature zone of the melting heat absorption curve obtained by heating a sample of the resin film at a rate of 10° C./minute using the Differential Scanning Calorimeter (DSC), after melting the sample in advance at 190° C. for 5 minutes under nitrogen atmosphere, followed by cooling it to −10° C. at a rate of 5° C./minute, and keeping it for 5 minutes.

Furthermore, the present invention provides following 1-butene based resin composition and the formed product formed therefrom.

1. 1-butene based resin composition prepared by adding at least 10 ppm of nucleating agent to the 1-butene based polymer satisfying following (1″) to (4″).

(1″) Crystalline resin having melting point (Tm–P), not observed or in the range of 0 to 100° C., wherein the melting point defined as the peak top of the peak observed in the highest temperature zone of the melting heat absorption curve obtained by heating a sample of the polymer at a rate of 10° C./minute using Differential Scanning Calorimeter (DSC), after melting the sample in advance at 190° for 5 minutes under nitrogen atmosphere, followed by cooling it to −10° C. at a rate of 5° C./minutes, and keeping it at −10° C. for 5 minutes.

(2″) Stereoregularity index {(mmmm)/(mmrr+rmmr)} is at most 20.

(3″) Molecular weight distribution (Mw/Mn) measured by Gel Permeation Chromatograph (GPC) method is at most 4.0.

(4″) Weight average molecular weight (Mw) is in the range of 10,000 to 1,000,000.

2. 1-butene based resin composition according to above 1 in which 1-butene based polymer is 1-butene homopolymer with mesopentad fraction (mmmm) in the range of 20 to 90%, and satisfying the formula (1);

$$(mmmm) \leq 90 - 2 \times (rr) \quad (1)$$

wherein rr is racemic triad fraction.

3. 1-butene based resin composition according to above 1 or 2, where t (minute) and TmC (° C.) satisfies the formula (4);

$$t \leq 40 - 0.34 \times TmC \quad (4)$$

wherein TmC is defined as the peak top of the peak observed in the highest temperature zone of the melting heat absorption curve obtained by heating a sample of the resin composition at a rate of 10° C./minute using of the Differential Scanning Calorimeter (DSC), after melting the sample in advance at 190° C. for 5 minutes under nitrogen atmosphere followed by cooling it down to −10° C. at a rate of 5° C./minute, and keeping it at −10° C. for 5 minutes; t is crystallization time (minute) defined as the time required for observing a peak of crystallization heat release after a sample of the polymer reached to 25° C. by cooling from a melting state at 190° C.

4. 1-butene based resin composition according to any one of above 1 to 3 having the melting point (TmC) (° C.) and crystallization time (t) (minute), comprising 1-butene based polymer having melting point (TmP) (° C.) and crystallization time (t P) (minute), satisfying the relation as represented in the following formulae (5) to (7)

$$0 \leq TmC \leq 100 \quad (5)$$

$$TmC - TmP \leq 8 \quad (6)$$

$$t - tP \leq -4 \quad (7)$$

wherein t P is the crystallization time, defined as the time required for observing the peak of crystallization heat after said sample reached to 25° C., by quickly cooling the sample from a melting condition kept at 190° C. for 5 minutes under nitrogen atmosphere.

5. 1-butene based resin composition prepared by adding at least 10 ppm of nucleating agent to 1-butene based polymer which satisfies (5) and (6);

(5) 1-butene homopolymer or 1-butene based copolymer obtained by copolymerizing 1-butene and ethylene and/or α-olefin having 3 to 20 carbon atoms (except 1-butene), which has at least 90 mol % of structural unit originated from 1-butene.

(6) Type II crystal fraction (CII) determined by X-ray diffraction analysis is at most 50%, wherein the analysis was made after melting a sample of the polymer in advance at 190° C. for 5 minutes and rapidly solidified by cooling it with ice water, followed by keeping it at room temperature for 1 hour.

6. 1-butene based resin composition according to above 5, having weight average molecular weight (Mw) measured by GPC method in the range of 10,000 to 1,000,000.

7. Formed product formed by forming 1-butene based resin composition according to any one of above 1 to 6.

DESCRIPTION OF THE PREFERRED EMBODIMENTS

First of all, [1] 1-butene based polymer, [2] its production method, [3] 1-butene based resin composition, [4] formed product and [5] 1-butene based resin reforming agent will be described in detail.

[1] 1-Butene Based Polymer 1-butene based polymer of the present invention is a polymer which meets following requirements (1) to (4), (1′) to (4′), (1″) to (4″) or (5) and (6) [heretofore, they may be called 1-butene based polymer (I), 1-butene based polymer (II), 1-butene based polymer (III), 1-butene based polymer (IV)]

(1) Crystalline resin having a melting point (Tm–D) in the range of 0 to 100° C., wherein the melting point is defined as a peak top of the peak observed in the highest temperature zone of the melting heat absorption curve obtained by heating a sample of the polymer at a rate of 10° C./minute using the Differential Scanning Calorimeter (DSC), after keeping the sample in advance at −10° C. for 5 minutes under nitrogen atmosphere.

(2) Stereoregularity index {(mmmm)/(mmrr)+(rmmr)} is at most 20.

(3) Molecular weight distribution (Mw/Mn) measured by Gel Permeation Chromatography (GPC) method is at most 4.0.

(4) Weight average molecular weight (Mw) measured by GPC method is in the range of 10,000 to 1,000,000.

(1′) Crystalline resin having melting point (T m), not observed or in the range of 0 to 100° C., wherein said melting point defined as the peak top of the maximum peak of the melting heat absorption curve obtained by heating a sample of said polymer at a rate of 10° C./minute using the Differential Scanning Calorimeter (DSC), after melting said sample in advance at 220° for 3 minutes under nitrogen atmosphere, followed by cooling it to −40° C. at a rate of 10° C./minute, and keeping it at −40° C. for 3 minutes.

(2′) Stereoregularity index {(mmmm)/(mmrr+rmmr)} is at most 20.

(3′) Molecular weight distribution (Mw/Mn) measured by Gel Permeation Chromatography (GPC) method is at most 4.0.

(4') Weight average molecular weight (Mw) measured by GPC method is 10,000 to 1,000,000.

(1") Crystalline resin having melting point (Tm–P), not observed or in the range of 0 to 100° C., wherein the melting point defined as the peak top of the peak observed in the highest temperature zone of the melting heat absorption curve obtained by heating a sample of the polymer at a rate of 10° C./minute using Differential Scanning Calorimeter (DSC), after melting the sample in advance at 190° for 5 minutes under nitrogen atmosphere, followed by cooling it to −10° C. at a rate of 5° C./minutes, and keeping it at −10° C. for 5 minutes.

(2") Stereoregularity index {(mmmm)/(mmrr+rmmr)} is at most 20.

(3") Molecular weight distribution (Mw/Mn) measured by Gel Permeation Chromatography (GPC) method is at most 4.0.

(4") Weight average molecular weight (Mw) measured by GPC method is in the range of 10,000 to 1,000,000.

(5) 1-butene homopolymer or 1-butene based copolymer obtained by copolymerizing 1-butene and ethylene and/or α-olefin having 3 to 20 carbon atoms (except 1-butene), which has at least 90 mol % of structural unit originated from 1-butene.

(6) Type II crystal fraction (CII) determined by X-ray diffraction analysis is at most 50%, wherein the analysis was made after melting a sample of the polymer in advance at 190° C. for 5 minutes and rapidly solidified by cooling it with ice water, followed by keeping it at room temperature for 1 hour.

In the present invention, the description that melting point (Tm) and melting point (Tm–P) are not observed by Differential Scanning Calorimeter means that the peak of heat release by crystal melting is not practically observed because crystallization rate is so slow at DSC measurement. In the present invention, crystalline resin is defined as a resin for which at least either one of the peak of above Tm, Tm–P, Tm–D is observed.

When 1-butene based polymer (I), (II) or (III) satisfy above relations (1) to (4), (1') to (4') or (1") to (4"), the formed product therefrom has a good balance between amount of sticky component in the formed product, low modulus of elasticity (or flexibility) and transparency. Namely, it has an advantage of having low modulus of elasticity and softness (or flexibility), reduced amount of sticky component, superior surface properties (for example, represented by a reduced bleed or transfer of sticky component to other products) as well as superior transparency. Moreover, 1-butene based polymer (IV) of the present invention, by satisfying above (5) and (6), has an advantage of avoiding property change in standing caused by crystal transformation, and therefore, avoiding shrinkage of the formed product.

In the present invention, mesopentad fraction (mmmm) and abnormal insertion content (1,4 insertion content) were determined according to the method proposed in "Polymer Journal, 16, 717 (1984)" reported by Asakura et al, "Macromol. Chem. Phys., C29, 201 (1989)" reported by J. Randall, and "Macromol. Chem.Phys.,198, 1257 (1997)" reported by V. Busico. Namely, by measuring signals of methylene group and methane group using $^{13}$C Nuclear-Magnetic Resonance spectrum, mesopentad fraction and abnormal insertion content in poly (1-butene) molecule were obtained.

Measurement of $^{13}$C Nuclear-Magnetic Resonance spectrum was conducted with following equipment and conditions:

Equipment; JNM-EX400 type $^{13}$C-NMR manufactured by JAPAN ELECTRON OPTICS LABORATORY CO., LTD.
Method: Proton complete de-coupling method
Concentration: 230 mg/ml
Solvent: Mixed solvent of 1,2,4-trichlorobenzene (90 vol %) and deuterio-benzene (10 vol %)
Temperature: 130° C.
Pulse width: 45°
Pulse repeating time: 4 seconds
Integration: 10000 times In the present invention, stereoregularity index {(mmmm)/(mmrr+rmmr)} was calculated by measuring (mmmm), (mmrr) and (rmmr) by the above method. Racemic triad fraction (rr) was also calculated by the above method.

[a] 1-Butene Homopolymer 1-butene homopolymer (I), (II) or (III) of the present invention has stereoregularity index {(mmmm)/(mmrr+rmmr)} at most 20, preferably at most 18, more preferably at most 15. If stereoregularity index exceeds 20, flexibility, low temperature heat sealing ability and hot tacking ability decrease.

1-butene homopolymer (I), (II) or (III) of the present invention, in addition to above requirements, has molecular weight distribution (Mw/Mn) at most 4, preferably at most 3.5, particularly preferred is at most 3.0. If molecular weight distribution (Mw/Mn) exceeds 4, sticking may occur.

1-butene homopolymer (I), (II) or (III) of the present invention, in addition to above requirements, has weight average molecular weight (Mw), measured by GPC method, of 10,000 to 1,000,000, preferably 100,000 to 1,000,000, more preferably 100,000 to 500,000. If Mw is less than 10,000, sticking may occur. If Mw exceeds 1,000,000, flexibility decreases, leading to a decrease in processability.

1-butene homopolymer (I), (II) or (III) of the present invention, in addition to above requirements, has hexane-soluble component at 25° C. (H25) of preferably 0 to 80 weight %, more preferably 0 to 60 weight %, most preferably 0 to 50 weight %. H25 is an index representing amount of sticky component which is a cause of stickiness and inferior transparency, and the higher this index, the more amount of sticky component. If H25 exceeds 80 weight %, blocking takes place due to a high amount of sticky component, and may not be used for foods and medical applications.

H25 is a weight loss ratio calculated by the following formula:

$$H25 = [(W_0 - W_1)/W_0] \times 100 \ (\%)$$

wherein, 0.9 to 1.1 g ($W_0$) of 1-butene homopolymer is dipped in 200 ml of hexane at 25° C. for at least 4 days, and the remaining weight ($W_1$) is measured after drying the polymer.

Above Mw/Mn is calculated from weight average molecular weight Mw and number average molecular weight Mn, converted to polystyrene equivalent, measured by GPC method using following equipment and conditions:
GPC Analyzer
Column: TOSO GMHHR-H(S)HT
Detector: RI detector for liquid chromatogram
WATERS 150C
Measuring conditions
Solvent: 1,2,4-trichlorobenzene
Temperature: 145° C.
Fluid velocity: 1.0 ml/min.

Sample concentration: 2.2 mg/ml
Amount of injection: 160 micro liter
Calibration line: Universal Calibration
Analysis program: HT-GPC (Ver. 1.0)

1-butene homopolymer (I) of the present invention, when Tm and Tm–P mentioned previously are not observed, it is necessary that the polymer is a crystalline resin having melting point (Tm–D) in the range of 0 to 100° C., preferably 0 to 80° C., as measured by Differential Scanning Calorimeter (DSC) because of its nature of a flexible resin. Tm–D is measured by DSC, namely, using Differential Scanning Calorimeter (PerkinElmer, DSC-7), melting point: Tm–D is defined as the peak top of the peak observed in the highest temperature zone of the melting heat absorption curve obtained by heating a sample of the polymer at a rate of 10° C./minute, after keeping 10 mg of sample in advance at –10° C. for 5 minutes under nitrogen atmosphere.

1-butene homopolymer (I) having above (1) to (4) structures of the present invention, in addition to above requirements, has melting heat absorption ΔH–D of at most 50 J/g for a superior flexibility, more preferably, at most 10 J/g. ΔH–D is an index of flexibility, and the higher this value is, the higher the modulus of elasticity, indicating lower flexibility. ΔH–D is measured by the method mentioned later.

1-butene homopolymer (II) of the present invention, from flexiblity point of view, has melting point (Tm) not observed by Differential Scanning Calorimeter (DSC), or it is a crystalline resin having Tm in the range of 0 to 100° C., preferably 0 to 80° C. Tm is measured by DSC. Namely, using Differential Scanning Calorimeter (PerkinElmer DSC-7), melting 10 mg of sample in advance at 220° C. for 3 minutes under nitrogen atmosphere, cooling it down to –40° C. at a rate of 10° C./minute, keeping it at –40° C. for 3 minutes, then heating it up at 10° C./minute rate for measurement of melting heat absorption curve in which peak top of the peak observed at the highest temperature zone is defined as melting point Tm.

1-butene homopolymer (II) of the present invention having above (1') to (4') structures, in addition to above requirements, is preferred to have melting heat absorption ΔH, measured by DSC, of at most 50 J/g for superior flexibility, more preferably at most 10 J/g. ΔH is an index indicating if the polymer is flexible or not, and the higher this value is, the higher the modulus of elasticity, meaning less flexible. ΔH is determined by the method described later.

Furthermore, 1-butene homopolymer (III) of the present invention, from flexiblity point of view, has melting point (Tm–P) not observed by Differential Scanning Calorimeter (DSC), or it is a crystalline resin having Tm–P in the range of 0 to 100° C., preferably 0 to 80° C. Tm–P is measured by DSC. Namely, using Differential Scanning Calorimeter (PerkinElmer DSC-7), melting 10 mg of sample in advance at 190° C. for 5 minutes under nitrogen atmosphere, cooling it down to –10° C. at 5° C./minute rate, keeping it at –10° C. for 5 minutes, then heating it up at 10° C./minute rate for measurement of the melting heat absorption curve in which peak top of the peak observed at the highest temperature zone is defined as melting point Tm–P.

1-butene homopolymer (III) of the present invention having above (1") to (4") structures, in addition to above requirements, is preferred to have melting heat absorption ΔH–P, measured by DSC, of at most 50 J/g for superior flexibility, more preferably less than 10 J/g. ΔH–P is an index indicating if the polymer is flexible or not, and the higher this value is, the higher the modulus of elasticity, meaning less flexible. ΔH–P is determined by the method described later.

1-butene homopolymer (I), (II) or (III) of the present invention preferably has mesopentad fraction (mmmm) of 20 to 90%, more preferably 30 to 85%, most preferably 30 to 80%. If the mesopentad fraction is less than 20%, stickiness on the surface of formed product, or decrease of transparency may occur. On the other hand, if it exceeds 90%, decrease in flexibility, in heat sealing capability at low temperature and in hot tack capability may occur.

1-butene homopolymer (I), (II) or (III) of the present invention preferably satisfies the relationship of (mmmm) ≦90–2×(rr), more preferably satisfies (mmmm)≦87–2×(rr). If it failed to satisfy it, there is a possibility of stickiness on the surface of the formed product, and decrease of transparency.

Moreover, 1-butene homopolymer (I), (II) or (III) of the present invention has 1,4 inserted content preferably at most 5%. If it exceeds 5%, the composition distribution of the polymer becomes wide, and may give an inferior influence on the properties.

1-butene homopolymer (IV) of the present invention, type II crystal fraction (CII) is at most 50%, preferably at most 20%, more preferably 0%, as measured by X-ray diffraction analysis after melting a sample of the polymer in advance at 190° C. for 5 minutes, and rapidly solidified by cooling it with ice water, followed by keeping it at room temperature for 1 hour.

In the present invention, type II crystal fraction (CII) was determined according to the method proposed by A. Turner Jones in [Polymer,7, 23 (1966)]. Namely, by X-ray diffraction analysis, measuring the peaks corresponding to type I crystal and type II crystal respectively, type II crystal fraction (CII) was obtained. X ray diffraction analysis (WAXD) was conducted using anti-cathode type Rotaflex RU-200 manufactured by RIGAKU DENKI CO.,LTD. under the following conditions;

Sample condition: melting sample at 190° C. for 5 minutes, cooling it rapidly by ice-water and leave it at room temperature for 1 hour
Output: 30 kV, 200 mA
Detector: PSPC (Position Sensitive Proportional Counter)
Integration time: 200 seconds 1-butene homopolymer (IV) of the present invention, in addition to above requirements, as requirement (7), has weight average molecular weight (Mw), measured by GPC method, preferably 10,000 to 1,000,000, more preferably 100,000 to 1,000,000, and further preferably 100,000 to 500,000. If Mw is less than 10,000, stickiness may occur. If Mw exceeds 1,000,000, fluidity decreases causing inferior processability. Measurement method of Mw/Mn and Mw are the same as described before.

1-butene homopolymer (I), (II), (III) or (IV) of the present invention has tensile modulus of elasticity preferably at most 500 MPa measured by tensile tester according to JIS K-7113, more preferably at most 300 MPa. If it exceeds 500 MPa, sufficient flexibility may not be obtained.

[a']1-Butene Based Copolymer 1-butene based copolymer of the present invention is a copolymer of 1-butene and ethylene and/or α-olefin having 3 to 20 carbon atoms (except 1-butene), satisfying above mentioned requirements of (1) to (4), (1') to (4'), (1") to (4") or (5) and (6) [heretofore, they may be called as 1-butene based copolymer (I), 1-butene based copolymer (II), 1-butene based copolymer (III), 1-butene based copolymer (IV)], and preferably a copolymer of 1-butene and α-olefin having 3 to 20 carbon atoms.

1-butene copolymer (I), (II) or (III) of the present invention is preferably a random copolymer. Moreover, structural unit originated from 1-butene is preferably at least 90 mol %, more preferably at least 95 mol %. If structure unit originated from 1-butene is less than 90 mol %, sticky surface of formed product and decrease in transparency may occur.

Furthermore, stereoregularity index {(mmmm)/(mmrr+rmmr)} obtained from (mmmm) ratio and (mmrr+rmmr) ratio of 1-butene chain part must be at most 20, preferably at most 18, more preferably at most 15. If stereoregularity index exceeds 20, decrease in flexibility, decrease in sealing capability and decrease in hot tack capability may occur.

1-butene based copolymer (I), (II), or (III) of the present invention has molecular weight distribution (Mw/Mn), measured by Gel Permeation Chromatography (GPC), of at most 4.0, preferably at most 3.5, more preferably at most 3.0. If molecular weight distribution (Mw/Mn) exceeds 4, stickiness may occur.

1-butene based copolymer (I), (II) or (III) of the present invention has weight average molecular weight (Mw), measured by GPC method, of 10,000 to 1,000,000, preferably 100,000 to 1,000,000, more preferably 100,000 to 500,000. If weight average molecular weight is less than 10,000, stickiness may occur, and if it exceeds 1,000,000, fluidity decreases causing inferior processability. Measurement method of above Mw/Mn and Mw are the same as described before.

1-butene based copolymer (I), (II) or (III) of the present invention has hexane-soluble component at 25° C. (H25) preferably 0 to 80 weight %, more preferably 0 to 60 weight %, most preferably 0 to 50 weight %. H25 is an index of amount of sticky component, higher value of H25 means higher amount of sticky component. If it exceeds 80 weight %, blocking occurs due to high amount of sticky component, and may not be used for foods and medical applications. Measurement method of H25 is the same as described before.

1-butene based copolymer (II) or (III) of the present invention is required to have melting point (Tm) or (Tm–P) not observed by Differential Scanning Calorimeter (DSC) or in the range of 0 to 100° C. from flexibility point of view, preferably 0 to 80° C. When melting point (Tm) and (Tm–P) are not observed, it is necessary for [1-butene based copolymer (I)] to have melting point (Tm–D) of 0 to 100° C., preferably 0 to 80° C. Tm, Tm–P, and Tm–D are obtained by above mentioned DSC measurement.

1-butene based copolymer (I), (II) or (III) of the present invention, a random index R, described below, obtained from α-olefin chain is preferably at most 1;

$$R=4[\alpha\alpha][BB]/[\alpha B]^2$$

wherein, [αα] represents α-olefin chain fraction, [BB] represents butene chain fraction, [αB] represents α-olefin-butene chain fraction.

R is a random index, the smaller the R, α-olefin (co-monomer) is more isolated, and the composition becomes more homogeneous. R is preferably at most 0.5, more preferably at most 0.2. When R is 0, there is no αα chain and the α-olefin chain is only a completely isolated chain.

When 1-butene based copolymer (I), (II) or (III) previously mentioned is a ethylene-butene copolymer, butene content and R were measured by the following method:

Butene content and R were calculated by the following method based on $^{13}$C-NMR spectrum measured by using JNM-EX400 type NMR equipment manufactured by JAPAN ELECTRON OPTICS LABORATORY CO., LTD. under the following conditions:

Sample concentration: 220 mg/NMR solution 3 ml
NMR solution: 1,2,4-trichlorobenzene/benzene-d6 (90/10 vol %)
Measuring temperature: 130° C.
Pulse width: 45°
Pulse repeating time: 10 seconds
Integration: 4000 times Under the above conditions, with respect to EE, EB, BB chain, EE, EB, BB diad chain fraction in the copolymer molecular chain were determined by measuring Sαα carbon signal of $^{13}$C Nuclear Magnetic Resonance Spectrum according to the method proposed by E. T. Hsieh and J. C. Randall in Macromolecules, 1982, 15, 353–336. From each determined diad chain fraction (mol %), butene content and random index R were obtained;

$$\text{Butene content (mol \%)}=[BB]+[EB]/2$$

$$\text{Random index } R=4[EE][BB]/[EB]^2$$

wherein [EE] represents ethylene chain fraction, [BB] represents butene chain fraction, [EB] represents ethylene-butene chain fraction.

Stereoregularity index was measured by above mentioned method. Especially, in ethylene-butene copolymer, as (rmmr+mmrr) peak overlaps with side chain methylene carbon originated from BEE chain, peak intensity of (rmmr+mmrr) was corrected by subtracting Tαδ carbon peak component of 37.5 to 37.2 from overlapping intensity of (rmmr+mmrr) peak plus side chain carbon peak originated from BEE chain.

Butene content and R, when aforementioned 1-butene based copolymer (I), (II) or (III) is a propylene-butene copolymer, were measured as follows:

Butene content and R were calculated by the following method based on the measurement of $^{13}$C-NMR spectrum using JNM-EX400 type NMR equipment manufactured by JAPAN ELECTRON OPTICS LABORATORY CO., LTD. under the following conditions:

Sample concentration: 220 mg/NMR solution 3 ml
NMR solution: 1,2,4-trichlorobenzene/benzene-d6 (90/10 vol %)
Measuring temperature: 130° C.
Pulse width: 45°
Pulse repeating time: 10 seconds
Integration: 4000 times.

Under above conditions, with respect to PP, PB, BB chain, PP, PB, BB diad chain fraction in the copolymer molecular chain were determined by measuring Sαα carbon signal of $^{13}$C Nuclear Magnetic Resonance Spectrum according to the method proposed by J. C. Randall in Macromolecules, 1978, 11, 592. From each determined diad chain ratio (mol %), butene content and random index R were obtained;

$$\text{Butene content (mol \%)}=[BB]+[PB]/2$$

$$\text{Random index } R=4[PP][BB]/[PB]^2$$

wherein [PP] represents propylene chain fraction, [BB] represents butene chain fraction, [PB] represents propylene-butene chain fraction.

Butene content and R, when aforementioned 1-butene based copolymer (I), (II) or (III) is an octene-butene copolymer, were measured as follows:

Butene content and R were calculated by the following method based on the measurement of $^{13}$C-NMR spectrum using JNM-EX400 type NMR equipment manufactured by JAPAN ELECTRON OPTICS LABORATORY CO., LTD. under the following conditions:

Sample concentration: 220 mg/NMR solution 3 ml
NMR solution: 1,2,4-trichlorobenzene/benzene-d6 (90/10 vol %)
Measuring temperature: 130° C.
Pulse width: 45°
Pulse repeating time: 10 second
Integration: 4000 times.

Under above conditions, OO, OB, BB diad chain fractions in the copolymer molecular chain were determined by measuring Sαα carbon signal of $^{13}$C Nuclear Magnetic Resonance Spectrum, and from the height of peak originated from BB chain observed in 40.8 to 40.0 ppm, peak originated from OB chain observed in 41.3 to 40.8 ppm, and peak from OO chain observed in 42.5 to 41.3 ppm. From each determined diad chain fraction (mol %), butene content and random index R were obtained;

Butene content (mol %)=[BB]+[OB]/2

Random index $R=4[OO][BB]/[OB]^2$ wherein [OO] represents octene chain fraction, [BB] represents butene chain fraction, [OB] represents octene-butene chain fraction.

1-butene based copolymer (IV) of the present invention has at least 90 mol % of structural unit originated from 1-butene, more preferably at least 95 mol %. [1-butene based copolymer (IV) is preferably homopolymer].

1-butene based copolymer (IV) of the present invention has type II crystal fraction (CII) at most 50%, preferably at most 20%, more preferably 0%, as measured by X ray diffraction analysis after melting a sample of the polymer in advance at 190° C. for 5 minutes, and rapidly solidified by cooling with ice water, followed by keeping it at room temperature for 1 hour. Measurement method of type II crystal fraction (CII) is the same as described before.

1-butene copolymer (IV) of the present invention, in addition to above requirement, has requirement (7) that the weight average molecular weight (Mw) measured by GPC method is preferably 10,000 to 1,000,000. This weight average molecular weight is more preferably 100,000 to 1,000,000, further more preferably 100,000 to 500,000. If Mw is less than 10,000, stickiness may occur. If it exceeds 1,000,000, fluidity may decrease causing inferior processability. Measurement method of above mentioned Mw/Mn and Mw are the same as described before.

For 1-butene based copolymer of the present invention, examples of α-olefin having 3 to 20 carbon atoms include propylene, 1-pentene, 4-methyl-1-pentene, 1-hexene, 1-octene, 1-decene, 1-dodecene, 1-tetradecene, 1-hexadecene, 1-octadecene, 1-eicocene, of which one or two kinds or more can be used.

Moreover, 1-butene based copolymer has tensile modulus of elasticity preferably at most 500 MPa, more preferably at most 300 MPa, as measured by tensile tester according to JIS K-7113. If it exceeds 500 MPa, enough flexibility may not be obtained.

[2] Production Method of 1-Butene Homopolymer (a) and 1-Butene Based Copolymer (a')

For production of 1-butene homopolymer (a) and 1-butene based copolymer (a') of the present invention, method of polymerizing only 1-butene, or copolymerizing 1-butene and ethylene and/or α-olefin having 3 to 20 carbon atoms (except 1-butene), using catalyst called metallocene catalyst, are employed. The metallocene catalyst include catalysts obtained by combination of a transition metal compound having one or two ligands such as a cyclopentadienyl group, a substituted cyclopentadienyl group, an indenyl group, a substituted indenyl group as described in Japanese Patent Applications Laid-Open No.s 58-19309, 61-130314, 3-163088, 4-300887, 4-211694 and 1-502036, with transition metal compounds in which the ligands are geometrically controlled, and a promoter.

In the present invention, among metallocene catalysts, the catalysts composed of a transition metal compound with ligands forming cross-linked structure through cross-linking group is preferred, particularly more preferable is to polymerize 1-butene alone or copolymerize 1-butene and ethylene and/or α-olefin having 3 to 20 carbon atoms (except 1-butene) using metallocene catalyst obtained by combination of a transition metal compound forming cross-linked structure through two cross-linking group and a promoter. For example, polymerizing 1-butene alone or copolymerizing 1-butene and ethylene and/or α-olefins having 3 to 20 carbon atoms (except 1-butene) in the presence of polymerization catalyst containing (A) a transition metal compound represented by the general formula (I),

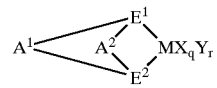

(1)

wherein, M represents a metallic element in the groups 3 to 10 or in lanthanoide series of the periodic table; each of $E^1$ and $E^2$ represents respectively a ligand selected from a substituted cyclopentadienyl group, an indenyl group, a substituted indenyl group, a heterocyclopentadienyl group, a substituted heterocyclopentadienyl group, an amide group, a phosphide group, a hydrocarbon group and a silicon containing group, forming a cross-linked structure through $A^1$ and $A^2$, $E^1$ and $E^2$ may be the same or different; X represents a σ-bonding ligand, and when X is plural, they may be the same or different with each other; and may be cross-linked with other X, $E^1$, $E^2$ or Y; Y represents a Lewis base, and when Y is plural, they may be the same or different with each other, and may be cross-linked with other Y, $E^1$, $E^2$ or X; $A^1$ and $A^2$ are bivalent cross-linking group for bonding two ligands, representing a hydrocarbon group having 1 to 20 carbon atoms, a halogenated hydrocarbon group having 1 to 20 carbon atoms, a silicon containing group, a germanium containing group, a tin containing group, —O—, —CO—, —S—, —SO$_2$—, —Se—, —NR$^1$—, —PR$^1$—, —P(O)R$^1$—, —BR$^1$— or —AlR$^1$—; R$^1$ represents hydrogen atom, a halogen atom, a hydrocarbon group having 1 to 20 carbon atoms or a halogen containing hydrocarbon group having 1 to 20 carbon atoms, R$^1$ may be the same or different with each other; q is an integer of 1 to 5 representing [(the valence of M)−2]; r is an integer of 0 to 3; and (B) (B-1) a compound capable of forming an ionic complex by reacting with the transition metal compound (A) or its derivative, and (B-2) aluminoxane.

In the general formula (I) above, M represents a metallic element in the group 3 to 10 or lamthanoide series in the periodic table, for example titanium, zirconium, hafnium, yttrium, vanadium, chrome, manganese, nickel, cobalt, palladium, and lanthanide series metals, of which titanium, zirconium and hafnium are preferred in view of olefin polymerization activity. Each of $E^1$ and $E^2$ respectively represents ligand selected from a substituted cyclopentadienyl group, an indenyl group, a substituted indenyl group, a heterocyclopentadienyl group, a substituted heterocyclopentadienyl group, an amide group (—N<), a phosphine group (—P<), hydrocarbon group [>CR—, >C<] and a silicon containing group [>SiR—, >Si<] (wherein R represents hydrogen or hydrocarbon group having 1 to 20 carbon atoms or heteroatom containing group), and through $A^1$ and $A^2$ forms cross-linked structure. $E^1$ and $E^2$ may be the same or different with each other. As $E^1$ and $E^2$, a substituted cyclopentadienyl group, an indenyl group and a substituted indenyl group are preferred.

X represents σ-bonding ligand. If X is plural, X may be the same or different with each other, and may form cross-link with other X, $E^1$, $E^2$, or Y. Examples of the X includes halogen atom, a hydrocarbon group having 1 to 20 carbon atoms, an alkoxy group having 1 to 20 carbon atoms, an aryloxy group having 1 to 20 carbon atoms, an amide group having 1 to 20 carbon atoms, a silicon containing group having 1 to 20 carbon atoms, a phosphide group having 1 to 20 carbon atoms, a sulfide group having 1 to 20 carbon atoms, an acyl group having 1 to 20 carbon atoms. On the other hand, Y represents Lewis base. If Y is plural, Y may be the same or different with each other, and may form cross-link with other Y, $E^1$, $E^2$ or X. Examples of the Y, Lewis base, include amines, ethers, phosphines, thioethers.

$A^1$ and $A^2$ are bivalent cross-linking group bonding two ligands, representing a hydrocarbon group having 1 to 20 carbon atoms, a halogen containing hydrocarbon group having 1 to 20 carbon atoms, a silicon containing group, a germanium containing group, a tin containing group, —O—, —CO—, —S—, —SO$_2$—, —Se—, —NR$^1$—, —PR$^1$—, —P(O)R$^1$—, —BR$^1$— or —AlR$^1$—, where $R^1$ represents hydrogen, halogen atom or hydrocarbon group having 1 to 20 carbon atoms, halogen containing hydrocarbon group having 1 to 20 carbon atoms, which may be the same or different with each other. Examples of such cross linking group include those represented by general formula below;

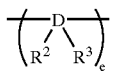

wherein, D represents carbon, silicon or tin, each of $R^2$ and $R^3$ represents hydrogen atom or a hydrocarbon group having 1 to 20 carbon atoms, which may be the same or different with each other, or may form cyclic structure by bonding with each other. e is an integer of 1 to 4; such as methylene group, ethylene group, ethylidene group, propylidene group, isopropylidene group, cyclohexylidene group, 1,2-cyclohexylene group, vinylidene group (CH$_2$=C=) dimethylsilylene group, diphenylsilylene group, methylphenylsilylene group, dimethylgermilene group, dimethylstannylene group, tetramethyldisilylene group, diphenyldisilylene group, among which ethylene group, isopropylidene group and dimethylsilylene group are preferred. q is an integer of 1 to 5 which is equal to [(valence of M)-2], r is an integer of 0 to 3.

Among such transition metal compounds represented by the formula (I), transition metal compound having double cross-linked biscyclopentadienyl derivative as ligand represented by general formula (II) is preferred.

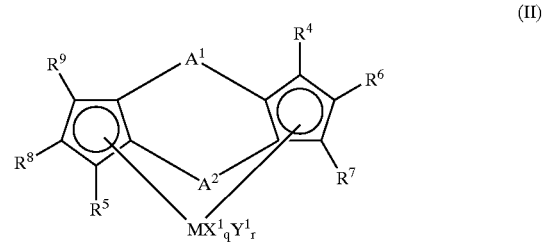

In above general formula (II), M, $A^1$, $A^2$, q and r are the same as described above. $X^1$ represents σ-bonding ligand, if $X^1$ is plural, $X^1$ may be the same or different with each other, or may be cross-linked with $X^1$ or $Y^1$. Examples of this $X^1$ are the same as the examples described for X in the general formula (I). $Y^1$ represents Lewis base, and if $Y^1$ is plural, $Y^1$ may be the same or different with each other, or may be cross-linked with other $Y^1$ or $X^1$. Examples of this $Y^1$ are the same as the examples described for Y in the general formula (I). Each of $R^4$ to $R^9$ represents hydrogen atom, halogen atom, a hydrocarbon group having 1 to 20 carbon atoms, a halogen containing hydrocarbon group having 1 to 20 carbon atoms, a silicon containing group or a heteroatom containing group, but at least one of which is different from hydrogen atom. Moreover, $R^4$ to $R^9$ may be the same or different with each other, and may form a ring by bonding with each adjacent group. Especially it is preferable that $R^6$ and $R^7$ form a ring, and $R^8$ and $R^9$ form a ring. As $R^4$ and $R^5$, a group containing heteroatom such as oxygen, halogen, silicon is preferred because of its high polymerization activity.

The transition metal compound with this double cross-linked bicyclopentadienyl derivative as ligand preferably contain silicone in the cross-linking group between the ligands.

Examples of transition metal compounds represented by general formula (I) include (1,2'-ethylene)(2,1'-ethylene) bis(indenyl) zirconium dichloride, (1,2'-methylene)(2,1'-methylene)-bis(indenyl) zirconium dichloride, (1,2'-isopropylidene) (2,1'-isopropylidene)-bis(indenyl) zirconium dichloride, (1,2'-ethylene)(2,1'-ethylene)-bis(3-methylindenyl) zirconium dichloride, (1,2'-ethylene)(2,1'-ethylene)-bis(4,5-benzoindenyl) zirconium dichloride, (1,2'-ethylene)(2,1'-ethylene)-bis(4-isopropylindenyl) zirconium dichloride, (1,2'-ethylene)(2,1'-ethylene)-bis(5,6-dimethylindenyl) zirconium dichloride, (1,2'-ethylene)(2,1'-ethylene)-bis(4,7-diisopropylindenyl) zirconium dichloride, (1,2'-ethylene)(2,1'-ethylene)-bis(4-phenylindenyl) zirconium dichloride,(1,2'-ethylene)(2,1'-ethylene)-bis(3-methyl-4-isopropylindenyl) zirconium dichloride, (1,2'-ethylene)(2,1'-ethylene)-bis(5,6-benzoindenyl) zirconium dichloride, (1,2'-ethylene)(2,1'-isopropylidene)-bis(indenyl) zirconium dichloride, (1,2'-methylene)(2,1'-ethylene)-bis(indenyl) zirconium dichloride, (1,2'-methylene)(2,1'-isopropylidene)-bis-(indenyl) zirconium dichloride, (1,2'-dimethylsilylene) (2,1'-dimethylsilylene) bis(indenyl) zirconium dichloride, (1,2'-dimethylsilylene)(2,1'-dimethylsilylene) bis (3-methylindenyl) zirconium dichloride, (1,2'-dimethylsilylene)(2,1'-dimethyl-silylene) bis(3-n-butylindenyl) zirconium dichloride, (1,2'-dimethyl silylene)(2,1'-dimethylsilylene) bis(3-i-propylindenyl) zirconium dichloride, (1,2'-dimethylsilylene)(2,1'-dimethylsilylene) bis(3-trimethylsilylmethylindenyl) zirconium dichloride, (1,2'-dimethylsilylene)(2,1'-dimethylsilylene) bis(3-phenylindenyl) zirconium dichloride, (1,2'-dimethylsilylene)(2,1'-dimethylsilylene) bis(4,5- benzoindenyl) zirconium dichloride, (1,2'-dimethylsilylene)(2,1'-dimethylsilylene) bis(4-isopropylindenyl) zirconium dichloride,(1,2'-dimethylsilylene)(2,1'-dimethylsilylene) bis(5,6-dimethylindenyl) zirconium dichloride, (1,2'-dimethylsilylene)(2,1'-dimethylsilylene) bis(4,7-di-i-propylindenyl) zirconium dichloride, (1,2'-dimethylsilylene)(2,1'-dimethylsilylene) bis(4-phenylindenyl) zirconium dichloride, (1,2'-dimethylsilylene)(2,1'-dimethylsilylene) bis(3-methyl-4-i-propylindenyl) zirconium dichloride, (1,2'-dimethylsilylene)(2,1'-dimethylsilylene)bis(5,6-benzoindenyl) zirconium dichloride, (1,2'-dimethylsilylene)(2,1'-isopropylidene)-bis(indenyl) zirconium dichloride, (1,2'-dimethylsilylene)(2,1'-isopropylidene)-bis(3-methylindenyl) zirconium dichloride, (1,2'-dimethylsilylene)(2,1'-isopropylidene)-bis(3-i-propylindenyl) zirconium dichloride, (1,2'-dimethylsilylene)(2,1'-isopropylidene)-bis(3-n-butylindenyl) zirconium dichloride, (1,2'-dimethylsilylene)(2,1'-isopropylidene)-bis(3-trimethylsilylmethylindenyl) zirconium dichloride, (1,2'-dimethylsilylene)(2,1'-isopropylidene)-bis(3-trimethylsilylindenyl) zirconium dichloride, (1,2'-dimethylsilylene)(2,1'-isopropylidene)-bis(3-phenylindenyl) zirconium dichloride,(1,2'-dimethylsilylene)(2,1'-methylene)-bis(indenyl) zirconium dichloride, (1,2'-dimethylsilylene)(2,1'-methylene)-bis(3-methylindenyl) zirconium dichloride, (1,2'-dimethylsilylene)(2,1'-methylene)-bis(3-i-propylindenyl) zirconium dichloride, (1,2'-dimethylsilylene)(2,1'-methylene)-bis(3-n-butylindenyl) zirconium dichloride, (1,2'-dimethylsilylene)(2,1'-methylene)-bis(3-trimethylsilylmethylindenyl) zirconium dichloride, (1,2'-dimethylsilylene)(2,1'-methylene)-bis(3-trimethylsilylindenyl) zirconium dichloride, (1,2'-diphenylsilylene)(2,1'-methylene)-bis(indenyldiphenylsilylene) zirconium dichloride, (1,2'-diphenylsilylene)(2,1'-methylene)-bis(3-methylindenyl) zirconium dichloride, (1,2'-diphenylsilylene)(2,1'-methylene)-bis(3-i-propylindenyl) zirconium dichloride, (1,2'-diphenylsilylene) (2,1'-methylene)-bis(3-n-butylindenyl) zirconium dichloride, (1,2'-diphenylsilylene) (2,1'-methylene)-bis(3-trimethylsilylmethylindenyl) zirconium dichloride, (1,2'-diphenylsilylene)(2,1'-methylene)-bis(3-trimethylsilylindenyl) zirconium dichloride, (1,2'-dimethylsilylene)(2,1'-dimethylsilylene)(3-methylcyclopentadienyl)(3'-methylcyclopentadienyl) zirconium dichloride, (1,2'-dimethylsilylene)(2,1'-isopropylidene)(3-methylcyclopentadienyl)(3'-methylcyclopentadienyl) zirconium dichloride, (1,2'-dimethylsilylene)(2,1'-ethylene)(3-methylcyclopentadienyl)(3'-methylcyclopentadienyl) zirconium dichloride, (1,2'-ethylene)(2,1'-methylene)(3-methylcyclopentadienyl)(3'-methylcyclopentadienyl) zirconium dichloride, (1,2'-ethylene)((2,1'-isopropylidene)(3-methylcyclopentadienyl)(3'-methylcyclopentadienyl) zirconium dichloride, (1,2'-methylene)(2,1'-methylene)(3-methylcyclopentadienyl)(3'-methylcyclopentadienyl) zirconium dichloride, (1,2'-methylene)(2,1'-isopropylidene)(3-methylcyclopentadienyl)(3'-methylcyclopentadienyl) zirconium dichloride, (1,2'-isopropylidene)(2,1'-isopropylidene) (3-methyl-cyclopentadienyl)(3'-methylcyclopentadienyl) zirconium dichloride, (1,2'-dimethylsilylene)(2,1'-dimethylsilylene)(3,4-dimethylcyclopentadienyl)(3',4'-dimethylcyclopentadienyl) zirconium dichloride, (1,2'-dimethylsilylene)(2,1'-isopropylidene)(3,4-dimethylcyclopentadienyl)(3',4'-dimethylcyclopentadienyl) zirconium dichloride, (1,2'-dimethylsilylene)(2,1'-ethylene)(3,4-dimethylcyclopentadienyl)(3',4'-dimethylcyclopentadienyl) zirconium dichloride, (1,2'-ethylene)(2,1'-methylene)(3,4-dimethylcyclopentadienyl)(3',4'-dimethyl-cyclopentadienyl) zirconium dichloride, (1,2'-ethylene)(2,1'-isopropylidene)(3,4-dimethylcyclopentadienyl)(3',4'-dimethylcyclopentadienyl) zirconium dichloride, (1,2'-methylene)(2,1'-methylene)(3,4-dimethylcyclopentadienyl)(3',4'-dimethyl-cyclopentadienyl) zirconium dichloride, (1,2'-methylene)(2,1'-isopropylidene)(3,4-dimethylcyclopentadienyl)(3',4'-dimethylcyclopentadienyl) zirconium dichloride, (1,2'-isopropylidene)(2,1'-isopropylidene)(3,4-dimethylcyclopentadienyl)(3',4'-dimethylcyclopentadienyl) zirconium dichloride, (1,2'-dimethylsilylene)(2,1'-dimethylsilylene)(3-methyl-5-ethylcyclopentadienyl)(3'-methyl-5'-ethylcyclopentadienyl) zirconium dichloride, (1,2'-dimethylsilylene)(2,1'-dimethylsilylene)(3-methyl-5-ethylcyclopentadienyl)(3'-methyl-5'-ethylcyclopentadienyl) zirconium dichloride, (1,2'-dimethylsilylene)(2,1'-dimethylsilylene)(3-methyl-5-isopropyl-cyclopentadienyl)(3'-methyl-5'-isopropylcyclopentadienyl) zirconium dichloride, (1,2'-dimethylsilylene) (2,1'-dimethylsilylene)(3-methyl-5-n-butylcyclopentadienyl) (3'-methyl-5'-n-butylcyclopentadienyl) zirconium dichloride, (1,2'-dimethylsilylene)(2,1'-dimethylsilylene)(3-methyl-5-phenylcyclopentadienyl)(3'-methyl-5'-phenylcyclopentadienyl) zirconium dichloride, (1,2'-dimethylsilylene)(2,1'-isopropylidene)(3-methyl-5-ethylcyclopentadienyl)(3'-methyl-5'-ethylcyclopentadienyl) zirconium dichloride, (1,2'-dimethylsilylene)(2,1'-isopropylidene)(3-methyl-5-i-propylcyclopentadienyl)(3'-methyl-5'-i-propylcyclopentadienyl) zirconium dichloride, (1,2'-dimethylsilylene)(2,1'-isopropylidene)(3-methyl-5-n-butylcyclo-pentadienyl)(3'-methyl-5'-n-butylcyclopentadienyl) zirconium dichloride, (1,2'-dimethylsilylene)(2,1'-isopropylidene)(3-methyl-5-butylcyclo-pentadienyl)(3'-methyl-5'-butylcyclopentadienyl) zirconium dichloride, (1,2'-dimethylsilylene)(2,1'-ethylene)(3-methyl-5-ethylcyclopentadienyl)(3'-methyl-5'-ethylcyclopentadienyl) zirconium dichloride, (1,2'-diemthylsilylene)(2,1'-ethylene)(3-methyl-5-i-propylcyclopentadienyl)(3'-methyl-5'-i-propylcyclopentadienyl) zirconium dichloride, (1,2'-dimethylsilylene)(2,1'-ethylene)(3-methyl-5-n-butyl-cyclopentadienyl)(3'-methyl-5'-n-butylcyclopentadienyl) zirconium dichloride, (1,2'-dimethylsilylene)(2,1'-ethylene)(3-methyl-5-phenylcyclopentadienyl)(3'-methyl-5'-phenylcyclopentadienyl) zirconium dichloride, (1,2'-dimethylsilylene) (2,1'-methylene)(3-methyl-5-ethylcyclopentadienyl)(3'-methyl-5'-ethylcyclopentadienyl) zirconium dichloride, (1,2'-dimethylsilylene)(2,1'-methylene)(3-methyl-5-i-propylcyclopentadienyl)(3'-methyl-5'-i-propylcyclopentadienyl) zirconium dichloride, (1,2'-dimethylsilylene)(2,1'-methylene)(3-methyl-5-n-butylcyclopentadienyl)(3'-methyl-5'-n-butylcyclopentadienyl) zirconium dichloride, (1,2'-dimethylsilylene)(2,1'-methylene)(3-methyl-5-phenylcyclopentadienyl)(3'-methyl-5'-phenylcyclopentadienyl)(3'-methyl-5'-phenylcyclopentadienyl) zirconium dichloride, (1,2'-ethylene)(2,1'-methylene)(3-methyl-5-i-propyl cyclopentadienyl)(3'-methyl-5'-i-propylcyclopentadienyl) zirconium dichloride, (1,2'-ethylene)(2,1'-isopropylidene)(3-methyl-5-i-propylcyclopentadienyl)(3'-methyl-5'-propyl-i-propylcyclopentadienyl) zirconium dichloride, (1,2'-methylene)(2,1'-methylene)(3-methyl-5-i-propylcyclopentadienyl)(3'-methyl-5'-propyl-i-propylcyclopentadienyl) zirconium dichloride, (1,2'-methylene) (2,1'-isopropylidene) (3-methyl-5-i-propylcyclopentadienyl)(3'-methyl-5'-i-propylcyclopentadienyl) zirconium a dichloride, (1,1'-dimethylsilylene)(2,2'-dimethylsilylene) bis(indenyl) zirconium dichloride, (1,1'-diphenylsilylene)(2,2'- dimethylsilylene) bis(indenyl) zirconium dichloride, (1,1'-dimethylsilylene)(2,1'-dimethylsilylene) bis(indenyl) zirconium dichloride, (1,1'-diisopropylsilylene)(2,2'-dimethylsilylene) bis(indenyl) zirconium dichloride, (1,1'-dimethylsilylene)(2,2'-diisopropylsilylene) bis(indenyl) zirconium dichloride, (1,1'-dimethylsilylene) (2,2'-dimethylsilylene)(indenyl)(3-trimethylsilylindenyl) zirconium dichloride, (1,1'-diphenylsilylene) (2,2'-dimethylsilylene)(indenyl)(3-trimethylsilyl-indenyl) zirconium dichloride, (1,1'-diphenylsilylene) (2,2'-dimethylsilylene)(indenyl)(3-trimethylsilyl-indenyl) zirconium dichloride, (1,1'-dimethylsilylene) (2,2'-dimethylsilylene)(indenyl)(3-trimethylsilylindenyl) zirconium dichloride, (1,1'-diisopropylsilylene) (2,2'-dimethylsilylene)(indeyl)(3-trimethylsilyndenyl) zirconium dichloride, (1,1'-dimethylsilylene)(2,2'-diisopropylsilylene)(indenyl)(3-trimethylsilylindenyl) zirconium dichloride, (1,1'-diisopropylsilylene)(2,2'-diisopropylsilylene)(indenyl)(3-trimethylsilylindenyl) zirconium dichloride, (1,1'-dimethylsilylene)(2,2'-dimethylsilylene)(indenyl)(3-trimethylsilylmethylindenyl) zirconium dichloride, (1,1'-diphenylsilylene)(2,2'-diphenylsilylene)(indenyl)(3-trimethylsilylmethylindenyl) zirconium dichloride, (1,1'-diphenylsilylene)(2,2'-dimethylsilylene)(indenyl)(3-trimethylsilylmethylindenyl) zirconium dichloride, 1,1'-dimethylsilylene)(2,2'-diphenylsilylene)(indenyl)(3-trimethylsilylmethylindenyl) zirconium dichloride, (1,1'-diisopropylsilylene)(2,2'-dimethylsilylene)(indenyl)(3-trimethylmethylsilylindenyl) zirconium dichloride, (1,1'-dimethylsilylene)(2,2'-diisopropylsilylene)(indenyl)(3-trimethylmethylsilylindenyl) zirconium dichloride, 1,1'-diisopropylsilylene)(2,2'-diisopropylsilylene)(indenyl)(3-trimethylmethylsilylindenyl) zirconium dichloride, and those compounds in which zirconium is substituted with titanium or hafnium. Transition metal compounds represented by formula (I) is, of course, not limited to above examples. It may be a similar compound of the metal in the other Group or in lanthanoide series. Moreover, in above compounds, (1,1'-)(2,2'-) may be (1,2'-)(2,1'-), and (1,2'-)(2, 1'-) may be (1,1'-)(2,2'-).

Next, for (B-1) component in (B) component, any compound which can form ionic complex by reacting with transition metal compound (A) described above, may be employed, but the compound represented by the following general formula (III),(IV) may be preferably used;

    (III)

    (IV)

wherein $L^2$ is $M^2$, $R^{11}R^{12}M^3$, $R^{13}{}_3C$ or $R^{14}M^3$.

In the formula (III) and (IV), $L^1$ is a Lewis base, $[Z]^-$ is a non-coordinating anion $[Z^1]^-$ and $[Z^2]^-$, where $[Z^1]^-$ is an anion in which plural groups are bonded to a chemical element, namely, $[M^1G^1G^2 \ldots G^f]^-$ (wherein, $M^1$ represents a chemical element in the group 5 to 15 in the periodic table, preferably in the group 13 to 15. Each of $G^1$ to $G^f$ is respectively hydrogen atom, halogen atom, an alkyl group having 1 to 20 carbon atoms, a dialkylamino group having 2 to 40 carbon atoms, an alkoxy group having 1 to 20 carbon atoms, an allyl group having 6 to 20 carbon atoms, an allyloxy group having 6 to 20 carbon atoms, an alkylallyl group having 7 to 40 carbon atoms, an allylalkyl group having 7 to 40 carbon atoms, a halogen substituted hydrocarbon group having 1 to 20 carbon atoms, an acyloxy group having 1 to 20 carbon atoms, an organic metaloid group, or a heteroatom containing hydrocarbon group having 2 to 20 carbon atoms. Tow or more of $G^1$ to $G^f$ may form ring. f is an integer of [(valence of center metal $M^1$)+1]), $[Z^2]^-$ is a conjugate base of Brønsted acid alone or combination of Brønsted acid and Lewis acid of which logarithm of reciprocal of acid dissociation constant (pKa) is at most −10, or a conjugate base of an acid which is generally defined as superstrong acid. Lewis base may be coordinated. $R^{10}$ represents hydrogen atom, an alkyl group having 1 to 20 carbon atoms, an allyl group having 6 to 20 carbon atoms, an alkylallyl group or an allylalkyl group, each of $R^{11}$ and $R^{12}$ respectively represents a cyclopentadienyl group, a substituted cyclopentadienyl group, an indenyl group, or a fluorenyl group, $R^{13}$ represents an alkyl group having 1 to 20 carbon atoms, an allyl group, an alkylallyl group or an allylalkyl group. $R^{14}$ represents a large cyclic ligand such as tetraphenylporphyrin, phthalocyanin. k is ionic valence of $[L^1\text{-}R^{10}]$, $[L^2]$ and an integer of 1 to 3, a is an integer of at least 1 and b=(k×a ). $M^2$ includes elements in the groups 1 to 3, 11 to 13, and 17 of the periodic table. $M^3$ represents element in the group 7 to 12 in the periodic table.

Examples of $L^1$ include amines such as ammonia, methylamine, aniline, dimethylamine, diethylamine, N-methylaniline, diphenylamine, N,N-dimethyl-aniline, trimethylamine, triethylamine, tri-n-butylamine, methyldiphenylamine, pyridine, p-bromo-N, N-dimethylaniline, p-nitro-N, N-dimethylaniline; phosphines such as triethylphosphine, triphenylphosphine, diphenylphosphine; thioethers such as tetrahydrothiophene; esters such as ethylbenzoate; nitriles such as actonitrile and benzonitrile.

Examples of $R^{10}$ include hydrogen, methyl group, ethyl group, benzyl group and trityl group. Examples of $R^{11}$ and $R^{12}$ include cyclopentadienyl group, methylcyclopentadienyl group, ethylcyclopentadienyl group and pentamethylcyclopentadienyl group. Examples of $R^{13}$ include phenyl group, p-tolyl group and p-methoxyphenyl group, examples of $R^{14}$ include tetraphenylporphin, phthalocyanine, allyl and methallyl. Examples of $M^2$ includes Li, Na, K, Ag, Cu, Br, I, $I_3$, examples of $M^3$ include Mn, Fe, Co, Ni and Zn.

Examples of $M^1$ in $[Z^1]^-$, namely in $[M^1 G^1 G^2 \ldots G^f]$ include B, Al, Si, P, As, Sb, of which B and Al are preferred. Examples of $G^1$, $G^2$ to $G^f$ include a dialkyl-amino groups such as dimethylamino group and diethylamino group; an alkoxy groups or an allyloxy groups such as methoxy group, ethoxy group, n-butoxy group, and phenoxy group; hydrocarbon groups such as methyl group, ethyl group, n-propyl group, isopropyl group, n-butyl group, isobutyl group, n-octyl group, n-eicocyl group, phenyl group, p-tolyl group, benzyl group, 4-t-butylphenyl group and 3,5-dimethylphenyl group; halogen atoms such as fluorine, chlorine, bromine and iodine; a hetero-containing hydrocarbon groups such as p-fluorophenyl group,3,5-difluorophenyl group, pentachlorophenyl group, 3,4,5-trifluorophenyl group, pentafluorophenyl group, 3,5-bis(trifluoromethyl) phenyl group, bis(trimethylsilyl)-methyl group; an organic metaloid groups such as pentamethylantimony group, trimethylsilyl group, trimethylgermyl group, diphenylarsine group, dicyclohexyl-antimony group and diphenylboron group.

Examples of $[Z^2]^-$, a non-coordinate anion, namely, a conjugate base of Bronsted acid alone or combination of Brønsted acid and Lewis acid of which logarithm of reciprocal of acid dissociation constant (pKa) is at most −10, include trifluoromethan sulfonic acid anion $(CF_3SO_3)^-$, bis (trifluoromethane-sulfonyl)methyl anion, bis(trifluoromethane sulfonyl) benzyl anion, bis(trifluoromethane sulfonyl) amide, perchlorate anion $(ClO_4)^-$, trifluoroacetic acid anion, $(CF_3CO_2)^-$, hexafluoroantimony anion $(SbF_6)^-$, fluorosulfonic acid anion $(FSO^3)^-$, chlorosulfonic acid anion $(ClSO^3)^-$, fluorosulfonic acid anion/5-antimonyfluoride $(FSO_3/SbF_5)^-$, fluorosulfonic acid anion/5-arsenicfluoride $(FSO_3/AsF_5)$, trifluoromethanesulfonic acid/5-antimonyfluoride $(CF_3SO_3/SbF_5)$.

Examples of ionic compound which forms ionic complex by reacting with a transition metal of above (A) component, namely, (B-1) component compound include triethylammoniumtetraphenylborate, tri-n-butyl-ammonium tetraphenylborate, trimethylammonium tetraphenylborate, tetraethylammonium tetraphenylborate, methyl(tri-n-butyl) ammonium tetraphenylborate, benzyl(tri-n-butyl) ammonium tetraphenyl borate, dimethyldiphenylammonium tetraphenylborate, triphenyl (methyl) ammonium tetraphenylborate, trimethyl-anilinium tetraphenylborate, methylpyridinium tetraphenylborate, benzyl-pyridinium tetraphenylborate, methyl(2-cyanopyridinium) tetraphenylborate, triethylammonium tetrakis (pentafluorophenyl)borate, tri-n-butyl-ammonium tetrakis (pentafluorophenyl)borate, triphenylammonium tetrakis (pentafluorophenyl)borate, tetra-n-butylammonium tetrakis (pentafluorophenyl)borate, tetraethylammonium tetrakis (pentafluoro-phenyl)borate, benzyl(tri-n-butyl)ammonium tetrakis (pentafluorophenyl)borate, methyldiphenylammoniumtetrakis(pentafluorophenyl) borate, triphenyl(methyl)ammonium tetrakis (pentafluorophenyl)borate, methylanilinium tetrakis(pentafluorophenyl)borate, dimethylanilinium tetrakis (pentafluorophenyl)borate, trimethylanilinium tetrakis (pentafluorophenyl)borate, methylpyridinium tetrakis (pentafluorophenyl)borate, benzylpyridinium tetrakis (pentafluorophenyl)borate, methyl(2-cyanopyridinium) tetrakis(pentafluorophenyl)borate, benzyl(2-cyanopyridinium) tetrakis(pentafluorophenyl)borate, methyl (4-cyanopyridinium) tetrakis-(pentafluorophenyl)borate, triphenylphosphonium tetrakis(pentafluorophenyl) borate, dimethylanilinium tetrakis[bis(3,5-ditrifluoromethyl) phenyl]borate, ferrocenium tetraphenylborate, silvertetraphenylborate, trityitetraphenylborate, tetraphenylporphyrinmanganate tetraphenylborate, ferrocenium tetrakis(pentafluorophenyl)borate, (1,1'-dimethylferrocenium) tetrakis(pentafluorophenyl)borate, decamethylferrocenium tetrakis(pentafluorophenyl)borate, trityltetrakis(pentafluorophenyl)-borate, lithiumtetrakis (pentafluorophenyl)borate, sodiumtetrakis (pentafluorophenyl)borate, tetraphenylporphylin manganate tetrakis(pentafluorophenyl) borate, silvertetrafluoroborate, silvehexafluorophosphate, silverhexafluoroarsenate, silver perchlorate, silversrifluoroacetate and silvertrifluoromethane sulfanate.

(B-1) may be used alone or in combination of more than two kinds or more.

On the other hand, aluminoxane of (B-2) component is represented by the general formula (V);

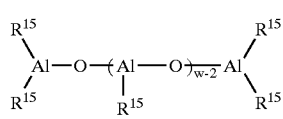

wherein $R^{15}$ represents hydrocarbon group such as an alkyl group having 1 to 20, preferably 1 to 12 carbon atoms, an alkenyl group, an allyl group, an allylalkyl group, or halogen atom, w represents average molecular weight, normally an integer of 2 to 50, preferably 2 to 40. $R^{15}$ may be the same or different with each other; or a cyclic aluminoxane represented by the general formula (VI);

wherein $R^{15}$ and w are the same as in the above general formula (V).

Production method of above aluminoxane include a method of contacting alkylaluminum with a condensation agent such as water, but the method is not particularly limited, and a known method may be employed. Examples of the production methods include (1) contacting an organic aluminum compound, dissolved in organic solvent, with water, (2) previously adding an organic aluminum compound in polymerization process, followed by adding water, (3) reacting organic aluminum compound with water of crystallization contained in metal salt or the like, or water adsorbed to inorganic or organic compound, (4) reacting tetra-alkyldialuminoxane with trialkylaluminum, followed by further reacting with water. Aluminoxane may be insoluble in toluene.

Those aluminoxanes may be used alone or in combination with more than two kinds or more.

Ratio for use of catalyst component (A) and catalyst component (B), when using (B-1) as catalyst component (B), is preferably 10:1 to 1:100, more preferably 2:1 to 1:10 in molar ratio, if the ratio exceeds above range, catalyst cost per unit weight of polymer becomes high, and not practical. When (B-2) compound is used, the ratio is preferably in the range of 1:1 to 1:1000000, more preferably 1:10 to 1:10000 in molar ratio. If the ratio exceeds above range, catalyst cost per unit weight of polymer becomes high, and not practical. As catalyst component (B), (B-1) or (B-2) may be used alone or in combination with two kinds or more.

As polymerization catalyst for the production method of the present invention, organic aluminum compound may be used as (C) component, in addition to above mentioned (A) component and (B) component.

Organic aluminum compound as (C) component is represented by the general formula (VII):

(VI)

wherein, $R^{16}$ represents an alkyl group having 1 to 10 carbon atoms, J represents hydrogen atom, an alkoxy group having 1 to 20 carbon atoms, an allyl group having 6 to 20 carbon atoms, or halogen atom, v is an integer of 1 to 3.

Examples of the compound represented by the above general formula (VII) include trimethyl aluminum, triethyl aluminum, triisopropyl aluminum, triisobutyl aluminum, dimethyl aluminum chloride, diethyl aluminum chloride, methyl aluminum dichloride, ethyl aluminum dichloride, dimethyl aluminum fluoride, diisobutyl aluminum hydride, diethyl aluminum hydride, ethyl aluminum sesqui-chloride.

Those organic aluminum compounds may be used alone or in combination of two kinds or more.

In the production method of the present invention, a preliminary contact may be conducted using above (A) component, (B) component and (C) component. Although the preliminary contact may be conducted by contacting (A) component with, for example, (B) component, there is no particular limitation as to the method, and any known process may be employed. The preliminary contact is effective for reduction of catalyst cost by improving activity of catalyst and reduction of amount of use of (B) component as a promotor. Furthermore, by contacting (A) component with (B-2) component, increase in molecular weight is also exhibited in addition to above effects. Temperature for the preliminary contact is normally −20° C. to 200° C., preferably −10° C. to 150° C., more preferably 0° C. to 80° C. For the preliminary contact, inert hydrocarbon solvent such as aliphatic hydrocarbon or aromatic hydrocarbon may be used, of which most preferred is aliphatic hydrocarbon.

Ratio for use of above catalyst component (A) and catalyst component (C) is preferably 1:1 to 1:10000, more preferably 1:5 to 1:2000, further more preferably 1:1000 by molar ratio. By using the catalyst component (C), polymerization activity per unit transition metal is increased, but excessive use is not preferable as it causes not only waste of organic aluminum, but also leaving a large amount of it in the polymer.

In the present invention, at least one kind of catalyst component may be used as deposited on a suitable carrier. There is no limitation as to the kind of the carrier, and any one of inorganic oxide carrier, other inorganic carrier and organic carrier may be used, but particularly inorganic oxide carrier or other inorganic carrier are preferred.

Examples of inorganic oxide carrier include $SiO_2$, $Al_2O_3$, MgO, $ZrO_2$, $TiO_2$, $Fe_2O_3$, $B_2O_3$, CaO, ZnO, BaO, $ThO_2$ and their mixture such as silica-alumina, zeolite, ferrite and glass fiber, among which particularly $SiO_2$, $Al_2O_3$ are preferable. Above inorganic oxide carrier may contain small amount of carbonate, nitrate, sulfate and the like.

On the other hand, examples of the other carriers than above include magnesium compound and its complex salt represented by the general formula $MgR^{17}_xX^1_y$, such as $MgCl_2$, $Mg(OC_2H_5)_2$, wherein $R^{17}$ represents an alkyl group having 1 to 20 carbon atoms, an alkoxy group having 1 to 20 carbon atoms or an allyl group having 6 to 20 carbon atoms, $X^1$ represents halogen atom or an alkyl group having 1 to 20 carbon atoms, x is 0 to 2, y is 0 to 2, and x+y=2. Each $R^{17}$ and each $X^1$ may be respectively the same or different with each other.

Examples of organic carrier include polymers such as polystyrene, styrene-divinylbenzene copolymer, polyethylene, poly-1-butene, substituted polystyrene, polyallylate, as well as starch and carbon.

Carriers used in the present invention are preferably $MgCl_2$, $MgCl(OC_2H_5)$, $Mg(OC_2H_5)_2$, $SiO_2$, $Al_2O_3$. The properties of the carrier depend on its kind and the method of preparation, but the average particle size is normally 1 to 300 μm, preferably 10 to 200 μm, more preferably 20 to 100 μm.

Smaller particle size increases fine powder in the polymer, while larger size increases coarse particles leading to decrease of bulk density and a source of plugging in hopper.

Specific surface area of the carrier is normally 1 to 1000 $m^2$/g, preferably 50 to 500 $m^2$/g, and pore volume is normally 0.1 to 5 $cm^3$/g, preferably 0.3 to 3 $cm^3$/g.

If either specific surface area or pore volume exceeds above range, catalyst activity may decrease. Specific surface area and pore volume are determined from the volume of nitrogen gas adsorbed, for example, according to BET method.

Furthermore, when the above carrier is an inorganic oxide carrier, using it after calcination at normally 150° C. to 1000° C., preferably 200 to 800° C., is desirable.

When depositing at least one kind of catalyst component on the above mentioned carrier, at least one of the catalyst component (A) or (B), preferably both (A) and (B) are deposited.

The method of depositing at least one of the component (A) and component (B) on the above carrier is not particularly limited, examples of the method include (1) mixing at least one of the component (A) and component (B) with the carrier, (2) mixing at least one of the component (A) and component (B) in an inert solvent with the carrier which is previously treated with an organic aluminum compound or halogen containing silicone compound, (3) reacting component (A) and/or component (B) with an organic aluminum compound or halogen containing silicon compound, (4) after depositing component (A) or component (B) on the carrier, mixing it with component (B) or component (A), (5) mixing product of catalytic reaction of component (A) and component (B) with the carrier, (6) conducting catalytic reaction of component (A) and component (B) in the presence of the carrier.

Furthermore, organic aluminum compound as component (C) may be added in the above reactions (4), (5) and (6).

In the present invention, when contacting above (A), (B), (C), elastic wave may be irradiated for preparation of the catalyst. As the elastic wave, ordinal sonic wave, particularly supersonic wave is preferred. Specifically, supersonic wave with frequency of 1 to 1000 kHz, preferably 10 to 500 kHz is used.

Catalyst thus obtained may be used for polymerization as it is, or as solid after removing solvent.

Moreover, in the present invention, depositing process of at least one of the component (A) or component (B) may be conducted within the polymerization system, thus producing catalyst. For example, after adding at least one of the component (A) and component (B), together with above mentioned (C) if necessary, and with a carrier, olefin such as ethylene is introduced at atmospheric pressure to 2 MPa (gauge) and pre-polymerization is conducted at −20 to 200° C. for 1 minute to 2 hours to grow catalyst particles.

In the present invention, the ratio of component (B-1) and the carrier for use is preferably 1:5 to 1:10000, more preferably 1:10 to 1:500 by weight; the ratio of (B-2) and the carrier for use is preferably 1:0.5 to 1:1000, more preferably 1:1 to 1:50 by weight. When two kinds or more of component (B) is mixed for use, the ratio of each component (B) and the carrier for use is preferably within above range by weight. The ratio of component (A) and carrier for use is preferably 1:5 to 1:10000, more preferably 1:10 to 1:500.

If the ratio of component (B) [component (B-1) or component (B-2)] and the carrier for use, or the ratio of component (A) and the carrier for use deviates above range, activity may decrease. The average particle size of the catalyst of the present invention thus prepared is normally 2 to 200 μm, preferably 10 to 150 μm, and particularly preferred is 20 to 100 μm, with specific surface area of normally 20 to 1000 $m^2$/g, preferably 50 to 500 $m^2$/g. If average particle size is less than 2 μm, fine powder in the polymer may increase, on the other hand, if it exceeds 200 μm, coarse particles in the polymer may increase. If specific surface area is less than 20 $m^2$/g, activity may decrease, while if it exceeds 1000 $m^2$/g, the bulk density of the polymer may decrease. In the present invention, amount of transition metal in 100 g of the carrier is normally 0.05 to 10 g, particularly preferred is 0.1 to 2 g. If the amount of transition metal deviates above range, activity may decrease.

As described above, by depositing catalyst component on the carrier, the polymer with industrially advantageous high bulk density and excellent particle size distribution is obtained.

1-butene based polymer used in the present invention is produced by homo-polymerizing 1-butene, or copolymerizing 1-butene and ethylene and/or α-olefin having 3 to 20 carbon atoms (except 1-butene), using above mentioned polymerization catalyst.

For this, polymerization method is not particularly limited, any method such as slurry polymerization method, gas phase polymerization method, block polymerization method, solution polymerization method and suspension polymerization method may be used, of which, however, slurry polymerization method and gas phase polymerization method are particularly preferable.

As for the polymerization condition, polymerization temperature is normally −100 to 250° C., preferably −50 to 200° C., more preferably 0 to 130° C. The ratio of catalyst for use per feedstock in terms of feed monomer/above component (A) (molar ratio) is preferably 1 to $10^8$, particularly 100 to $10^5$ is preferable. Furthermore, polymerization time is normally 5 minutes to 10 hours, reaction pressure is preferably atmospheric pressure to 20 MPa (gauge), more preferably atmospheric pressure to 10 MPa (gauge).

Molecular weight of the polymer is controlled by such factors as the kind of each catalyst component, amount to be used, selection of the polymerization temperature and further by polymerization in presence of hydrogen.

When polymerization solvent is used, for example, aromatic hydrocarbons such as benzene, toluene, xylene and ethylbenzene; alyphatic cyclic hydrocarbons such as cyclopentane, cyclohexane and methylcyclohexane; aliphatic hydrocarbons such as pentane, hexane, heptane and octane; halogenated hydrocarbons such as chloroform and dichloromethane are used. Those solvents may be used alone or in combination of two kinds or more. Moreover, monomer such as α-olefin may be used as solvent. Depending on the polymerization method, no solvent may be used.

For polymerization, preliminary polymerization can be conducted using polymerization catalyst described above. Preliminary polymerization can be conducted, for example, by contacting a small amount of olefin with a solid catalyst component, however, there is no limitation as to the polymerization method, and any known process can be employed. Olefin for use in preliminary polymerization is not particularly limited, and the same olefins described in the examples above such as ethylene, α-olefin having 3 to 20 carbon atoms or their mixture may be used, however, it is advantageous to use the same olefin as to be used in the polymerization concerned.

Temperature for preliminary polymerization is normally −20 to 200° C., preferably −10 to 130° C., more preferably 0 to 80° C. Solvent for preliminary polymerization include aliphatic hydrocarbon, aromatic hydrocarbon and monomer, of which aliphatic hydrocarbon is particularly preferable. Preliminary polymerization can also be conducted without solvent.

The condition of the preliminary polymerization is preferably adjusted so that the intrinsic viscosity [η] (measured in decalin at 135° C.) of the product of preliminary polymerization is at least 0.2 dl/g, preferably at least 0.5 dl/g, and amount of the product of preliminary polymerization per 1 mmol of transition metal in catalyst is 1 to 10000 g, particularly 10 to 1000 g.

[3] 1-Butene Based Resin Composition 1-butene based resin composition comprises above 1-butene based polymer [1], above 1-butene homopolymer [a] or above 1-butene based copolymer [a'] and a nucleating agent added thereto. In general, it is the that crystallization of 1-butene based polymer is composed of two processes; crystal nucleation process and crystal growth process, and in crystal nucleation process, factors such as temperature difference from crystallization temperature and the state of orientation of molecular chain affect its crystal nucleation rate. It is also known that crystal nucleation rate is significantly increased particularly when there is a substance which enhances orientation of molecular chain through adsorption of the molecular chain. Above nucleating agent may be any substance which enhances crystal nucleation rate. Example of such substance is the substance which enhances orientation of molecular chain through adsorption process of the polymer chain.

Specific examples of above nucleating agent include high melting point polymer, organic carbonic acid or its metal salt, aromatic sulfonate or its metal salt, organic phosphate compound or its metal salt, dibenzylidene sorbitol or its derivative, partial metal salt of rosinic acid, inorganic fine particle, imides, amides, quinacridons, quinones, or mixture of them.

Examples of high melting point polymer include polyolefins such as polyethylene and polypropylene; polyvinylcycloalkanes such as polyvinyl-cyclohexane and polyvinylcyclopentane; syndiotactic polystyrene, poly 3-methylpentene-1, poly 3-methyl butene-1 and polyalkenylsilane.

Examples of metal salt include aluminum benzoate, aluminum p-t-butylbenzoate, sodium adipate, sodium thiophenecarboxylate and sodium pyrrolecarboxylate.

Examples of dibenzylidene sorbitol and its derivative include dibenzylidene sorbitol, 1,3:2,4-bis(o-3,4-dimethylbenzylidene) sorbitol, 1,3:2,4-bis(o-2,4-dimethylbenzylidene) sorbitol, 1,3:2,4-bis(o-4-ethylbenzylidene) sorbitol, 1,3:2,4-bis(o-4-chlorobenzylidene) sorbitol, 1,3:2,4-dibenzylidenesorbitol, and more specifically GELOL MD or GELOL MD-R (trade name) manufactured by New Japan Chemical Co., Ltd.

Examples of partial metal salt of rosin acid include PINE CRYSTAL KM1600, PINE CRYSTAL KM1500, PINE CRYSTAL KM1300 (trade names) manufactured by ARAKAWA CHEMICAL INDUSTRIES LTD.

Examples of inorganic fine particles include talc, clay, mica, asbestos, glass fiber, glass flakes, glass beads, calcium silicate, montmorillonite, bentonite, graphite, aluminum fine powder, alumina, silica, diatomaceous earth, titanium oxide, magenesia, pumice powder, pumice balloon, aluminum hydroxide, magnesium hydroxide, basic magnesium carbonate, dolomite, calcium sulfate, potassium titanate, barium sulfate, calcium sulfite, molybdenum sulfide.

Examples of amide compounds include dianilideadipate and dianilidesuberite.

Those nucleating agents may be used alone or in combination of two kinds or more.

Above 1-butene based resin composition preferably uses, as nucleating agent, organic metal phosphate represented by the following general formula and/or inorganic fine powder such as talc because of their limited odor. This 1-butene based resin composition is suitable for food applications;

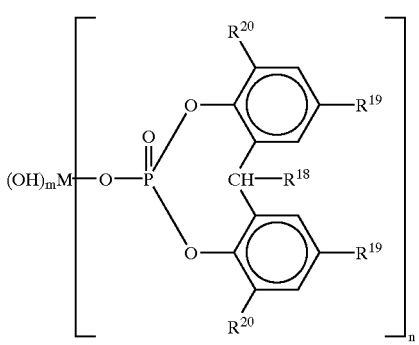

wherein $R^{18}$ represents hydrogen atom or an an alkyl group having 1 to 4 carbon atoms; each of $R^{19}$ and $R^{20}$ respectively represents hydrogen atom, an alkyl group having 1 to 12 carbon atoms, a cycloalkyl group, an allyl group or an allalkyl group. M represents any one of alkaline metal, alkaline earth metal, aluminum or zinc, when M is an alkaline metal, m=0, n=1; when M is an alkaline earth metal or zinc, n=1 or 2, when n is 1, m is 1; when n is 2, m is 0; when M is aluminum, m=1 and n=2.

Specific examples of organic metal phosphate include ADEKASTAB NA-11 or ADEKASTAB NA-21 (manufactured by Asahi Denka Co.,Ltd.).

Furthermore, use of inorganic fine particles such as talc as nucleating agent is preferred for above 1-butene based resin composition, because of excellent slip property and improved printing property when it is formed to film. Moreover, use of above mentioned dibenzylidene sorbitol or its derivative as nucleating agent is preferred because of superior transparency. Furthermore, use of above mentioned amide compound as nucleating agent is preferred because it improves rigidity.

1-butene based resin composition above described is produced by mixing 1-butene based polymer [1], above mentioned 1-butene homopolymer [a], or above mentioned 1-butene based copolymer [a'], nucleating agent and other additives if desired, by means of (1) dry blending using Henschel mixer or the like, (2) melt kneading using single screw or twin screw extruder, Banbury mixer or the like, (3) when high melting point polymer is used as nucleating agent, by adding high melting point polymer at once or gradually in a reactor during polymerization reaction of 1-butene based polymer. Examples of additives, used if desired, include anti-oxidant, neutralizing agent, slip agent, antiblocking agent, antihaze agent, or antistatic agent.

Dosage of above additives is normally at least 10 ppm based on 1-butene based polymer [1], 1-butene homopolymer above mentioned [a], or 1-butene based copolymer above mentioned [a'], preferably 10 to 10,000 ppm, more preferably 10 to 5000 ppm, further preferably 10 to 2500 ppm. If the dosage is less than 10 ppm, processability is not improved. On the other hand, even if the dosage exceeds 10000 ppm, no further preferable effect is obtained.

[4] Formed Product

The formed product of the present invention is the formed product obtained by forming above mentioned 1-butene based polymer [1], above mentioned 1-butene homopolymer [a] or above mentioned 1-butene based copolymer [a']. The formed product of the present invention has features of softness (or flexibility), reduced stickiness in spite of low modulus of elasticity, and superior transparency.

Examples of the formed product of the present invention include film, sheet, container, automobile interior materials, and housing materials for electric home-appliances. Examples of film applications include food packaging film and agricultural use (for example, vinyl plastic hot-house). Examples of container applications include transparent case, transparent box and vanity case, as it is excellent in transparency.

When the formed product of the present invention is packaging material such as film or sheet, it has superior heat sealing property, has wide temperature range for heat sealing and superior hot-tacking property. Furthermore, it has a similar tensile characteristics as polyvinylchloride films.

Applicable forming methods include injection molding, press molding, injection compression molding, gas-assisted injection molding, extrusion molding, and blow molding methods.

Forming conditions are not particularly limited as long as the temperature is suitable for the resin to melt and flow, normally resin temperature of 50° C. to 300° C. and mold temperature of 60° C. at highest are employed.

To form films as the formed product of the present invention, generally available methods of press molding, extrusion molding, blow molding and cast molding are employed.

Films may be stretched or not stretched. For stretching, biaxial stretching is preferred. The conditions of biaxial stretching are as follows;
(1) Sheet molding conditions:
    Resin temperature 50 to 200° C., chilled roll temperature 50° C. or lower
(2) Vertical stretching conditions:
    Draw ratio 3 to 7, stretching temperature 50 to 100° C.
(3) Horizontal stretching conditions:
    Draw ratio 6 to 12, stretching temperature 50 to 100° C.

The film may be surface treated, if necessary, to increase surface energy, or to polarize the surface. Examples of treating method include corona discharge treatment, chromic acid treating, flame treatment, hot air treatment, ozone or ultraviolet irradiation treatment. For making surface rough, for example, sand blasting method or solvent treating method are employed.

For the film, generally used antioxidant, neutralizing agent, slip agent, anti-blocking agent, antihaze agent, or antistatic agent may be added if necessary.

As the film containing inorganic fine particles like talc is superior in slip property, fabricating characteristics such as for bag making and printing are improved, and is suitable for all the general purpose packaging films used in a high speed processing machine for various automatic filling, packaging, laminating and the like.

As the film formed from 1-butene based resin composition containing dibenzylidenesorbitol described above as nucleating agent is particularly superior in transparency and has high display effect, it is suitable for packaging toys, stationary and the like.

As the film formed from 1-butene based resin composition containing amide compound above described as nucleating agent is mostly free from problems such as wrinkles by rolling at high speed bag making, it is suitable for all the general purpose packaging films using high speed bag making machine.

1-butene based polymer, 1-butene homopolymer, 1-butene based copolymer of the present invention have superior compatibility with polypropylene. Therefore, by blending the polymer of the present invention with polypropylene, production of a low temperature heat sealing PP film is made possible. Moreover, the polymer of the present invention can be blended with polyethylene or EVA resin, and by this blending, strength of the film or sheet can be controlled.

[5] 1-Butene Based Resin Reforming Agent 1-butene based resin reforming agent of the present invention is the resin reforming agent comprising above described 1-butene based polymer [1], above described 1-butene homopolymer [a] or above described 1-butene based copolymer [a']. 1-butene based resin reforming agent of the present invention has features of enabling to produce a formed product with low melting temperature, flexibility, low stickiness and superior compatibility with polyolefin resins. Namely, 1-butene based resin reforming agent of the present invention comprises 1-butene homopolymer and 1-butene based copolymer which are specifically defined as above described, especially as a small amount of crystalline fraction is present in the poly 1-butene chain, it is less sticky and superior in compatibility than conventional reforming agent of the flexible polyolefins. Furthermore, 1-butene based resin reforming agent of the present invention is superior in compatibility with polyolefin based resins, especially with polypropylene based resins, as the result, deterioration of surface property (such as stickiness) is less, and more superior in transparency than the conventional reforming agent using ethylene based rubber and the like. With above features, 1-butene based resin reforming agent of the present invention can be suitably used as reforming agent for physical properties of flexibility and transparency. Furthermore, it can also be suitably used for reforming heat sealing and hot tacking properties.

Next, more detailed description is given in order for [1] 1-butene based polymer, [2] polyolefins, [3] polyolefin based resin composition, [4] Formed product and film for polyolefin based resin composition of the present invention.

[1] 1-Butene Based Polymer

In 1-butene based polymer to be used for polyolefin based resin composition of the present invention, there are 1-butene homopolymer obtained by polymerizing only 1-butene, and 1-butene based copolymer obtained by copolymerizing 1-butene and ethylene or α-olefin having 3 to 20 carbon atoms (except 1-butene), of which 1-butene homopolymer is suitably used.

Examples of α-olefin composing 1-butene based copolymer, except 1-butene, include ethylene, propylene, 1-pentene, 4-methyl-1-pentene, 1-hexene, 1-octene, 1-decene, 1-dodecene, 1-tetradecene, 1-hexadecene, 1-octadecene, 1-eicocene, of which one or two kinds or more may be used.

1-butene based copolymer for polyolefin based resin composition of the present invention is preferably a random copolymer. It is also preferable that the ratio of the structure unit originated from 1-butene is at least 90 mol %, more preferably at least 95 mol %, particularly preferred is at least 98 mol %. If the ratio of structure unit originated from 1-butene is less than 90 mol %, there is a possibility of having stickiness in the surface of the formed product, and inferior transparency.

1-butene based polymer for the polyolefin based resin composition of the present invention is the polymer specified by the following requirements (1") to (4"), and it is the same as above described 1-butene homopolymer (III) or 1-butene based copolymer (III).

(1") Crystalline resin having melting point (Tm-P), not observed or in the range of 0 to 100° C., wherein the melting point defined as the peak top of the peak observed in the highest temperature zone of the melting heat absorption curve obtained by heating a sample of the polymer at a rate of 10° C./minute using Differential Scanning Calorimeter (DSC), after melting the sample in advance at 190° for 5 minutes under nitrogen atmosphere, followed by cooling it to −10° C. at a rate of 5° C./minutes, and keeping it at −10° C. for 5 minutes.

(2") Stereoregularity index {(mmmm)/(mmrr+rmmr)} is at most 20.

(3") Molecular weight distribution (Mw/Mn) measured by Gel Permeation Chromatography (GPC) method is at most 4.0.

(4") Weight average molecular weight (Mw) measured by GPC method is in the range of 10,000 to 1,000,000.

1-butene based polymer for the polyolefin based resin composition of the present invention is a crystalline compound substantially having at least a melting point. The melting point is normally observed by Differential Scanning Calorimeter (DSC). In the present invention, what is meant by substantially having a melting point is that a crystal melting peak is substantially observed in DSC measurement. Crystal melting peak means above described Tm–P or Tm–D to be mentioned later, and the peak is observed at least either one of the measurement condition.

1-butene based polymer for the polyolefin based resin composition of the present invention, by satisfying above requirements, is superior in balance between the amount of stickiness component, low modulus of elasticity and transparency. Namely, it has advantages of low modulus of elasticity, superiority in softness (or flexibility), reduced amount of sticky component, superiority in surface characteristics (for example, represented by breed or migration of sticky component to other product ), and superior transparency.

The melting point (Tm–P) of 1-butene based polymer to be used for the polyolefin based resin composition of the present invention is not observed, due to its softness, or is in the range of 0 to 100° C., preferably 0 to 80° C.

The melting point (Tm–P) of the 1-butene based polymer is obtained by DSC measurement. Namely, using a Differential Scanning Calorimeter (manufactured by PerkinElmer, DSC-7), by previously melting 10 mg of sample at 190° C. for 5 minutes under nitrogen atmosphere, cooling it down to −10° C. at a rate of 5° C./minute, keeping it at −10° C. for 5 minutes, then heating it up at a rate of 10° C./minute. The melting heat absorption determined by this mean is defined as ΔH, and the peak top of the peak observed at highest temperature zone of the melting heat absorption curve is the melting point:Tm–P (° C.).

Furthermore, 1-butene based polymer for the polyolefin based resin composition of the present invention may be a crystalline resin having the melting point (Tm–D) of 0 to 100° C. as measured by Differential Scanning Calorimeter (DSC) due to its softness. Tm–D is preferably 0 to 80° C. Tm–D is obtained by DSC measurement. Namely, after keeping 10 mg of sample at −10° C. for 5 minutes under nitrogen atmosphere, melting heat absorption observed by heating it at a rate of 10° C./min. is defined as ΔH–D. The peak top of the peak observed at the highest temperature zone of the melting heat absorption curve is the melting point Tm–D.

Such a 1-butene based polymer is a crystalline polymer satisfying above described (1) to (4):

(1) Crystalline resin having a melting point (Tm–D) in the range of 0 to 100° C., wherein the melting point is defined as the peak top of the peak observed in the highest temperature zone of the melting heat absorption curve obtained by heating a sample of the polymer at a rate of 10° C./minute using the Differential Scanning Calorimeter(DSC), after keeping the sample in advance at −10° C. for 5 minutes under nitrogen atmosphere.

(2) Stereoregularity index {(mmmm)/(mmrr)+(rmmr)} is at most 20.

(3) Molecular weight distribution (Mw/Mn) measured by Gel Permeation Chromatograph (GPC) method is at most 4.0
(4) Weight average molecular weight (Mw) is in the range of 10,000 to 1,000,000.

1-butene based polymer to be used for the polyolefin based resin composition of the present invention preferably has melting heat absorption ΔH–D of at most 50 J/g, more preferably at most 10 J/g, so that it is superior in flexibility. ΔH–D is an index for flexibility. The higher this value is, the higher is the modulus of elasticity, meaning a decrease of flexibility.

1-butene based polymer for the polyolefin based resin composition of the present invention has stereoregularity index {(mmmm)/(mmrr+rmmr)} obtained from the ratio of 1-butene chain (mmmm) and (mmrr+rmmr) of at most 20, preferably at most 18, more preferably at most 15. If the stereospecific regularity index exceeds 20, decrease of flexibility, decrease of heat sealing property and decrease of hot tacking property occur.

Mesopentad ratio (mmmm) and anormalous insertion content (1,4 insertion ratio) are obtained by the same method as described above. Stereoregularity index {(mmmm)/(mmrr+rmmr)} is calculated from the measured values of (mmmm), (mmrr) and (rmmr) by the above mentioned method, and racemic triad ratio (rr) is also calculated by the above method.

1-butene based polymer for the polyolefin based resin composition of the present invention, in addition to above specifications, has molecular weight distribution (Mw/Mn), measured by GPC method, of at most 4, preferably 3.5 to 1.5, more preferably 3.0 to 1.5. When the molecular weight distribution (Mw/Mn) exceeds 4, stickiness may occur, and when it is less than 1.5, processability may become inferior.

1-butene based polymer for the polyolefin based resin composition of the present invention, in addition to above requirements, has weight average molecular weight Mw, measured by GPC method, of 10,000 to 1,000,000. When the weight average molecular weight Mw is less than 10,000, stickiness may occur. When it exceeds 1,000,000, fluidity may decrease leading to decrease of processability.

Above described molecular weight distribution (Mw/Mn) is calculated from weight average molecular weight Mw and number average molecular weight Mn of polystyrene equivalent measured by GPC method, using above mentioned equipment and conditions.

1-butene based polymer for the polyolefin based resin composition of the present invention, in addition to above specifications, has preferably melting heat absorption ΔH of 60 J/g at highest, more preferably 20 J/g at highest as measured by DSC method, so that flexibility is superior. ΔH is an index of flexibility, the higher this value is, the higher is the modulus of elasticity meaning a decrease of flexibility. Melting heat absorption ΔH is determined by the above described method.

1-butene based polymer for the polyolefin based resin composition has a component soluble in hexane at 25° C. (H25) of preferably 0 to 80 weight %, more preferably 0 to 60 weight %, most preferably 0 to 50 weight %. H25 is an index of amount of sticky component which causes stickiness and inferior transparency, the higher this value is, the more amount is the sticky component. When H25 exceeds 80 weight %, blocking may occur due to a high amount of sticky component, leading to inferior fabricating characteristics and surface characteristics.

Polyolefin based resin composition of the present invention has preferably 0 to 25 weight % of H 25, more preferably 0 to 10 weight %. When H 25 exceeds 25 weight %, decrease of blocking occur due to a high amount of sticky component and may not be used for food and medical applications.

H 25 is a weight loss ratio calculated according to the following formula, based on the measurement of weight of the 1-butene based polymer or polyolefin based resin composition ($W_0$) (0.9 to 1.1 g), and the weight after keeping the polymer in 200 ml of hexane at 25° C. for 4 days, followed by drying ($W_1$):

$$H25=[(W_0-W_1)/W_0]\times 100\%$$

1-butene homopolymer suitably used for the polyolefin based resin composition of the present invention has mesopentad fraction (mmmm) of preferably 20 to 90%, more preferably 30 to 85%, most preferably 30 to 80%. When mesopentad fraction is less than 20%, sticky surface of the formed product and decrease of transparency may occur. On the other hand, when exceeding 90%, decrease of flexibility, decrease of heat sealing property and decrease of hot tacking property may occur.

Moreover, the 1-butene homopolymer preferably satisfy the relationship of (mmmm)≦90−2×(rr), more preferably satisfying the relationship of (mmmm)≦87−2×(rr). When this relationship is not satisfied, sticky surface of the formed product and decrease of transparency may occur.

The 1-butene homopolymer has preferably at most 5% of 1,4 inserted part. When exceeding 5%, due to a wide distribution of polymer composition, physical property of the polymer may be adversely affected.

Furthermore, the 1-butene homopolymer preferably has tensile modulus of elasticity of 800 MPa at highest by the tensile test according to JIS K-7113, more preferably 500 MPa at highest. When exceeding 800 PMa, enough flexibility may not be obtained.

1-butene based polymer for the polyolefin based resin composition of the present invention can be produced by the production method described above.

[2] Polyolefins

Examples of polyolefin for the polyolefin based resin composition of the present invention include polyethylene, polypropylene, poly α-olefin made of α-olefins having at least 4 carbon atoms, polyvinylcycloalkane, syndiotacticpolystyrene and polyalkenylsilane. Polypropylene include homopolypropylene made from only propylene, for example, random polypropylene of propylene-ethylene, for example, block polypropylene of propylene/propylene-ethylene; polyethylene include high density polyethylene, low density polyethylene, for example, linear low density polyethylene such as ethylene-butene-1 copolymer, ethylene-hexene-1 copolymer, ethylene-octene-1 copolymer. Poly α-olefin include polybutene-1, poly(4-methylpentene-1), poly(3-methylpentene-1), poly(3-methylbutene-1). Poly-vinylcycloalkane include preferably polyvinylcyclohexane and polyvinylcyclo pentane. Polyalkenylsilane include those with an alkenyl group having 2 to 20 carbon atoms such as vinylsilane, butenesilane, allylsilane.

Among those polyolefins, polypropylene, polyethylene and poly α-olefin are preferable from view point of compatibility, more preferable is polypropylene from view point of heat resistance and flexibility.

Weight average molecular weight of the polyolefins in the present invention is normally 10,000 to 1,000,000, same as 1-butene based polymers, from view point of practical applications.

[3] Polyolefinbased Resin Composition

Polyolefin based resin composition of the present invention comprises 1 to 99% of above mentioned 1-butene based polymer [I], and 99 to 1 weight % of polyolefins [II], the weight ratio of 1-butene based polymer [I]/polyolefin [II] is preferably 10/90 to 90/10, more preferably 10/90 to 60/40.

Production method of polyolefin based resin composition of the present invention is to blend above described 1-butene polymer and polyolefin. The method of blending may be a powder blend method using a kneading machine. For the kneading machine, Banbury mixer or two axis kneader may be used. Reactor blend method where blending is conducted in a polymerization reactor may be used as well. Reactor blend method is preferable because a thorough blending of each component can be achieved by this method. For this reactor blend method, polymerization method using at least two polymerization processes or polymerization method in which catalysts composed of at least two kinds of transition metal compound (or it is also called as multistage polymerization) may be used.

For the multistage polymerization method, at least the polymerization process of 1-butene based polymer, namely, the polymerization process using at least low regularity metallocene catalyst is included. Low regularity metallocene catalyst means metallocene catalyst for production of above mentioned 1-butene based polymer, more specifically, those catalysts shown as examples for production of 1-butene based polymer.

Moreover, multistage polymerization include, for example, a multistage stepwise polymerization method, in which high activity carrier supported Ziegler-Natta catalyst and low regularity metallocene catalyst are used, and a multistage stepwise polymerization method, in which high regularity metallocene catalyst and low regularity metallocene catallyst are used.

For high activity carrier supported Ziegler-Natta catalyst, the high activity carrier supported Ziegler-Natta catalyst giving polypropylene of more than 60% mesopentad fraction (mmmm) is preferable, specifically as shown in above examples. High regularity metallocene catalyst is the metallocene catalyst giving polypropylene of more than 60% mesopentad fraction (mmmm). Examples of high regularity metallocene catalyst include transition metal compound having one or two ligands of a cyclopentadienyl group, a substituted cyclopentadienyl group, an indenyl group, substituted indenyl group, as described in the above mentioned Japanese Patents Application Laid Open No.s 58-19309, 61-130314, 3-163088, 4-300887, 4-211694, 1-502036, and a catalyst obtained by a combination of transition metal compound with the ligands geometrically controlled and a promoter.

Polymerization method using two kinds of catalysts include a polymerization method using two kinds of catalysts in which at least one component is a low regularity metallocene catalyst, for example, using a cocatalyst composed of a high regularity metallocene catalyst and a low regularity metallocene catalyst. The two kinds of catalysts may be deposited on a carrier. For example, polymerization method using two kinds of catalysts obtained by depositing high regularity metallocene catalyst and low regularity metallocene catalyst on a carrier. Example of the low regularity metallocene catalyst is the metallocene catalyst giving above described 1-butene based polymer.

Production method of the polyolefin based resin composition of the present invention include the polymerization method using two kinds of catalysts. In this case, the polymerization method using two kinds of catalysts deposited on a carrier is preferable.

[4] Formed Product of Polyolefin Based Resin

Formed product of polyolefin based resin of the present invention is a formed product obtained by forming above described polyolefin based resin composition. The formed product of the present invention has features of low stickiness, softness (or flexibility), and superior low temperature impact strength.

Examples of the formed product of polyolefin based resin of the present invention include film, sheet, container, interior materials for automobile, housing material for electric appliances. Films include food packaging film and agricultural film (e.g. vinyl plastic hot house). Containers include case, box and vanity case.

Modulus of elasticity, an index of flexibility, is preferably 800 MPa at most. When modulus of elasticity exceeds 800 MPa, flexibility is lost and impact strength decreases. The lower limit of modulus of elasticity is 6 MPa, under which stickiness may occur.

Izod impact strength at −5° C. (with notch), an index of low temperature impact strength, is at least 3 kJ/m$^2$, preferably at least 5 kJ/m$^2$.

When the formed product of polyolefin based resin of the present invention is packaging material such as film and sheet, it has a superior low temperature heat sealing property, a wide heat sealing temperature range and a superior hot tacking property. Furthermore, it has similar tensile characteristics as that of polyvinylchloride film.

Polyolefin based resin film of the present invention (including sheet) has thickness of normally 1 μm to 1 cm, and the modulus of elasticity TM of the film is at least 5 MPa. When modulus of elasticity of the film is less than 5 MPa, stickiness may occur.

Relationship between modulus of elasticity TM (MPa) of film and heat seal temperature HST (° C.) is, TM≧12.5×HST−1100, preferably TM≧12.5×HST−1050, more preferably TM≧12.5×HST−1000. When the relationship between TM and HST is out of above range, secondary processing speed decreases.

Relationship between modulus of elasticity TM (MPa) of film and melting point TmF (° C.) of film is, TM≦17×TmF−1600, preferably TM≦17×TmF−1650, more preferably TM≦17×TmF−1700, most preferably TM≦17×TmF−1750. When TM>17×TmF−1600, the balance between heat resistance and flexibility becomes inferior.

Examples of forming method for formed product include injection molding, press molding, injection press molding, gas-assist injection molding, extrusion molding, and blow molding.

Condition of molding is not particularly limited as long as temperature condition is suitable for the resin to melt and flow, normally, resin temperature of 50° C. to 300° C., mold temperature of 60° C. at highest is employed.

Forming film as the polyolefin based resin formed product can be made by generally employed processes such as press molding, extrusion molding, blow molding and cast molding.

Polyolefin based resin film of the present invention may be stretched or not stretched. Stretching is preferably made by biaxial stretching. Conditions of biaxial stretching are as follows:

(1) Sheet Forming Condition

Resin temperature 50 to 200° C., chilled roll temperature 50° C. at highest (2) Vertical Stretching Conditions Stretching ratio 3 to 7, stretching temperature 50 to 100° C.

(3) Horizontal Stretching Conditions

Stretching ratio 6 to 12, stretching temperature 50 to 100° C.

Polyolefin based resin film of the present invention may be surface treated, if necessary, to increase surface energy, or polarize the surface. Examples of treating method include corona discharge treatment, chromic acid treatment, flame treatment, hot air treatment, ozone or ultraviolet irradiation treatment. For making surface rough, for example, sand blasting method or solvent treating method are employed.

For the polyolefin based resin film of the present invention, generally used additives such as antioxidant, neutralizing agent, slip agent, antiblocking agent, antihaze agent, or antistatic agent may be added if necessary.

As the polyolefin based resin film of the present invention containing inorganic fine particles like talc is superior in slip property, secondary processability such as bag making and printing is improved, and is suitable for all the general purpose packaging films used in a high speed processing machine for various automatic filling, packaging, laminating and the like.

Multilayer film can be produced from the polyolefin based resin composition of the present invention. The production method of the polyolefin based resin multilayer product is not particularly limited, for example, melt co-extruding method may be employed. Especially, T die casting method is preferable which allows high speed molding by a large molding machine. Take-off speed is normally 50 m/min or higher speed may be employed. Thickness of the multilayer film is not particularly limited, normally around 10 to 5000 μm.

Polyolefin based resin formed product (press molding) of the present invention is superior in flexibility and low temperature impact strength, and polyolefin based resin film of the present invention is superior in low temperature heat sealing property, heat sealing property and anti-blocking property.

Following are detailed and successive description of [1] 1-butene based polymer, [2] production method of 1-butene based polymer, [3] 1-butene based resin composition, and [4] formed product in the 1-butene based resin composition of the present invention.

[1] 1-Butene Based Polymer 1-butene based polymer used for the 1-butene based resin composition of the present invention includes 1-butene homopolymer obtained by polymerizing 1-butene only, and 1-butene based copolymer obtained by copolymerizing 1-butene and ethylene or α-olefin having 3 to 20 carbon atoms (except 1-butene), of which 1-butene homopolymer is suitably used.

Examples of α-olefin, other than 1-butene, composing 1-butene based copolymer include ethylene, propylene, 1-pentene, 4-methyl-1-pentene, 1-hexene, 1-octene, 1-decene, 1-dodecene, 1-tetracene, 1-hexadecene, 1-octadecene, 1-eicosene, of which one or two kinds or more may be used.

1-butene based copolymer for the polyolefin based resin composition of the present invention is preferably a random copolymer. It is also preferred that the ratio of structure unit originated from 1-butene is at least 90 mol %, more preferably at least 95 mol %, particularly preferred is at least 98 mol %. If the ratio of structure unit originated from 1-butene is less than 90 mol %, there is a possibility of having stickiness in the surface of the formed product and decrease in transparency.

1-butene polymer for the 1-butene based resin composition of the present invention is the polymer specified by the following requirements (1") to (4") or (5) to (6), and it is the same as above described 1-butene homopolymer (III) or 1-butene based copolymer (III) or 1-butene homopolymer (IV) or 1-butene based copolymer (IV).

(1") Crystalline resin having melting point (Tm–P), not observed, or 0 to 100° C., wherein the melting point is defined as the peak top of the peak observed in the highest temperature zone of the melting heat absorption curve obtained by heating a sample of the polymer at a rate of 10° C. minute using the Differential Scanning Calorimeter (DSC), after melting the sample in advance at 190° C. for 5 minutes under nitrogen atmosphere, followed by cooling it to –10° C. at a rate of 5° C./minute, and keeping it at –10° C. for 5 minutes.

(2") Stereoregularity index {(mmmm)/(mmrr+rmmr)} is at most 20.

(3") Molecular weight distribution (Mw/Mn) measured by Gel Permeation Chromatograph (GPC) method is at most 4.0.

(4") Weight average molecular weight (Mw) is in the range of 10,000 to 1,000,000

(5) 1-butene homopolymer or 1-butene based copolymer obtained by copolymerizing 1-butene and ethylene and/or α-olefin having 3 to 20 carbon atoms (except 1-butene), which has at least 90 mol % of structural unit originated from 1-butene.

(6) Type II crystal fraction (CII) obtained by X-ray diffraction analysis is at most 50%, wherein said analysis was made after melting a sample of said polymer in advance at 190° C. for 5 minutes and rapidly solidified by cooling it with ice water, followed by keeping it at room temperature for 1 hour.

1-butene based polymer for the polyolefin based resin composition of the present invention is a crystalline compound substantially having at least a melting point. The melting point (Tm–P) is normally observed by Differential Scanning Calorimeter (DSC). In the present invention, what is meant by substantially having a melting point is that a crystal melting peak is substantially observed in DSC measurement. Crystal melting peak means above described Tm–P or Tm–D to be mentioned later, and the peak is observed at least either one of the measurement condition.

1-butene based polymer for the 1-butene based resin composition of the present invention, by satisfying above requirements, is superior in balance between amount of stickiness component, low modulus of elasticity and transparency. Namely, it has advantages of low modulus of elasticity, superiority in softness (or flexibility), reduced amount of sticky component, superiority in surface characteristics (for example, represented by breed or migration of sticky component to other product), and excellent transparency.

The melting point (Tm–P) of 1-butene based polymer for the 1-butene based resin composition of the present invention is not observed, due to its softness, or 0 to 100° C., preferably 0 to 80° C.

The melting point (Tm–P) of the 1-butene based polymer is obtained by DSC measurement. Namely, using a Differential Scanning Calorimeter (manufactured by PerkinElmer, DSC-7), melting a sample of the polymer in advance at 190° C. for 5 minutes under nitrogen atmosphere, cooling it down to –10° C. at a rate of 5° C./minute, the crystallization heat observed is defined as ΔHc. Furthermore, after keeping it at –10° C. for 5 minutes, heating it up at a rate of 10° C./minute, the melting heat absorption obtained by this procedure is taken as ΔH, and the peak top of the peak observed at the highest temperature zone of the melting heat absorption curve is defined as the melting point: Tm–P.

Furthermore, 1-butene based polymer used for the 1-butene based resin composition of the present invention may be a crystalline resin having a melting point (Tm–D) of 0 to 100° C. as measured by Differential Scanning Calorimeter (DSC) due to its softness. Tm–D is preferably 0 to 80° C. Tm–D is obtained by DSC measurement. Namely, using Differential Scanning Calorimeter (manufactured by PerkinElmer, DSC-7), after keeping 10 mg of sample at −10° C. for 5 minutes under nitrogen atmosphere, melting heat absorption observed by heating it at a rate of 10° C./min. is defined as ΔH–D. The peak top of the peak observed at the highest temperature zone of the melting heat absorption curve is the melting point (Tm–D).

Such a 1-butene based polymer is a crystalline polymer satisfying above described (1) to (4):
(1) Crystalline resin having a melting point (Tm–D) in the range of 0 to 100° C., wherein the melting point is defined as the peak top of the peak observed in the highest temperature zone of the melting heat absorption curve obtained by heating a sample of the polymer at a rate of 10° C./minute using the Differential Scanning Calorimeter (DSC), after keeping the sample in advance at −10° C. for 5 minutes under nitrogen atmosphere.
(2) Stereoregularity index {(mmmm)/(mmrr+rmmr) }is at most 20.
(3) Molecular weight distribution (Mw/Mn) measured by Gel Permeation Chromatograph (GPC) method is at most 4.0.
(4) Weight average molecular weight (Mw) measured by GPC is in the range of 10,000 to 1,000,000.

1-butene based polymer used for the 1-butene based resin composition of the present invention preferably has melting heat absorption ΔH–D of 50 J/g at highest, more preferably 10 J/g at highest, so that it is superior in flexibility. ΔH–D is an index for flexibility. The higher this value becomes, the higher is the modulus of elasticity, meaning decrease of flexibility.

1-butene homopolymer for the 1-butene based resin composition of the present invention has stereoregularity index {(mmmm)/(mmrr+rmmr)}, obtained from the ratio of 1-butene chain (mmmm) and (mmrr+rmmr), of at most 20, preferably at most 18, more preferably at most 15. If the stereospecific regularity index exceeds 20, decrease of flexibility, decrease of heat sealing property and decrease of hot tacking property occur.

Mesopentad fraction (mmmm) and abnormal insertion content (1,4 insertion fraction) are obtained by the same method as described above. Stereoregularity index {(mmmm)/(mmrr+rmmr)} is calculated from the measured values of (mmmm), (mmrr) and (rmmr) by the above mentioned method, and racemic triad fraction (rr) is also calculated by the above method.

1-butene based polymer for the 1-butene based resin composition of the present invention, in addition to above requirements, has molecular weight distribution (Mw/Mn), measured by GPC method, of at most 4, preferably at most 3.5, more preferably at most 3.0. When the molecular weight distribution (Mw/Mn) exceeds 4, stickiness may occur.

1-butene based polymer in the 1-butene based resin composition of the present invention, in addition to above requirements, has weight average molecular weight Mw, measured by GPC method, in the range of 10,000 to 1,000,000, preferably 100,000 to 1,000,000. When the weight average molecular weight Mw is less than 10,000, stickiness may occur. When it exceeds 1,000,000, fluidity may decrease leading to decrease of processability.

Above described molecular weight distribution (Mw/Mn) is calculated from the weight average molecular weight Mw and number average molecular weight Mn, converted to polystyrene equivalent, measured by GPC method, using above mentioned equipment and conditions.

1-butene based polymer in the 1-butene based resin composition of the present invention, in addition to above requirements, has preferably melting heat absorption ΔH of 50 J/g at highest, more preferably 20 J/g at highest, as measured by DSC method, to have superior flexibility. ΔH is an index of flexibility, the higher this value becomes, the higher is the modulus of elasticity, meaning a decrease of flexibility. The ΔH is determined by the above described method.

1-butene based polymer in the 1-butene based resin composition has mesopentad fraction (mmmm) of preferably 20 to 90%, more preferably 30 to 85%, most preferably 30 to 80%. When the mesopentad fraction is less than 20%, sticky surface of the formed product and decrease of transparency may occur. On the other hand, when it exceeds 90%, decrease of flexibility, decrease of heat sealing property and decrease of hot tacking property may occur.

Moreover, 1-butene homopolymer in the 1-butene based resin composition preferably satisfies the relationship of (mmmm)≦90−2×(rr), more preferably satisfying the relationship of (mmmm)≦87−2×(rr). When this relationship is not satisfied, sticky surface of the formed product and decrease of transparency may occur.

1-butene based polymer in the 1-butene based resin composition of the present invention or the 1-butene based resin composition has 0 to 80 weight % of component soluble in hexane at 25° C. (H25), more preferably 0 to 60 weight %, most preferably 0 to 50 weight %. H25 is an index of amount of sticky component which causes stickiness and decrease of transparency, the higher this value becomes, the more is the sticky component. When H25 exceeds 80 weight %, blocking may occur due to a high amount of sticky component, and may not be used for food and medical applications.

H 25 is a weight loss fraction calculated according to the following formula, based on the measurement of weight of the 1-butene based polymer or polyolefin based resin composition before ($W_0$) (0.9 to 1.1 g), and keeping the polymer in 200 ml of hexane at 25° C. for 4 days, and weight ($W_1$) measured after drying:

$$H25 = [(W_0 - W_1)/W_0] \times 100\%$$

For requirements (5) to (6), namely, 1-butene homopolymer or 1-butene based copolymer obtained by co-polymerizing 1-butene and ethylene and/or α-olefin having 3 to 20 carbon atoms (except 1-butene), having at least 90 mol % structural unit originated from 1-butene, is required to have type II crystal fraction (CII) of at most 50%, preferably at most 20%, more preferably 0%, as determined by X-ray diffraction analysis, made after melting at 190° C. for 5 minutes, followed by cooling rapidly with ice water to solidify, and keeping at room temperature for 1 hour. Type II crystal ratio (CII) is obtained by the method described above.

Moreover, for requirements (5) to (6), weight average molecular weight (Mw) measured by GPC method is preferably 10,000 to 1,000,000, more preferably 100,000 to 1,000,000, further preferably 100,000 to 500,000. When Mw is less than 10,000, stickiness may occur, On the other hand, when it exceeds 1,000,000, fluidity decreases leading to inferior processability. The measuring methods of above Mw/Mn and Mw are the same as described above.

[2] Production Method of 1-Butene Based Polymer

The production method described above may be applied.

[3] 1-Butene Based Resin Composition 1-butene based resin composition is obtained by adding nucleating agent to 1-butene based polymer.

In general, it is known that crystallization process of 1-butene based polymer comprises two processes of crystal nucleation and crystal growth, and in crystal nucleation process, factors such as temperature deviation from crystallization temperature and the state of orientation of molecular chain affect the crystal nucleation rate. It is also known that crystal nucleation rate is significantly increased particularly when there is a substance which enhances orientation of molecular chain through adsorption of the molecular chain. Above nucleating agent may be any substance which enhances crystal nucleation rate. Example of such substance is the substance which enhances orientation of molecular chain through adsorption process of the polymer chain.

Specific examples of above nucleating agent include the same as above described. Film formed from 1-butene based polymer composition containing amide compound as nucleating agent is particularly superior in rigidity, and as rolling wrinkle problem in high speed bag making machine is not likely to occur, it is suitably used for all general purpose packaging film production by high speed bag making machine. Examples of the amide compound include dianilide adipate, and dianilide suberiate.

Dosage of above nucleating agent, as mentioned above, is normally at least 10 ppm on 1-butene based polymer, preferably 50 to 3000 ppm. When it is less than 10 ppm, no effect is observed on improvement of processability. On the other hand, higher dosage may not be necessarily effective.

Although it depends on the kind of nucleating agent, generally from view point of transparency and impact strength of 1-butene based polymer composition, the dosage at most 1000 ppm, and further at most 500 ppm is particularly preferred. More specifically, dosage for sorbitol based nucleating agent, dibenzylidenesorbitol, is at most 3000 ppm, preferably 1500 ppm, and at most 500 ppm is particularly preferable. For bis (p-methyl-benzylidene) sorbitol and bis (dimethylbenzylidene) sorbitol, dosage is at most 1200 ppm, preferably at most 600 ppm, and at most 300 ppm is particularly preferable.

In case of organic metal phosphate such as organic sodium phosphate, dosage is at most 500 ppm, preferably 250 ppm, and at most 125 ppm is particularly preferable. For organic aluminum phosphate, at most 1900 ppm, preferably at most 1500 ppm, and at most 500 ppm is particularly preferable. In case of talc such as talc MMR manufactured by Asada Seifun CO., LTD. at most 4000 ppm, preferably at most 2000 ppm, and at most 1000 ppm is particularly preferable. In case of amide compound such as Njester-NU-100 manufactured by New Japan Chemical CO., LTD. at most 3000 ppm, preferably at most 1500 ppm, and at most 500 ppm is particularly preferable.

1-butene based resin composition of the present invention is produced by the same production method as described above. Namely, by mixing 1-butene based polymer and above nucleating agent and other additives if desired, by means of (1) dry blending using Henschel mixer or the like, (2) melt kneading using single screw or twin screw extruder, Banbury mixer or the like, (3) when high melting point polymer is used as nucleating agent, by adding high melting point polymer, at once or gradually, in a reactor during polymerization reaction of 1-butene based polymer. Examples of additives, used if desired, include anti-oxidant, neutralizing agent, slip agent, antiblocking agent, antihaze agent, or antistatic agent.

Moreover, 1-butene based resin composition preferably satisfies the relationship between melting point TmC (° C.) and crystallization time t (min) as $0 \leq TmC \leq 100$, and $t \leq 40-0.34 \times TmC$, more preferably as $t \leq 35-0.34 \times TmC$. When $t \leq 40-0.34 \times TmC$ is not satisfied, a balance between melting point and crystallization time is not appropriate, and especially the secondary processability such as heat seal and hot tack properties becomes inferior.

Furthermore, 1-butene based resin composition of the present invention preferably satisfies the relationship between melting point TmC (° C.) and crystallization time t (minute) of 1-butene based resin composition; and a relationship between melting point TmP (° C.) and crystallization time t P (minute) of 1-butene based polymer; as $TmC-TmP \leq 8$ and $t-tP \leq -4$, more preferably to satisfy $TmC-TmP \leq 4$ and $t-tP \leq -6$. Further preferable is to satisfy $TmC-TmP \leq 2$ and $t-tP \leq -8$. This relationship represents a balance between a decrease of secondary processability due to higher melting point caused by addition of nucleating agent, and an improvement of moldability due to an enhanced crystallization rate.

[4] Formed Product

Formed product obtained by forming above 1-butene based resin composition has superior transparency and flexibility as well as high crystal stabilization rate. Formed products include film, sheet, container, interior materials for automobile, housing materials for electric home appliances. Examples of film include food packaging film and agricultural film (e.g., vinyl plastic hot house). Examples of container include case, box and vanity case.

Examples of forming method for formed product include injection molding, press molding, injection press molding, gas-assist injection molding, extrusion molding and blow molding.

Condition of molding is not particularly limited as long as temperature condition is suitable for the resin to melt and flow, normally, resin temperature of 50° C. to 300° C. and mold temperature of 60° C. at highest are employed.

Forming film as the formed product of the present invention can be made by generally employed processes such as press molding, extrusion molding, blow molding and cast molding.

Film obtained by forming 1-butene based resin composition of the present invention may be stretched or not stretched. For stretching, it is preferably made by biaxial stretching. Conditions of biaxial stretching are as follows:

(1) Sheet Forming Condition

Resin temperature 50 to 200° C., chilled roll temperature 50° C. at highest (2) Vertical Stretching Conditions Stretching ratio 3 to 7, stretching temperature 50 to 100° C.

(3) Horizontal Stretching Conditions

Stretching ratio 6 to 12, stretching temperature 50 to 100° C.

Film obtained by forming 1-butene based resin composition of the present invention may be surface treated to increase surface energy, or polarize the surface. Examples of treating method include corona discharge treatment, chromic acid treatment, flame treatment, hot air treatment, ozone or ultraviolet irradiation treatment. For making surface rough, for example, sand blasting method or solvent treating method may be employed.

For the film obtained by forming 1-butene based resin composition of the present invention, generally used additives such as antioxidant, neutralizing agent, slip agent, antiblocking agent, antihaze agent, or antistatic agent may be added, if necessary.

As the film containing inorganic fine particles like talc is superior in slip property, secondary processability such as bag making and printing is improved, and is suitable for all the general purpose packaging films processed in a high speed processing machine for various automatic filling, packaging, laminating and the like.

Multi-layer film can be produced from the 1-butene based resin composition of the present invention. The production method of the 1-butene based resin multi-layer product is not particularly limited, for example, melt co-extruding method may be employed. Especially, T die-casting method is preferable which allows high speed molding by a large molding machine. Take-off speed is normally 50 m/minute or higher speed may be employed. Thickness of the multi-layer film is not particularly limited, normally it is around 10 to 5000 µm.

Formed product (press molded) of 1-butene based resin composition of the present invention is superior in transparency and flexibility with improved crystal stabilization rate, and the film of 1-butene based resin composition is superior in low temperature heat sealing, heat sealing and anti-blocking properties.

Next, the present invention will be described in more detail with reference to examples, but the scope of the present invention should not be limited at all by these examples.

Evaluation methods of characteristics and properties of the resin in Table 1 are as follows:

(1) Measurement of mesopentad fraction, racemic triad fraction, abnormal insertion content, and stereoregularity index:

Measured by the methods described in the text of the patent specification.

(2) Measurement of weight average molecular weight (Mw) and molecular weight distribution (Mw/Mn):

Measured by the methods described in the text of the patent specification.

(3) Measurement of co-monomer content and random index R:

Measured by the methods described in the text of the patent specification.

(4) Measurement of H25

Measured by the methods described in the text of the patent specification.

(5) DSC measurement (measurement of melting point: Tm)

Measured by the methods described in the text of the patent specification.

Namely, using a Differential Scanning Calorimeter (manufactured by PerkinElmer, DSC-7), melting 10 mg of sample in advance at 220° C. for 3 minutes under nitrogen atmosphere, cooling it down to −40° C. at a rate of 10° C./minute, keeping it at −40° C. for 3 minutes, then heating it up at a rate of 10° C./minute. The melting heat absorption measured by this procedure was defined as ΔH, and the peak top of the maximum peak in the melting heat absorption curve was defined as melting point Tm.

(6) DSC measurement (measurement of melting point: Tm–P and Tm–D)

Measured by the methods described in the text of the patent specification.

Namely, using a Differential Scanning Calorimeter (manufactured by PerkinElmer, DSC-7), melting 10 mg of the sample in advance at 190° C. for 5 minutes under nitrogen atmosphere, cooling it down to −10° C. at a rate of 5° C./minute, keeping it at −10° C. for 5 minutes, then heating it up at a rate of 10° C./minute. The melting heat absorption obtained by this procedure is defined as ΔH–P, and the peak top of the peaks observed at highest temperature zone of the melting heat absorption curve is defined as the melting point: Tm–P.

Using a Differential Scanning Calorimeter (manufactured by PerkinElmer, DSC-7), previously keeping 10 mg of sample at −10° C. for 5 minutes, then heating it up at 10° C./minutes rate. The melting heat absorption obtained by this procedure is defined as ΔH–D, and the peak top of the peak observed at highest temperature zone of the melting heat absorption curve is defined as the melting point: Tm–D.

(7) Measurement of tensile modulus of elasticity

A test piece was prepared by press molding the polymer, and measurement was made according to JIS K-7113, under the following condition:

Cross head speed: 50 mm/min (8) Internal haze

A test piece of 15 cm×15 cm×1 mm was prepared by press molding the polymer, and measurement was made according to JIS K-7105.

(9) Measurement of Type II crystal fraction (CII)

Measured by the methods described in the text of the patent specification.

Evaluation methods for resin characteristics of 1-butene based polymer and formed product from polyolefin based resin in Table 2 and production examples 2, 3 are as follows:

(Resin Characteristics of 1-Butene Based Polymer)

(1) Mesopentad fraction, racemic triad fraction, abnormal insertion content, and stereoregularity index Measured by the methods described in the text of the patent specification.

(2) Weight average molecular weight (Mw) and molecular weight distribution (Mw/Mn)

Measured by the methods described in the text of the patent specification.

(3) Measurement of H25

Measured by the methods described in the text of the patent specification.

(4) DSC measurement (measurement of melting point: Tm–P and Tm–D, melting heat absorption: ΔH and ΔH–D)

Measured by the methods described in the text of the patent specification.

Namely, using a Differential Scanning Calorimeter (manufactured by PerkinElmer, DSC-7), melting 10 mg of sample in advance at 190° C. for 5 minutes under nitrogen atmosphere, cooling it down to −10° C. at a rate of 5° C./minute, keeping it at −10° C. for 5 minutes, then heating it up at a rate of 10° C./minute. The melting heat absorption measured by this procedure is defined as ΔH, and the peak top of the peak observed at highest temperature zone of the melting heat absorption curve is defined as the melting point: Tm–P (° C.).

Using a Differential Scanning Calorimeter (manufactured by PerkinElmer, DSC-7), keeping 10 mg of sample in advance at −10° C. for 5 minutes, then heating it up at a rate of 10° C./minute. The melting heat absorption measured by this procedure is defined as ΔH–D, and the peak top of the peak observed at highest temperature zone of the melting heat absorption curve is defined as the melting point: Tm–D.

(Evaluation of Properties of Press-Molded Product)

(5) Tensile modulus of elasticity

Test piece was prepared by press molding pellets of the resin composition, and measured according to JIS K-7113, under the following condition:

Test piece (Dumbbell No.2) thickness: 1 mm

Cross-head speed: 50 mm/minute

Load cell: 100 kg (6) Izod impact strength

Test piece was prepared by press molding pellets of the resin composition, and measured at 23° C. according to JIS K-7110.

(7) Measurement of H25

Measured by the methods described in the text of the patent specification.

(Evaluation of Film Properties)

(8) Tensile modulus of elasticity

Measured according to JIS K-7127, under the following conditions:

Cross head speed: 500 mm/minute

Load cell: 15 kg

Measurement direction: machine direction (MD direction)

(9) Melting point (TmF)

Measured by the DSC method. Namely, using a Differential Scanning Calorimeter (manufactured by PerkinElmer, DSC-7), melting 10 mg of the sample in advance at 190° C. for 5 minutes under nitrogen atmosphere, cooling it down to −10° C. at a rate of 5° C./minute, keeping it at −10° C. for 5 minutes, then heat absorption curve was obtained by heating it up at a rate of 10° C./minute, the peak top of the peak observed at highest temperature zone of the melting heat absorption curve is defined as the melting point: Tm F(° C.).

(10) Heat seal temperature

Measured according to JIS Z-1707. Melt sticking condition is shown below. Heat seal bar temperature was calibrated by surface thermometer. After sealing, the test piece was left for one day, then pealing strength was measured by T type pealing method with pealing speed of 200 mm/min at room temperature. Heat seal temperature was defined as the temperature at which pealing strength is 300 g/15 mm, determined by calculation from seal temperature—pealing strength curve.

Sealing time: 2 seconds

Seal area: 15×10 mm

Sealing pressure: 0.52 MPa

Sealing temperature: Measured at several points for interpolation.

(11) Anti-blocking property

Using two sheets of films, one metal roll surface and another anti-metal roll was closely contacted with each other under the following conditions, and pealing strength of 10 cm×10 cm area was measured by the following pealing test. The smaller the pealing strength, the superior the anti-blocking property:

Contact condition:

temperature 60° C., 3 hours load 36 g/cm$^2$, area 10 cm×10 cm

Pealing test:

test speed: 20 mm/min load cell: 2 kg

(12) Internal haze

To avoid surface scattering, silicone oil (Shin-Etsu Silicone Co., Ltd.: KF56) was applied on the surface of the test film, and measured according to JIS K-7105. Evaluation method of resin characteristics and properties of the formed product of 1-butene based polymer and 1-butene based resin composition in Table 3 are as follows.

(Resin Characteristics)

(1) Mesopentad fraction, racemic triad fraction, abnormal insertion content and stereoregularity Measured by the methods described in the text of the patent specification.

(2) Weight average molecular weight (Mw) and molecular weight distribution (Mw/Mn)

Measured by the methods described in the text of the specification.

(3) DSC measurement (3-1) DSC measurement of 1-butene based polymer

Measured by using a Differential Scanning Calorimeter (manufactured by PerkinElmer, DSC-7), melting 10 mg of the sample in advance at 190° C. for 5 minutes under nitrogen atmosphere, cooling it down to −10° C. at a rate of 5° C./minute, crystallization heat observed in this process was defined as ΔHc, and the peak top of the maximum peak of this crystallization heat curve was defined as crystallization temperature Tc (° C.). Further, after keeping it at −10° C. for 5 minutes, heat absorption curve was obtained by heating it up at a rate of 10° C./minute, the heat absorption observed in this process was defined as ΔH and the peak top of the peak observed at the highest temperature zone of the melting heat absorption curve is defined as the melting point: TmP.

(3-2) DSC measurement of 1-butene based resin composition

Measured by using a Differential Scanning Calorimeter (manufactured by PerkinElmer, DSC-7), melting 10 mg of the sample in advance at 190° C. for 5 minutes under nitrogen atmosphere, cooling it down to −10° C. at a rate of 5° C./minute, crystallization heat observed in this process was defined as ΔHc, and the peak top of the maximum peak of this crystallization heat curve was defined as crystallization temperature Tc (° C.). Further, after keeping it at −10° C. for 5 minutes, heat absorption curve was obtained by heating it up at a rate of 10° C./minute, the heat absorption observed in this process was defined as ΔH and the peak top of the peak observed at the highest temperature zone of the melting heat absorption curve is defined as the melting point: (TmC).

(4) Crystallization time (4-1) Crystallization time of 1-butene based polymer

Measured by using a Differential Scanning Calorimeter (manufactured by PerkinElmer, DSC-7), melting 10 mg of the sample in advance at 190° C. for 5 minutes under nitrogen atmosphere, cooling it down rapidly to 25° C. and keeping it at 25° C. From the time at this point until the time where crystallization heat peak was observed was defined as crystallization time (t P).

(4-2) Crystallization time of 1-butene based resin composition

Measured by using a Differential Scanning Calorimeter (manufactured by PerkinElmer, DSC-7), melting 10 mg of sample, in advance, at 190° C. for 5 minutes under nitrogen atmosphere, cooling it down rapidly to 25° C. and keeping it at 25° C. From the time at this point until the time where crystallization heat peak was observed was defined as crystallization time (t).

(5) Type II crystal fraction (CII)

Measured by the methods described in the text of the specification.

(Evaluation of Properties of Press Molded Product)

(6) Tensile modulus of elasticity

Test piece was prepared by press molding the resin composition, and measured according to JIS K-7113, under the following condition:

Cross head speed: 50 mm/min (7) Internal haze

Measured by the test according to JIS K-7105

EXAMPLE 1

[1] Preparation of Catalyst (1) Production of 2-chlorodimethylsilylindene

Under nitrogen flow, 50 ml of THF (tetrahydrofuran) and 2.5 g (41 mmol) of magnesium was placed in a 1 liter 3-necked flask, to which 0.1 ml of 1 2-dibromoethane was added and stirred for 30 minutes to activate magnesium. After stirring, solvent was withdrawn and 50 ml of THF was newly added. To this, 5.0 g (25.6 mmol) of 2-bromoindene in THE (200 ml) solution was dropped in 2 hours. Then the solution was stirred at room temperature for 2 hours and cooled down to −78 ° C., to which 3.1 ml (25.6 mmol) of dichlorodimethylsilane in THF (100 ml) solution was dropped in one hour, followed by stirring for 15 hours and the solvent was distilled off. The residue was extracted by 200 ml of hexane and by distilling off the solvent, 6.6 g (24.2 mmol) of 2-chloro-dimethyl-silylindene was obtained (yield 94%).

(2) Production of (1,2'-dimethylsilylene)(2,1'-dimethylsilylene)-bis (indene)

Under nitrogen flow, 400 ml of THF and 8 g of 2-chlorodimethylsilylindene were placed in a 1 liter three-necked flask and cooled down to −78° C. Into this solution, 38.5 ml (38.5 mmol) of THF solution (1.0 mol/liter) of Li N (Si Me$_3$)$_2$ was dropped.

After stirring at room temperature for 15 hours, the solvent was distilled off and the residue was extracted by 300 ml of hexane. By distilling off the solvent, 2.0 g (6.4 mmol) of (1,2'-dimethylsilylene)(2,1'-dimethylsilylene)-bis (indene) was obtained (yield 33.4%).

(3) Production of (1,2'-dimethylsilylene)(2,1'-dimethylsilylene)-bis(indenyl) zirconium dichloride.

2.2 g (6.4 mmol) of(1,2'-dimethylsilylene)(2,1'-dimethylsilylene)-bis (indene) and 100 ml of ether were placed in a Schlenk tube and cooled down to −78° C., to which 9.6 ml (15.4 mmol) of n-butyllithium (hexane solution: 1.6 mol/liter) was added and stirred for 12 hours at room temperature. After distilling off the solvent, and by washing the obtained solid by 20 ml of hexane, lithium salt was obtained. The lithium salt obtained was dissolved in 100 ml of toluene. 1.5 g (6.4 mmol) of zirconium tetrachloride and 100 ml of toluene were placed in another Schlenk tube. 100 ml of toluene was placed in a 500 ml three-necked flask. While cooling the flask to 0° C. and stirring it, equivalent amounts of above lithium salt and zirconium tetrachloride were dropped for one hour using a cannular, followed by stirring at room temperature for one night. The solution was filtered and the solvent was distilled off. By re-crystallization of the obtained solid using dichloromethane, 1.2 g (2.4 mmol) of (1,2'-dimethylsilylene)(2,1'-dimethylsilylene)-bis (indenyl) zirconiumdichloride (yield 37%) was obtained.

Result of $^1$H-NMR obtained for this product was as follows:

$^1$H-NMR (CDCl$_3$): 0.85, 1.08 (6H,s), 7.11 (2H, s), 7.2–7.7 (8H, m)

[2] Polymerization 200 ml of 1-butene and 5 mmol of methylaluminoxane was placed in a heat dried 1 liter autoclave and 0.1 MPa of hydrogen was introduced. After stirring and heating to 65° C., 5 micro mol of (1,2'-dimethylsilylene)(2,1'-dimethylsilylene)-bis(indenyl) zirconium dichloride obtained in [1] was added and polymerization took place for 15 minutes. After polymerization was completed, the product was dried under reduced pressure, and obtained 65 g of 1-butene homopolymer.

Mesopentad fraction (mmmm), stereoregularity index {(mmmm)/(mmrr+rmmr)}, racemic triad fraction (rr), abnormal insertion content, weight average molecular weight (Mw), molecular weight distribution (Mw/Mn), melting point (Tm) and melting heat absorption (ΔH) were measured according to the above described methods. The results were shown in Table 1.

EXAMPLE 2

[1] Catalyst Preparation (1) Production of (1,2'-Si Me$_2$)(2,1'-SiMe$_2$)(indenyl)(3-trimethylsilylmethylindenyl) Zirconium dichloride Under nitrogen flow, 50 ml of ether and 3.5 g (10.2 mmol) of(1,2'-SiMe$_2$)(2,1'-SiMe$_2$)-bis(indene) was placed in 200 ml Schlenk tube, into which hexane solution(1.6 M, 12.8 ml) of n-butyllithium (n-BuLi) was dropped at −78° C. After stirring at room temperature for 8 hours, solvent was distilled off and drying the obtained solid under reduced pressure, 5.0 g of white solid was obtained. Dissolving this solid in 50 ml of THF, to which 1.4 ml of (iodomethyl) trimethylsilane was dropped at room temperature. After adding 10 ml of water, organic phase was extracted with 50 ml of ether. Organic phase was dried, and the solvent was distilled off. 50 ml of ether was added to this, and hexane solution (1.60M, 12.4 ml) of n-Bu Li was dropped at −78° C. After heating it to room temperature and stirring for 3 hours, ether was distilled off. Obtained solid was washed with 30 ml of hexane and dried under reduced pressure. 5.11 g of this white solid was suspended in 50 ml of toluene, to which 2.0 g (8.6 mmol) of zirconium tetrachloride suspended in 10 ml of toluene was dropped. After stirring at room temperature for 12 hours, the solvent was distilled off and the residue was washed with 50 ml of hexane. By re-crystallization of the residue using 30 ml of dichloromethane, 1.2 g of yellowish fine crystal was obtained (yield 25%).

$^1$H-NMR (90 MHz, CDCl$_3$): δ-0.09 (s, —SiMe$_3$, 9H); 0.89, 0.86, 1.03, 1.06 (s,-Me$_2$ Si—, 12H); 2.20, 2.65 (d, —CH$_2$—, 2H); 6.99 (s, CH, 1H); 7.0–7.8 (m, ArH, 8H)

[2] Polymerization 200 ml of 1-butene and 5 mmol of methylaluminoxane were placed in a heat dried 1 liter autoclave, and 0.1 MPa of hydrogen was introduced. After stirring and heating to 55° C., 5 micro mol of (1,2'-dimethylsilylene)(2,1'-dimethylsilylene)(3-trimethylsilylmethylindenyl) (indenyl) zirconium dichloride was added and polymerization took place for 30 minutes. After the polymerization was completed, the reactant was dried under reduced pressure and 43 g of 1-butene homopolymer was obtained.

Mesopentad fraction (mmmm), stereoregularity index {(mmmm)/(mmrr+rmmr)}, racemic triad fraction (rr), abnormal insertion content, weight average molecular weight (Mw), molecular weight distribution (Mw/Mn), melting point (Tm) and melting heat absorption (ΔH) were measured for the obtained 1-butene homopolymer. The results were shown in Table 1.

COMPARATIVE EXAMPLE 1

(1) Preparation of Magnesium Compound

After purging thoroughly with nitrogen a glass reactor of 6 liter internal volume equipped with a stirrer, about 2430 g of ethanol, 16 g of iodine and 160 g of metallic magnesium were charged into the reactor, reaction was carried out by heating with agitation under reflux condition until generation of hydrogen gas diminished, and a solid product was obtained. By drying the product under a reduced pressure, a magnesium compound was obtained.

(2) Preparation of Solid Catalyst Component (A)

After purging thoroughly with nitrogen a glass reactor of 5 liter internal volume, 160 g of the magnesium compound (not pulverized) obtained in above (1), 80 ml of purified heptane, 24 ml of silicon tetrachloride and 23 ml of diethylphthalate were charged. Keeping the mixture at 80° C., 770 ml of titanium tetrachloride was added under agitation, then the solution was reacted at 110° C. for 2 hours and the solid product was separated and washed with purified heptane at 90° C. Further, 1220 ml of titanium tetrachloride was added and reaction was carried out at 110° C. for 2 hours. After washing with purified heptane, solid catalyst component (A) was obtained.

(3) Polymerization

In a 1 liter autoclave, dried by heating, 200 ml of 1-butene, 2 mmol of triethylaluminium, 0.25 mmol of cineol were charged, and 0.1 MPa of hydrogen was introduced. After heating up to 70° C. under stirring, 5 $\mu$mol, in terms of titanium concentration, of the solid catalyst component (A) was added and polymerization reaction took place for 60 minutes. After the polymerization was completed, the product was dried under reduced pressure and 27 g of 1-butene based copolymer was obtained. For the obtained 1-butene homopolymer, mesopentad fraction (mmmm), racemic triad fraction (rr), abnormal insertion content, weight average molecular weight (Mw), molecular weight distribution (Mw/Mn), melting point (Tm. Tm–P), melting heat absorption ($\Delta$H. $\Delta$H–P), tensile modulus of elasticity and internal haze were measured according to the above described methods. The result is shown in Table 1.

EXAMPLE 3

(1) Preparation of Catalyst

In the same manner as Example 1, (1,2'-dimethylsilylene) (2,1'-dimethyl-silylene)-bis(indenyl) zirconium dichloride was prepared.

(2) Polymerization

In a 1 liter autoclave, dried by heating, 200 ml of 1-butene and 10 mmol of methylaluminoxane were charged and after heated to 50° C. under stirring, 10 $\mu$mol of (1,2'-dimethylsilylene)(2,1'-dimethylsilylene)-bis(indenyl) zirconium dichloride obtained in above (1) was added and polymerization reaction was carried out for 60 minutes. After completion of the polymerization, the product was dried under reduced pressure and 7 g of 1-butene homopolymer was obtained.

For the obtained 1-butene homopolymer, mesopentad fraction (mmmm), stereoregularity index {(mmmm)/(mmrr+rmmr)}, racemic triad fraction (rr), abnormal insertion content, weight average molecular weight (Mw), molecular weight distribution (Mw/Mn), melting point (Tm, Tm–P), melting heat absorption ($\Delta$H, $\Delta$H–P), tensile modulus of elasticity and internal haze were measured according to the above described methods. The results are shown in Table 1.

EXAMPLE 4

(1) Preparation of Catalyst

In the same manner as Example 1, (1,2'-dimethylsilylene) (2,1'-dimethyl-silylene)-bis(indenyl) zirconium dichloride was prepared.

(2) Polymerization

In a 1 liter autoclave, dried by heating, 200 ml of 1-butene and 10 mmol of methylaluminoxane was charged, followed by introduction of 0.1 MPa of hydrogen and 0.1 MPa of ethylene. After heating to 50° C. under stirring, 10 $\mu$mol of (1,2'-dimethylsilylene)(2,1'-dimethylsilylene)-bis(indenyl) zirconium dichloride obtained in above (1) was added and polymerization was carried out for 60 minutes. After completion of the polymerization, the product was dried under reduced pressure and 20 g of 1-butene based copolymer was obtained.

For the obtained 1-butene based copolymer, stereoregularity index, ethylene unit content, weight average molecular weight (Mw), molecular weight distribution (Mw/Mn), melting point (Tm), melting heat absorption ($\Delta$H) were measured according to the above mentioned methods. The results are shown in Table 1.

EXAMPLE 5

(1) Preparation of (1,2'-dimethylsilylene)(2,1'-dimethylsilylene)-bis(3-trimethyl-silylmethylindenyl) zirconium dichloride.

3 g (6.97 mmol) of lithium salt of (1,2'-dimethylsilylene) (2,1'-dimethylsilylene)-bis(indene) was dissolved in 50 ml of THF in Schlenk tube and cooled down to –78° C., into which 2.1 ml (14.2 mmol) of (iodomethyl) trimethylsilane was gradually dropped and stirred at room temperature for 12 hours. After solvent was distilled off, 50 ml of ether was added and washed with saturated solution of ammonium chloride. Organic phase was separated and dried by distilling off the solvent and thus 3.04 g (5.88 mmol) of (1,2'-dimethylsilylene)(2,1'-dimethylsilylene)-bis(3-trimethylsilylmethylindene) was obtained (yield 84%).

Next, under nitrogen flow, 3.04 g (5.88 mmol) of (1,2'-dimethylsilylene)(2,1'-dimethy-Isilylene)-bis(3-trimethylsilylmethylindene) and 50 ml of ether was charged in a Schlenk tube, into which hexane solution of n-BuLi [1.54M, 7.6 ml (1.7 mmol)] was dropped after cooling down to –78° C. After heating it up to room temperature, agitated for 12 hours and ether was distilled off. Obtained solid was washed with 40 ml of hexane and 3.06 g (5.07 mmol) of lithium salt was obtained as an addition complex of ether (yield 73%).

Results of measurement by $^1$H-NMR (90 MHz, THF-d$_8$) were $\delta$0.04 (s, 18H, trimethylsilyl); 0.48 (s, 12H, dimethylsilylene); 1.10 (t, 6H, methyl); 2.59 (s, 4H, methylene); 3.38 (q, 4H, methylene); 6.2–7.7 (m, 8H, Ar—H).

The obtained lithium salt was dissolved in 50 ml of toluene under nitrogen flow and cooled down to –78° C., into which 1.2 g (5.1 mmol) of zirconium tetrachloride suspended in 20 ml of toluene and cooled to –78° C. in advance, was dropped and agitated at room temperature for 6 hours. After distilling off the solvent, the obtained residue was re-crystallized using dichloromethane and 0.9 g (1.33 mmol) of (1,2'-dimethylsilylene)(2,1'-dimethylsilylene)-bis (3-trimethyl-silylmethyl indenyl) zirconium dichloride was obtained (yield 26%).

Results of $^1$H-NMR(90 MHz, CDCl$_3$) measurement were $\delta$0.0 (s, 18H, trimethylsilyl); 1.02, 1.12 (s, 12H, dimethylsilylene); 2.51 (dd, 4H, methylene); 7.1–7.6 (m, 8H, Ar—H).

(2) Polymerization

In a 1 liter autoclave, dried by heating, 200 ml of 1-butene and 1 mmol of aluminoxane was charged and 0.03 MPa of hydrogen was introduced. After heating to 50° C. under stirring, 1 $\mu$mol of (1,2'-dimethyl-silylene)(2,1'-dimethy-Isilylene)-bis(3-trimethylsilylmethylindenyl) zirconium dichloride was added and polymerization was carried out for 20 minutes. After completion of the polymerization, the product was dried under reduced pressure, and 21 g of 1-butene based copolymer was obtained.

For the obtained 1-butene based copolymer, mesopentad fraction (mmmm), stereoregularity index {(mmmm)/(mmrr+rmmr}, racemic triad fraction (rr), abnormal insertion content, weight average molecular weight (Mw), molecular weight distribution (Mw/Mn), melting point (Tm, Tm–P), melting heat absorption ($\Delta$H, $\Delta$H–P), tensile modulus of elasticity and internal haze were measured according to the above described methods. The results are shown in Table 1.

EXAMPLE 6

20 parts by weight of 1-butene homopolymer obtained in Example 1, and 90 parts by weight of polypropylene resin manufactured by Idemitsu Petrochemical Co.,Ltd. (J2000GP) were extruded using a single screw extruder (manufactured by Tsukada Jyuki Seisakusho CO., LTD.: TLC35-20) to obtain pellets.

For the obtained pellets, tensile modulus of elongation and internal haze were measured according to the methods described above. The results are shown in Table 1. As shown in Table 1, the tensile modulus of elasticity is lower than Comparative Example 2 to be described later, indicating an effect of reforming agent for flexibility.

COMPARATIVE EXAMPLE 2

For the polypropylene resin (J2000GP) manufactured by Idemitsu Petrochemical Co., Ltd., tensile modulus of elasticity and internal haze were measured according to the method described above. The results are shown in Table 1.

EXAMPLE 7

(1) Preparation of Catalyst

In the same manner as described in Example 5, (1,2'-dimethylsilylene)(2,1'-dimethylsilylene)-bis (3-trimethylsilylmethylindenyl) zirconium dichloride was prepared.

(2) Polymerization

In a 1 liter autoclave, dried by heating, 200 ml of heptane, 200 ml of 1-butene, 0.5 mmol of triisobutylaluminum were charged and 0.03 MPa of hydrogen was introduced. After stirring and heating to 60° C., 0.5 mmol of methylaluminoxane and 0.5 µmol of (1,2'-dimethylsilylene)(2,1'-dimethylsilylene)-bis (3-trimethylsilylmethylindenyl) zirconium dichloride obtained in (1) were added and polymerization reaction was carried out for 30 minutes. After the polymerization was completed, the product was dried under reduced pressure and 36 g of 1-butene polymer was obtained.

For the obtained 1-butene homopolymer, mesopentad fraction (mmmm), stereoregularity index {(mmmm)/(mmrr+rmmr)}, racemic triad fraction (rr), abnormal insertion content, weight average molecular weight (Mw), molecular weight distribution (Mw/Mn), melting point (Tm, Tm–P), melting heat absorption (ΔH, ΔH–P), tensile modulus of elasticity and internal haze were measured according to the above described methods. The results are shown in Table 1.

EXAMPLE 8

(1) Preparation of Catalyst

In the same manner as described in Example 5, (1,2'-dimethylsilylene)(2,1'-dimethylsilylene)-bis (3-trimethylsilylmethylindenyl) zirconium dichloride was prepared.

(2) Polymerization

In a 1 liter autoclave, dried by heating, 200 ml of heptane, 200 ml of 1-butene, 0.5 mmol of triisobutylaluminium were charged and 0.03 MPa of hydrogen was introduced. After heating to 60° C. under agitation, propylene was continuously introduced under total pressure of 0.2 MPa. Then, 0.5 mmol of methylaluminoxane and 0.5 µmol of (1,2'-dimethylsilylene)(2,1'-dimethyl-silylene)-bis (3-trimethylsilylmethylindenyl) zirconium dichloride obtained in above (1) was added, and polymerization reaction was carried out for 30 minutes. After completion of the polymerization, the product was dried under reduced pressure and 21 g of 1-butene based copolymer was obtained.

For the obtained 1-butene based copolymer, co-monomer content, weight average molecular weight (Mw), molecular weight distribution (Mw/Mn), melting point (Tm, Tm–D, Tm–P), melting heat absorption (ΔH, ΔH–D, ΔH–P), tensile modulus of elasticity and internal haze were measured according to the above described methods. The results are shown in Table 1.

EXAMPLE 9

(1) Preparation of Catalyst

In the same manner as described in Example 5, (1,2'-dimethylsilylene)(2,1'-dimethylsilylene)-bis (3-trimethylsilylmethylindenyl) zirconiumdichloride was prepared.

(2) Polymerization

In 1 liter autoclave, dried by heating, 300 ml of heptane, 20 ml of 1-octene, 100 ml of 1-butene, 0.5 mmol of triisobutylaluminium were charged and 0.03 MPa of hydrogen was introduced. After heating to 60° C. under stirring, 0.5 mmol of methylaluminoxane and (1,2'-dimethylsilylene)(2,1'-dimethylsilylene)-bis (3-trimethylsilylmethylindenyl) zirconium dichloride obtained in above (1) were added and polymerization was carried out for 30 minutes. After completion of the polymerization, the product was dried under reduced pressure and 13 g of 1-butene based copolymer was obtained.

For the obtained 1-butene based copolymer, co-monomer content, weight average molecular weight (Mw), molecular weight distribution (Mw/Mn), melting point (Tm, Tm–D, Tm–P), melting heat absorption (ΔH, ΔH–D, ΔH–P), tensile modulus of elasticity and internal haze were measured according to the above described methods. The results are shown in Table 1.

TABLE 1

|  | Examples | | | | | | | | | Comparative Examples | |
|---|---|---|---|---|---|---|---|---|---|---|---|
|  | 1 | 2 | 3 | 4 | 5 | 6 | 7 | 8 | 9 | 1 | 2 |
| Mesopentad fraction (mmmm) (mol %) | 83.1 | 78.8 | 84.9 | — | 76.2 | — | 74.1 | — | — | 85.1 | — |
| Racemic triad fraction (rr) (mol %) | 3.1 | 3.9 | 2.3 | — | 3.7 | — | 4.7 | — | — | 3.1 | — |
| 90 − 2 × (rr) | 83.8 | 82.2 | 85.4 | — | 82.6 | — | 80.6 | — | — | 83.8 | — |
| Abnormal Insertion content (1,4 Insertion fraction) (mol %) | 2.9 | 1.2 | 2.6 | — | 0 | — | 0 | 0 | 0 | 0 | — |
| Comonomer | — | — | — | ethylene | — | — | — | propylene | 1-octene | — | — |

TABLE 1-continued

|  | Examples | | | | | | | | | Comparative Examples | |
| --- | --- | --- | --- | --- | --- | --- | --- | --- | --- | --- | --- |
|  | 1 | 2 | 3 | 4 | 5 | 6 | 7 | 8 | 9 | 1 | 2 |
| Comonomer content (mol %) | — | — | — | 0.5 | — | — | — | 3.3 | 1.5 | — | — |
| H25 | — | — | 45 | — | 46 | — | 40 | 45 | 49 | 40 | — |
| Stereoregularity Index {mmmm/(mmrr + rmmr)} | 15.1 | 12.7 | 16.3 | 15.5 | 10.0 | — | 9.0 | 9.5 | 9.4 | 21.7 | — |
| Random index R | — | — | — | 0 | — | — | — | 0 | 0 | — | — |
| Weight average molecular weight × 10000 (Mw) | 1.9 | 2.0 | 17 | 2.0 | 26 | — | 68 | 59 | 31 | 16 | — |
| Molecular weight distribution (Mw/Mn) | 1.8 | 2.2 | 1.8 | 2.0 | 2.0 | — | 2.0 | 2.0 | 1.9 | 4.1 | — |
| Melting point (Tm – D) (° C.) | — | — | — | — | — | — | 80 | 57 | 56 | — | — |
| Melting heat absorption (ΔH – D) (J/g) | — | — | — | — | — | — | 41 | 37 | 34 | — | — |
| Melting point (Tm – P) (° C.) | — | — | 73 | — | 69 | — | not observed | not observed | not observed | 109 | — |
| Melting heat absorption (ΔH – P) (J/g) | — | — | 12 | — | 0.3 | — | not observed | not observed | not observed | 48 | — |
| Melting point (Tm) (° C.) | 73 | 79 | 73 | 70 | 70 | — | not observed | not observed | not observed | 108 | — |
| Melting heat absorption (ΔH) (J/g) | 3 | 31 | 5.0 | 25 | 0 | — | not observed | not observed | not observed | 42 | — |
| Tensile modulus of elasticity (Mpa) | — | — | 290 | — | 220 | 1300 | 190 | 188 | 174 | 440 | 1600 |
| Internal haze | — | — | 45 | — | 35 | 49 | 37 | 34 | 25 | 78 | 50 |
| CII (%) | — | — | — | — | 0 | — | 0 | 0 | 0 | 100 | — |

PRODUCTION EXAMPLE 1

(Preparation of Polymerization Catalyst)

In the same manner as described in Example 5, (1,2'-dimethylsilylene)(2,1'-dimethylsilylene)-bis (3-trimethylsilylmethylindenyl) zirconiumdichloride was prepared to be used as catalyst for production of polymer.

PRODUCTION EXAMPLE 2

(Production of 1-Butene Based Polymer)

In a 10 liter autoclave, dried by heating, 1.6 liter of heptane, 2 kg of butene, 10 mmol of methylaluminoxane were charged and 0.03 MPa of hydrogen was introduced. After heating to 50° C. under stirring, 10 μmol of (1,2'-dimethyl-silylene)(2,1'-dimethylsilylene)-bis (3-trimethylsilylmethylindenyl) zirconiumdichloride obtained in above Production Example 1 was added and polymerization reaction was carried out for 60 minutes. After completion of the polymerization, the product was dried under reduced pressure and 850 g of 1-butene based polymer was obtained. The results of evaluation of resin characteristics of the obtained 1-butene based polymer were as follows:

| | | |
| --- | --- | --- |
| Mesopentad fraction (mmmm): | mol % | 77.4 |
| Racemic triad fraction (rr): | mol % | 3.7 |
| 90 – 2 × (rr) | | 82.6 |
| Abnormal insertion content (1,4 insertion fraction) | mol % | 0 |
| Stereoregularity index (mmmm)/(mmrr + rmmr) | | 10 |
| Weight average molecular weight (Mw) | | 86 × 10$^4$ |
| Molecular weight distribution (Mw/Mn) | | 2.4 |
| Melting point (Tm – P: DSC measurement): ° C. | | 70.2 |
| Melting heat absorption (ΔH): J/g | | 11.5 |
| Melting point (Tm – D: DSC measurement): ° C. | | 65.4 |
| Melting heat absorption (ΔH – D): J/g | | 45.6 |
| H 25: | | 40 |

PRODUCTION EXAMPLE 3

(Production of 1-Butene Based Polymer)

In a 10 liter autoclave, dried by heating, 4 liter of heptane, 2.5 kg of 1-butene, 10 mmol of triisobutylaluminium, 10 mmol of methylaluminoxane were charged and 0.05 MPa of hydrogen was introduced. After heating to 60° C. under stirring, 10 μmol of (1,2'-dimethylsilylene)(2,1'-dimethylsilylene)-bis (3-trimethylsilylmethylindenyl) zirconium dichloride prepared in the Production Example 1 was added and polymerization reaction was carried out for 60 minutes. After completion of the polymerization, the product was dried under reduced pressure and 990 g of 1-butene based polymer was obtained. The results of evaluation for resin characteristics of the obtained 1-butene based polymer were as follows:

| | | |
| --- | --- | --- |
| Mesopentad fraction (mmmm): | mol % | 71.6 |
| Racemic triad fraction (rr) | mol % | 4.6 |
| 90 – 2 × (rr) | | 80.8 |
| Abnormal insertion content (1,4 insertion fraction) | mol % | 0 |
| Stereoregularity index (mmmm)/(mmrr + rmmr) | | 8 |
| Weight average molecular weight (Mw) | | 51 × 10$^4$ |
| Molecular weight distribution (Mw/Mn) | | 2.0 |
| Melting point (Tm – P: DSC measurement): ° C. | | not observed |
| Melting heat absorption (ΔH): J/g | | not observed |
| Melting point (Tm – D: DSC measurement): ° C. | | 73 |
| Melting heat absorption (ΔH – D): J/g | | 35 |
| H 25: | | 39 |

PRODUCTION EXAMPLE 4

(Production of Propylene Based Polymer)

In a 10 liter stainless steel autoclave with an agitator, 4 liter of n-heptane, 2 mmol of tri-isobutylaluminium, 2 mmol of methylaluminoxane (manufactured by Albemar Co., Ltd.) and 2 μmol of (1,2'-dimethylsilylene)(2,1'-dimethylsilylene)-bis (3-trimethylsilylmethylindenyl) zirconiumdichloride were charged in order. After introducing 0.03 MPa (gauge) of hydrogen, while heating to 60° C., propylene was introduced until the total pressure reached to 0.8 MPa (gauge). Propylene was further introduced using a pressure controller to keep the total pressure of 0.8 MPa during polymerization. The polymerization was carried out at 60° C. for 30 minutes, and then the product was taken out and dried under reduced pressure to obtain propylene based polymer.

EXAMPLE 10

35 parts by weight of 1-butene based polymer obtained in the Production Example 2 and 65 parts by weight of polypropylene (manufactured by Idemitsu Petrochemical Co.,Ltd., F744NP) were extruded to pellets of olefin based resin composition using a single screw extruder (manufactured by Tsukada Jyuki Seisakusho CO., LTD.: TLC35-Type 20).

A film having thickness of 30 μm was formed from the pellets of the obtained polyolefine based resin composition using a single screw extruder (manufactured by Tsukada Juki Seisakusho:TLC35-Type 20 20 mm φ) under the following forming conditions:

| T-die outlet temperature: | 198° C. |
|---|---|
| Take-off speed; | 6.0 m/min. |
| Chilled roll temperature: | 30° C. |
| Chilled roll: | mirror surface. |

Results of evaluation for the press molded product and film from the obtained polyolefin based resin composition are shown in Table 2.

EXAMPLE 11

50 parts by weight of 1-butene based polymer obtained in the Production Example 2, and 50 parts by weight of polypropylene (manufactured by Idemitsu Petrochemical Co.,Ltd.: F744NP) was extruded to pellets using a single screw extruder (manufactured by Tsukada Jyuki Seisakusho CO., LTD.: TLC35-Type 20).

Film was produced in the same manner as described in Example 10, and the results of evaluation of the press molded product and film from the polyolefin based resin composition are shown in Table 2.

EXAMPLE 12

25 parts by weight of 1-butene based polymer obtained in the Production Example 2, 25 parts by weight of propylene based polymer obtained in the Production Example 4 and 50 parts of propylene (manufactured by Idemitsu Petrochemical Co.,Ltd.: F744NP) were extruded to pellets of polyolefin based resin composition using a single screw extruder (manufactured by Tsukada Jyuki Seisakusho CO., LTD.: TLC35-Type 20).

Film was produced in the same manner as described in Example 10. Results of evaluation of the press molded product and film from the polyolefin resin composition were shown in Table 2.

EXAMPLE 13

35 parts by weight of 1-butene based polymer obtained in the Production Example 3, and 65 parts by weight of polypropylene (manufactured by Idemitsu Petrochemical Co.,Ltd.:F744NP) were extruded to pellets of olefin based resin composition using single screw extruder (manufactured by Tsukada Jyuki Seisakusho CO., LTD.: TLC35-Type 20).

From the obtained pellets of the polyolefin based resin composit, film with thickness of 30 μm was produced using an extruder (manufactured by Tanabe Plastics Machine Co.,Ltd.: Type V 40 mm φ), and a molding machine (manufactured by Tsukada Jyuki Seisakusho CO., LTD.: TLC35-Type 20 20 mm φ) under the following forming conditions:

| T-die outlet temperature | 230° C. |
|---|---|
| Take-off speed | 18 m/min |
| Chilled roll temperature | 30° C. |
| Chilled roll | mirror surface |

Results of the evaluation for the obtained press molded product and film from the polyolefin based resin composition are shown in Table 2.

COMPARATIVE EXAMPLE 3

Results of the evaluation of the products formed in the same manner as described in Example 10, using only polypropylene (prepared by Idemitsu Petrochemical Co., Ltd.: F744NP) are shown in Table 2.

TABLE 2

| | Example 10 | Example 11 | Example 12 | Example 13 | Comparative Example 3 |
|---|---|---|---|---|---|
| (Resin composition)) | | | | | |
| 1-butene based polymer | 35 | 50 | 25 | 35 | — |
| Polypropylene | 65 | 50 | 50 | 65 | 100 |
| Propylene based polymer | — | — | 25 | — | — |
| (Evaluation of press molded product) | | | | | |
| Tensile modulus of elasticity (MPa) | 735 | 575 | 431 | 725 | 1070 |
| Izod impact strength (kJ/m2) | 6.5 | 9.1 | 10.6 | 7.2 | 2.7 |
| H25 of press molded product | 4 | 9 | 10 | 5 | 0 |
| (Evaluation of film) | | | | | |
| Tensile modulus of elasticity (MPa) | 494 | 438 | 419 | 449 | 750 |
| 12.5 × HST − 1100 | 350 | 287.5 | 275 | 388 | 587.5 |
| Melting point TmF (° C.) | 136 | 136 | 136 | 135 | 136 |
| 17 × TmF − 1600 | 712 | 712 | 712 | 695 | 712 |
| Heat sealing t temperature (° C.) | 116 | 111 | 110 | 119 | 135 |

TABLE 2-continued

|  | Example 10 | Example 11 | Example 12 | Example 13 | Comparative Example 3 |
|---|---|---|---|---|---|
| Anti-blocking property (N/m2) | 25 | 66 | 98 | 343 | 36 |
| Internal haze (%) | 0.5 | 0.4 | 0.5 | 0.6 | 0.9 |

EXAMPLE 14

1000 ppm of anti-oxidant IRGANOX 1010 and 1000 ppm of nucleating agent GELALL MD were added to the 1-butene based polymer obtained in the Production Example 2, and extruded to pellets of 1-butene based resin composition using a single screw extruder (manufactured by Tsukada Jyuki Seisakusho: TLC35-Type 20). Results of evaluation for the 1-butene based resin composition and the press molded product are shown in Table 3.

REFERENCE EXAMPLE 1

The pellets were produced by the same manner as described in Example 14 except that the nucleating agent was not added to the 1-butene based polymer obtained in the Production Example 2. Results of evaluation for the 1-butene based polymer and the press molded products are shown in Table 3.

is affected by the nucleating agent added, the property of the formed products can be controlled by selecting suitable nucleating agent depending on the purpose of application. Moreover, it can be suitably used as an alternative resin for flexible polyvinylchloride resin. 1-butene based resin reformer of the present invention provides formed products having flexibility, low stickiness and superior compatibility with polyolefin resins.

The formed products made from the polyolefin based resin compounds of the present invention has low stickiness, superior flexibility, low temperature impact strength, and are suitably used as films, sheets, containers, interior materials for automobile and housing materials for electric home appliances.

Furthermore, films made from the polyolefin based resin composition of the present invention has superior low temperature heat sealing property, heat sealing property, antiblocking property and are suitably used as an alternative resin for flexible polyvinylchloride resin.

TABLE 3

|  |  | Example 14 | Referance Example 1 |
|---|---|---|---|
| (Resin properties) |  |  |  |
| Mesopentad fraction (mmmm) | mol % | 77.4 | 77.4 |
| Racemic triad fraction (rr) | mol % | 3.7 | 3.7 |
| Formula (1): 90 − 2 × (rr) |  | 82.6 | 82.6 |
| Abnormal insertion content (1,4 insertion fraction) | mol % | 0 | 0 |
| Co-monomer content | mol % | 0 | 0 |
| Stereoregularity index mmmm/(mmrr + rmmr) |  | 10 | 10 |
| Weight average molecular weight (Mw) |  | 86 × 10000 | 86 × 10000 |
| Molecular weight distribution (Mw/Mn) |  | 10.1 | 10.1 |
| Melting point (TmC) | ° C. | 69.9 | 70.2 |
| Formula (4): 40 − 0.34 × TmC |  | 16.2 | 16.1 |
| Melting heat absorption (H) | J/g | 23.5 | 11.5 |
| Crystallization time (t: 25° C.) | min | 8 | 18 |
| H25 | % | 35 | 40 |
| Type II crystal fraction (CII) | % | 0 |  |
| (Press molded properties) |  |  |  |
| Tensile modulus of elasticity | Mpa | 200 | 193 |
| Internal haze | % | 25 | 37 |

In Table 3, the Reference Example 1 is the case where no nucleating agent was added, therefore, the melting point is Tm P, and the crystallization time is t P, satisfying the equations (5) to (7).

Possibility of Industrial Utilization 1-butene based polymer, 1-butene homopolymer, 1-butene based copolymer and the formed products from the polymers of the present invention has low stickiness, superior flexibility and transparency, has no change on standing of physical properties due to crystal transformation, has no shrinkage on the products and are suitably used for film, sheet, container, interior materials for automobile and housing material for electric home appliances. Applications as film include food packaging films and agricultural films, applications as container include transparent case, transparent box, and vanity case. As the characteristics of the resin

What is claimed is:

1. A 1-butene based polymer which satisfies the following:
   (1) it is a crystalline resin having a melting point (Tm–D) in the range of 0 to 100° C., wherein the melting point is defined as the peak top of the peak observed in the highest temperature zone of the melting heat absorption curve obtained by heating a sample of the polymer at a rate of 10° C./minute using the Differential Scanning Calorimeter (DSC), after keeping said sample in advance at −10 ° C. for 5 minutes under a nitrogen atmosphere,
   (2) it has a stereoregularity index {(mmmm)/(mmrr+ rmmr)} which is at most 20,
   (3) it has a molecular weight distribution (Mw/Mn) measured by the Gel Permeation Chromatography (GPC) method which is at most 4.0, and (4) it has a weight average molecular weight (Mw) measured by GPC method in the range of 10,000 to 1,000,000.

2. A 1-butene based polymer which satisfies the following:

(1') it is a crystalline resin having melting point (Tm), not observed or in the range of 0 to 100° C., wherein said melting point is defined as the peak top of the maximum peak of the melting heat absorption curve obtained by heating a sample of said polymer at a rate of 10° C./minute using the Differential Scanning Calorimeter (DSC), after melting said sample in advance at 220° C. for 3 minutes under a nitrogen atmosphere, followed by cooling it to −40° C. at a rate of 10° C./minute, and keeping it at −40° C. for 3 minutes, (2') it has a stereoregularity index {(mmmm)/(mmrr+rmmr)} which is at most 20, (3') it has a molecular weight distribution (Mw/Mn) measured by Gel Permeation Chromatography (GPC) method which is at most 4.0, and (4') it has a weight average molecular weight (Mw) measured by GPC method in the range of 10,000 to 1,000,000.

3. A 1-butene based polymer which satisfies the following:

(1") it is a crystalline resin having melting point (Tm−P), not observed or in the range of 0 to 100° C., wherein said melting point is defined as the peak top of the peak observed in the highest temperature zone of the melting heat absorption curve obtained by heating a sample of said polymer at a rate of 10° C./minute using a Differential Scanning Calorimeter (DSC), after melting said sample in advance at 190° C. for 5 minutes under a nitrogen atmosphere, followed by cooling it to −10° C. at a rate of 5° C./minutes, and keeping it at −10° C. for 5 minutes, (2") it has a stereoregularity index {(mmmm)/(mmrr+rmmr)} which is at most 20, (3") it has a molecular weight distribution (Mw/Mn) measured by Gel Permeation Chromatography (GPC) method which is at most 4.0, and (4") it has a weight average molecular weight (Mw) measured by GPC method in the range of 10,000 to 1,000,000.

4. The 1-butene based homopolymer according to any one of claim 1 to claim 3, wherein the mesopentad fraction (mmmm) is in the range of 20 to 90%.

5. The 1-butene based homopolymer according to 4, which satisfies the following formula (1);

$$(mmmm) \leq 90 - 2 \times (rr) \tag{1}$$

wherein (rr) is the racemic triad fraction.

6. The 1-butene based copolymer according to any one of claims 1 to 3, which comprises 1-butene and ethylene and/or α-olefin having 3 to 20 carbon atoms (except 1-butene), and has at least 90 mol % of the structural unit originated from 1-butene.

7. The 1-butene based copolymer according to claim 6, which is a copolymer of 1-butene and α-olefin having 3 to 20 carbon atoms (except 1-butene).

8. The 1-butene based copolymer according to claim 7, wherein the following random index R obtained from α-olefin chain is at most 1:

$$R = 4[\alpha\alpha][B\,B]/[\alpha B]^2$$

wherein [αα] is α-olefin chain fraction, [B B] is butene chain fraction, [α B] is α-olefin-butene chain fraction.

9. The 1-butene based copolymer according to claim 7, which is a copolymer of 1-butene and α-olefin having 3 to 20 carbon atoms (except 1-butene), and having at least 95 mol % of structural units originated from 1-butene.

10. The 1-butene homopolymer according to any one of claims 1 to 3, which is produced by polymerization of 1-butene under the presence of a polymerization catalyst comprising at least one kind of component selected from (A) a transition metal compound represented by the general formula (I) below, and (B) (B-1) a compound capable of forming an ionic complex by reaction with said transition metal compound of (A) component or its derivative, and (B-2) aluminoxane;

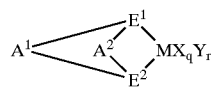

(1)

wherein, M represents a metallic element in groups 3 to 10 or in the lanthanoide series of the periodic table; each of $E^1$ and $E^2$ represents respectively a ligand selected from a substituted cyclopentadienyl group, an indenyl group, a substituted indenyl group, a heterocyclopentadienyl group, a substituted heterocyclopentadienyl group, an amide group, a phosphide group, a hydrocarbon group and a silicon containing group, forming a cross-linked structure through $A^1$ and $A^2$, $E^1$ and $E^2$ may be the same or different; X represents an σ-bonding ligand, and when X is plural, they may be the same or different with each other; and may be cross-linked with other X, $E^1$, $E^2$ or Y; Y represents a Lewis base, and when Y is plural, they may be the same or different with each other, and may be cross-linked with other Y, $E^1$, $E^2$ or X; $A^1$ and $A^2$ are bivalent cross-linking groups for bonding two ligands, representing a hydrocarbon group having 1 to 20 carbon atoms, a halogenated hydrocarbon group having 1 to 20 carbon atoms, a silicon containing group, a germanium containing group, a tin containing group, —O—, —CO—, —S—, —SO$_2$—, —Se—, —NR$^1$—, —PR$^1$—, —P(O)R$^1$—, —BR$^1$— or —AlR$^1$—; $R^1$ represents a hydrogen atom, a halogen atom, a hydrocarbon group having 1 to 20 carbon atoms or a halogen containing hydrocarbon group having 1 to 20 carbon atoms, may be the same or different with each other; q is an integer of 1 to 5 representing [(the valence of M)−2]; and r is an integer of 0 to 3.

11. The 1-butene based copolymer according to any one of claims 1 to 3 produced by co-polymerizing 1-butene and ethylene and/or α-olefin having 3 to 20 carbon atoms (except 1-butene) in the presence of a polymerization catalyst containing at least one kind of component selected from (A) a transition metal compound represented by the general formula below, and (B) (B-1) a compound capable of forming an ionic complex by reacting with the transition metal compound of said (A) component or its derivative, and (B-2) aluminoxane:

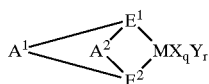
(1)

wherein, M represents a metallic element in groups 3 to 10 or in the lanthanoide series of the periodic table; each of $E^1$ and $E^2$ represents respectively a ligand selected from a substituted cyclopentadienyl group, an indenyl group, a substituted indenyl group, a heterocyclopentadienyl group, a substituted heterocyclopentadienyl group, an amide group, a phosphide group, a hydrocarbon group and a silicon containing group, forming a cross-linked structure through $A^1$ and $A^2$, $E^1$ and $E^2$ may be the same or different; X represents an σ-bonding ligand, and when X is plural, they may be the same or different with each other; and may be cross-linked with other X, $E^1$, $E^2$ or Y; Y represents a Lewis base, and when Y is plural, they may be the same or different with each other, and may be cross-linked with other Y, $E^1$, $E^2$ or X; $A^1$ and $A^2$ are bivalent cross-linking groups for bonding two ligands, representing a hydrocarbon group having 1 to 20 carbon atoms, a halogenated hydrocarbon group having 1 to 20 carbon atoms, a silicon containing group, a germanium containing group, a tin containing group, —O—, —CO—, —S—, —$SO_2$—, —Se—, —$NR^1$—, —$PR^1$—, —P(O)$R^1$—, —$BR^1$— or —$AlR^1$—; $R^1$ represents a hydrogen atom, a halogen atom, a hydrocarbon group having 1 to 20 carbon atoms or a halogen containing hydrocarbon group having 1 to 20 carbon atoms, $R^1$ may be the same or different with each other; q is an integer of 1 to 5 representing [(the valence of M)-2]; and r is an integer of 0 to 3.

12. A formed product produced by forming a 1-butene based polymer according to any one of claims 1 to 3.

13. A 1-butene based resin reforming agent comprising 1-butene based polymer according to any one of claims 1 to 3.

14. A polyolefin based resin composition comprising 1 to 99 weight % of 1-butene based polymer [I] and 99 to 1 weight % of polyolefins[II], wherein said 1-butene based polymer [I] satisfies the following (1") to (4"):

(1") it is a crystalline resin having a melting point (Tm–P), not observed or in the range of 0 to 100° C., wherein said melting point is defined as the peak top of the peak observed in the highest temperature zone of the melting heat absorption curve obtained by heating a sample of said polymer at a rate of 10° C./minute using a Differential Scanning Calorimeter (DSC), after melting said sample in advance at 190° C. for 5 minutes under a nitrogen atmosphere, followed by cooling it to −10 ° C. at a rate of 5° C./minutes, and keeping it at −10° C. for 5 minutes, (2") it has a stereoregularity index {(mmmm)/(mmrr+rmmr)} which is at most 20, (3") it has a molecular weight distribution (Mw/Mn) measured by the Gel Permeation Chromatography (GPC) method which is at most 4.0, (4") it has a weight average molecular weight (Mw) measured by the GPC method in the range of 10,000 to 1,000,000.

15. The polyolefin based resin composition according to claim 14, wherein the 1 butene based polymer [I] is a 1-butene homopolymer, having the mesopentad fraction (mmmm) in the range of 20 to 90%.

16. The polyolefin based resin composition according to claim 15, wherein the 1-butene homopolymer satisfies the formula (1);

$$(mmmm) \leq 90 - x(rr) \tag{1}$$

wherein rr is the racemic triad fraction.

17. The polyolefin based resin composition according to claim 14.

wherein polyolefin [II] is at least one kind of compound selected from the group consisting of polyethylene, polypropylene, poly α-olefin comprising α-olefin having at least 4 carbon atoms, polyvinylcycloalkane, syndiotactic polystyrene and polyalkenylsilane.

18. The polyolefin based resin composition according to claim 14, wherein polyolefin [II] is polypropylene.

19. A polyolefin based resin formed product made by forming the polyolefin based resin composition according to claim 14.

20. A polyolefin based resin formed product according to claim 19, which has tensile modulus of elasticity of at most 800 MPa, and an Izod impact strength (with notch) at −5° C. of at least 3 $kJ/m^2$.

21. A polyolefin based resin film made by forming the polyolefin based resin composition according to claim 14.

22. The polyolefin based resin film according to claim 21. having a tensile modulus of elasticity TM of at least 5 MPa, wherein the relationship between the tensile modulus of elasticity TM (MPa) and heat seal temperature HST (° C.) satisfies the following formula (2), and the relation between the tensile modulus of elasticity TM (MPa) and TmF(° C.) satisfies following formula (3):

$$TM \geq 12.5 \times HST - 1100 \tag{2}$$

$$TM \geq 17 \times TmF - 1600 \tag{3}$$

wherein, TmF is defined as the peak top of the peak observed in the highest temperature zone of the melting heat absorption curve obtained by heating a sample of said film at a rate of 10° C./minute using the Differential Scanning Calorimeter (DSC), after melting said sample in advance at 190° C. for 5 minutes under a nitrogen atmosphere, followed by cooling it to −10° C. at a rate of 5° C./minute, and keeping it for 5 minutes.

23. A 1-butene based resin composition comprising 1-butene based polymer satisfying (1") to (4") below, to which at least 10 ppm of a nucleating agent is added;

wherein said 1-butene based polymer:

(1") is a crystalline resin having melting point (Tm–P), not observed or in the range of 0 to 100° C., wherein said melting point defined as the peak top of the peak observed in the highest temperature zone of the melting heat absorption curve obtained by heating a sample of said polymer at a rate of 10° C./minute using a Differential Scanning Calorimeter (DSC), after melting said sample in advance at 190° C. for 5 minutes under a nitrogen atmosphere, followed by cooling it to −10° C. at a rate of 5° C./minutes, and keeping it at −10° C. for 5 minutes, (2") has a stereoregularity index {(mmmm)/(mmrr+rmmr)} which is at most 20, (3") has a molecular weight distribution (Mw/Mn) measured by the Gel Permeation Chromatography (GPC) method which is at most 4.0, and (4") has a weight average molecular weight (Mw) measured by the GPC method in the range of 10,000 to 1,000,000.

24. The 1-butene based resin composition according to claim 23, wherein said 1-butene based polymer is a 1-butene homopolymer having a mesopentad fraction (mmmm) in the range of 20 to 90%, and satisfying the following formula (1):

$$(mmmm) \leq 90 - 2 \times (rr) \tag{1}$$

wherein rr is the racemic triad fraction.

25. The 1-butene based resin composition according to claim 23, satisfying formula (4):

$$t \leq 40 - 0.34 \times TmC \tag{4}$$

wherein, TmC (° C.) is the melting point defined as the peak top of the peak observed in the highest temperature zone of the melting heat absorption curve of the Differential Scanning Calorimeter (DSC), obtained by heating a sample of said resin at a rate of 10° C./minute from –10° C., after melting said sample in advance at 190° C. under a nitrogen atmosphere for 5 minutes, followed by cooling to –10° C. at a rate of 5° C./minute and keeping it for 5 minutes, wherein t (minute) is the crystallization time, defined as the time required for observing the peak of crystallization heat by the Differential Scanning Calorimeter after said sample reaches 25° C., by quickly cooling the sample from a melting condition kept at 190° C. for 5 minutes under a nitrogen atmosphere.

26. The 1-butene based resin composition according to claim 23 having the melting point (TmC) (° C.) and crystallization time (t) (minute), comprising 1-butene based polymer having melting point (TmP) (° C.) and crystallization time (t P) (minute), satisfying the relationship as represented in the following formulae (5) to (7):

$$0 \leq TmC \leq 100 \tag{5}$$

$$TmC - TmP \leq 8 \tag{6}$$

$$t - tP \leq -4 \tag{7}$$

wherein t P is the crystallization time, defined as the time required for observing the peak of crystallization heat after said sample reaches 25° C., by quickly cooling the sample from a melting condition kept at 190° C. for 5 minutes under a nitrogen atmosphere.

27. A formed product prepared by forming the 1-butene based resin composition according to claim 23.

28. The 1-butene based homopolymer according to claim 2, wherein the mesopentad fraction (mmmm) in the range of 20 to 90%.

29. The 1-butene based homopolymer according to claim 3, wherein the mesopentad fraction (mmmm) in the range of 20 to 90%.

30. The 1-butene based homopolymer according to claim 28, which satisfies the following formula (1):

$$(mmmm) < 90 - 2 \times (rr) \tag{1}$$

wherein (rr) is the racemic triad fraction.

31. The 1-butene based homopolymer according to claim 29, which satisfies the following formula (1):

$$(mmmm) < 90 - 2 \times (rr) \tag{1}$$

wherein (rr) is the racemic triad fraction.

32. The 1-butene based copolymer according to claim 2, which comprises 1-butene and ethylene and/or α-olefin having 3 to 20 carbon atoms (except 1-butene), and has at least 90 mol % of the structural unit originated from 1-butene.

33. The 1-butene based copolymer according to claim 3, which comprises 1-butene and ethylene and/or α-olefin having 3 to 20 carbon atoms (except 1-butene), and has at least 90 mol % of the structural unit originated from 1-butene.

34. The 1-butene based copolymer according to claim 30, which is a copolymer of 1-butene and α-olefin having 3 to 20 carbon atoms (except 1-butene).

35. The 1-butene based copolymer according to claim 33, which is a copolymer of 1-butene and α-olefin having 3 to 20 carbon atoms (except 1-butene).

36. The 1-butene based copolymer according to claim 34, wherein the following random index R obtained from a-olefin chain is at most 1:

$$R = 4[\alpha\alpha][BB]/[\alpha B]^2$$

wherein [αα] is α-olefin chain fraction, [B B] is the butene chain fraction, [α B] is the α-olefin-butene chain fraction.

37. The 1-butene based copolymer according to claim 35, wherein the following random index R obtained from a-olefin chain is at most 1:

$$R = 4[\alpha\alpha][BB]/[\alpha B]^2$$

wherein [α α] is the α-olefin chain fraction, [B B] is butene chain fraction, [α B] is the α-olefin-butene chain fraction.

38. The 1-butene based copolymer according to claim 36, which is a copolymer of 1-butene and α-olefin having 3 to 20 carbon atoms (except 1-butene), and having at least 95 mol % of structural unit originated from 1-butene.

39. The 1-butene based copolymer according to claim 37, which is a copolymer of 1-butene and α-olefin having 3 to 20 carbon atoms (except 1-butene), and having at least 95 mol % of structural unit originated from 1-butene.

40. The 1-butene homopolymer according to claim 2, which is produced by polymerization of 1-butene under the presence of a polymerization catalyst comprising at least one kind of component selected from (A) transition metal compound represented by the general formula (I) below, and (B) (B-1) is a compound capable of forming an ionic complex by reaction with said transition metal compound of (A) component or its derivative, and (B-2) is aluminoxane:

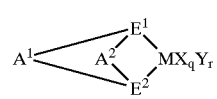
(1)

wherein; M represents a metallic element in the groups 3 to 10 or in the lanthanoide series of the periodic table; each of $E^1$ and $E^2$ represents respectively a ligand selected from a substituted cyclopentadienyl group, an indenyl group, a substituted indenyl group, a heterocyclopentadienyl group, a substituted heterocyclopentadienyl group, an amide group, a phosphide group, a hydrocarbon group and a silicon containing group, forming a cross-linked structure through $A^1$ and $A^2$, $E^1$ and $E^2$ may be the same or different; X represents a σ-bonding ligand, and when X is plural, they may be the same or different with each other; and may be cross-linked with other X, $E^1$, $E^2$ or Y; Y represents a Lewis base, and when Y is plural, they may be the same or different with each other, and may be cross-linked with other Y, $E^1$, $E^2$ or X; $A^1$ and $A^2$ are bivalent cross-linking group for bonding two ligands, representing a hydrocarbon group having 1 to 20 carbon atoms, a halogenated hydrocarbon group having 1 to 20 carbon atoms, a silicon containing group, a germanium containing group, a tin containing group, —O—, —CO—, —S—, —SO$_2$—, —Se—, —NR$^1$—, —PR$^1$—, —P(O)R$^1$—, —BR$^1$— or —AlR$^1$—; R$^1$ represents hydrogen atom, a halogen atom, a hydrocarbon group having 1 to 20 carbon atoms or a halogen containing hydrocarbon group having 1 to 20 carbon atoms, may be the same or different with each other; q is an integer of 1 to 5 representing [(the valence of M)–2]; and r is an integer of 0 to 3.

41. The 1-butene homopolymer according to claim 3, which is produced by polymerization of 1-butene under the presence of a polymerization catalyst comprising at least one kind of component selected from (A) transition metal compound represented by the general formula (I) below, and (B) (B-1) a compound capable of forming an ionic complex by reaction with said transition metal compound of (A) component or its derivative, and (B-2) aluminoxane:

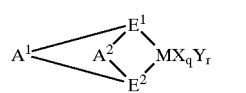
(1)

wherein M represents a metallic element in the groups 3 to 10 or in the lanthanoide series of the periodic table; each of $E^1$ and $E^2$ represents respectively a ligand selected from a substituted cyclopentadienyl group, an indenyl group, a substituted indenyl group, a heterocyclopentadienyl group, a substituted heterocyclopentadienyl group, an amide group, a phosphide group, a hydrocarbon group and a silicon containing group, forming a cross-linked structure through $A^1$ and $A^2$, $E^1$ and $E^2$ may be the same or different; X represents a σ-bonding ligand, and when X is plural, they may be the same or different with each other; and may be cross-linked with other X, $E^1$, $E^2$ or Y; Y represents a Lewis base, and when Y is plural, they may be the same or different with each other, and may be cross-linked with other Y, $E^1$, $E^2$ or X; $A^1$ and $A^2$ are bivalent cross-linking group for bonding two ligands, representing a hydrocarbon group having 1 to 20 carbon atoms, a halogenated hydrocarbon group having 1 to 20 carbon atoms, a silicon containing group, a germanium containing group, a tin containing group, —O—, —CO—, —S—, —SO$_2$—, —Se—, —NR$^1$—, —PR$^1$—, —P(O)R$^1$—, —BR$^1$— or —AlR$^1$—; R$^1$ represents hydrogen atom, a halogen atom, a hydrocarbon group having 1 to 20 carbon atoms or a halogen containing hydrocarbon group having 1 to 20 carbon atoms, R$^1$ may be the same or different with each other; q is an integer of 1 to 5 representing [(the valence of M)–2]; and r is an integer of 0 to 3.

42. The 1-butene based copolymer according to claim 2, produced by co-polymerizing 1-butene and ethylene and/or α-olefin having 3 to 20 carbon atoms (except 1-butene) in the presence of a polymerization catalyst containing at least one kind of component selected from (A) a transition metal compound represented by the general formula below, and (B) (B-1) a compound capable of forming an ionic complex by reacting with transition metal compound of said (A) component or its derivative, and (B-2) aluminoxane:

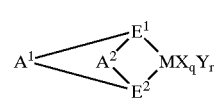
(1)

wherein; M represents a metallic element in the groups 3 to 10 or in the lanthanoide series of the periodic table; each of $E^1$ and $E^2$ represents respectively a ligand selected from a substituted cyclopentadienyl group, an indenyl group, a substituted indenyl group, a heterocyclopentadienyl group, a substituted heterocyclopentadienyl group, an amide group, a phosphide group, a hydrocarbon group and a silicon containing group, forming a cross-linked structure through $A^1$ and 2, $E^1$ and $E^2$ may be the same or different; X represents a σ-bonding ligand, and when X is plural, they may be the same or different with each other; and may be cross-linked with other X, $E^1$, $E^2$ Y; Y represents a Lewis base, and when Y is plural, they may be the same or different with each other, and may be cross-linked with other Y, $E^1$, $E^2$ or X; $A^1$ and $A^2$ are bivalent cross-linking group for bonding two ligands, representing a hydrocarbon group having 1 to 20 carbon atoms, a halogenated hydrocarbon group having 1 to 20 carbon atoms, a silicon containing group, a germanium containing group, a tin containing group, —O—, —CO—, —S—, —SO$_2$—, —Se—, —NR$^1$—, —PR$^1$—, —P(O)R$^1$—, —BR$^1$— or —AlR$^1$—; R$^1$ represents hydrogen atom, a halogen atom, a hydrocarbon group having 1 to 20 carbon atoms or a halogen containing hydrocarbon group having 1 to 20 carbon atoms, R$^1$ may be the same or different with each other; q is an integer of 1 to 5 representing [(the valence of M)–2]; and r is an integer of 0 to 3.

43. The 1-butene based copolymer according to claim 3, produced by co-polymerizing 1-butene and ethylene and/or α-olefin having 3 to 20 carbon atoms (except 1-butene) in the presence of polymerization catalyst containing at least one kind of component selected from (A) transition metal compound represented by the general formula below, and (B) (B-1) compound capable of forming ionic complex by reacting with transition metal compound of said (A) component or its derivative, and (B-2) aluminoxane:

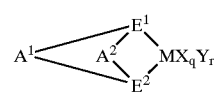
(1)

wherein, M represents a metallic element in the groups 3 to 10 or in the lanthanoide series of the periodic table; each of $E^1$ and $E^2$ represents respectively a ligand selected from a substituted cyclopentadienyl group, an indenyl group, a substituted indenyl group, a heterocyclopentadienyl group, a substituted heterocyclopentadienyl group, an amide group, a phosphide group, a hydrocarbon group and a silicon containing group, forming a cross-linked structure through $A^1$ and $A^2$, $E^1$ and $E^2$ may be the same or different; X represents a σ-bonding ligand, and when X is plural, they may be the same or different with each other; and may be cross-linked with other X, $E^1$, $E^2$ or Y; Y represents a Lewis base, and when Y is plural, they may be the same or different with each other, and may be cross-linked with other Y, $E^1$, $E^2$ or X; $A^1$ and $A^2$ are bivalent cross-linking group for bonding two ligands, representing a hydrocarbon group having 1 to 20 carbon atoms, a halogenated hydrocarbon group having 1 to 20 carbon atoms, a silicon containing group, a germanium containing group, a tin containing group, —O—, —CO—, —S—, —SO$_2$—, —Se—, —NR$^1$—, —PR$^1$—, —P(O)R$^1$—, —BR$^1$— or —AlR$^1$—; R$^1$ represents hydrogen atom, a halogen atom, a hydrocarbon group having 1 to 20 carbon atoms or a halogen containing hydrocarbon group having 1 to 20 carbon atoms, R$^1$ may be the same or different with each other; q is an integer of 1 to 5 representing [(the valence of M)−2]; and r is an integer of 0 to 3.

44. A formed product produced by forming 1-butene based polymer according to claim 2.

45. A formed product produced by forming 1-butene based polymer according to claim 3.

46. A 1-butene based resin reforming agent comprising the 1-butene based polymer according to claim 2.

47. A 1-butene based resin reforming agent comprising the 1-butene based polymer according to claim 3.

\* \* \* \* \*

UNITED STATES PATENT AND TRADEMARK OFFICE
CERTIFICATE OF CORRECTION

PATENT NO. : 6,930,160 B2  
DATED : August 16, 2005  
INVENTOR(S) : Minami et al.

It is certified that error appears in the above-identified patent and that said Letters Patent is hereby corrected as shown below:

<u>Title page, Item [54] and Column 1, lines 1-2,</u>  
Title, should read -- 1-BUTENE BASED POLYMER AND THE PRODUCT FORMED THEREFROM --.  
Item [30], should read:  
 -- Foreign Application Priority Data  
Aug. 22, 2000 (JP) 2000-251094  
Nov. 24, 2000 (JP) 2000-357246  
Feb. 20, 2001 (JP) 2001-044077  
Feb. 22, 2001 (JP) 2001-047129  
May 24, 2001 (JP) 2001-155643  
Jun. 14, 2001 (JP) 2001-179960 --.

Signed and Sealed this

Eighth Day of November, 2005

JON W. DUDAS  
*Director of the United States Patent and Trademark Office*